(12) United States Patent
Takano

(10) Patent No.: US 9,967,837 B2
(45) Date of Patent: May 8, 2018

(54) COMMUNICATION CONTROL WITH SYNCHRONIZATION RELATION INFORMATION FOR MUTUALLY SYNCHRONIZED FREQUENCY BANDS

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 109 days.

(21) Appl. No.: 14/434,191

(22) PCT Filed: Sep. 10, 2013

(86) PCT No.: PCT/JP2013/074374
§ 371 (c)(1),
(2) Date: Apr. 8, 2015

(87) PCT Pub. No.: WO2014/069106
PCT Pub. Date: May 8, 2014

(65) Prior Publication Data
US 2015/0296466 A1 Oct. 15, 2015

(30) Foreign Application Priority Data
Nov. 1, 2012 (JP) .................................. 2012-241697

(51) Int. Cl.
*H04J 3/06* (2006.01)
*H04W 56/00* (2009.01)
(Continued)

(52) U.S. Cl.
CPC ............. *H04W 56/00* (2013.01); *H04L 5/001* (2013.01); *H04L 5/0048* (2013.01);
(Continued)

(58) Field of Classification Search
CPC . H04W 56/00; H04W 56/001; H04W 72/042; H04W 72/0453; H04W 28/08; H04W 88/02; H04L 5/001; H04L 5/0048
See application file for complete search history.

(56) References Cited

U.S. PATENT DOCUMENTS

2011/0158342 A1* 6/2011 Srinivasan .......... H04L 25/0212
375/285
2011/0281607 A1* 11/2011 Wu ....................... H04L 5/0023
455/509
(Continued)

FOREIGN PATENT DOCUMENTS

JP  2011-120196 A  6/2011
WO  2010/073468 A1  7/2010
WO  2011/032308 A1  3/2011

OTHER PUBLICATIONS

Extended European Search Report of EP Patent Application No. 13850241.4, dated Oct. 5, 2016, 12 pages.
(Continued)

*Primary Examiner* — Lonnie Sweet
(74) *Attorney, Agent, or Firm* — Chip Law Group

(57) ABSTRACT

There is provided a communication control device including an acquisition unit configured to acquire synchronization relation information indicating which frequency bands are mutually synchronized among a plurality of frequency bands used for radio communication, and a control unit configured to control transmission of the synchronization relation information to a terminal device. The plurality of frequency bands include one or more frequency bands with which a common reference signal is not transmitted in at least one subframe among subframes which are units of time in the radio communication.

15 Claims, 41 Drawing Sheets

(51) Int. Cl.
- *H04W 72/04* (2009.01)
- *H04L 5/00* (2006.01)
- *H04W 28/08* (2009.01)
- *H04W 88/02* (2009.01)

(52) U.S. Cl.
CPC ....... *H04W 56/001* (2013.01); *H04W 72/042* (2013.01); *H04W 72/0453* (2013.01); *H04W 28/08* (2013.01); *H04W 88/02* (2013.01)

(56) References Cited

U.S. PATENT DOCUMENTS

| | | | | |
|---|---|---|---|---|
| 2012/0002613 | A1* | 1/2012 | Kishiyama | H04W 74/0866 370/329 |
| 2012/0039330 | A1* | 2/2012 | Baldemair | H04W 56/0015 370/350 |
| 2012/0213141 | A1* | 8/2012 | Damnjanovic | H04W 72/005 370/312 |
| 2014/0078912 | A1* | 3/2014 | Park | H04L 5/0048 370/252 |

OTHER PUBLICATIONS

"Some Issues on Synchronization in NCT CCs", 3GPP TSG RAN WG1 #71, New Orleans, USA, Sony Corporation, Nov. 12-16, 2012, 3 pages.
"New Carrier Type for Synchronized Carriers", 3GPP TSG-RAN WG1 Meeting #68bis, Jeju, Korea, Nokia Siemens Networks, Nokia, Mar. 26-30, 2012, 3 pages.
"Discussions on Synchronized New Carrier Type", 3GPP TSG RAN WG1 Meeting #69 Prague, Czech Republic, LG Electronics, May 21-25, 2012, 4 pages.
"Further Discussions on New Carrier Type in LTE Rel-11 CA", 3GPP TSG RAN WG1 Meeting #68 Dresden, Germany, Renesas Mobile Europe Ltd., Feb. 6-10, 2012, 4 pages.
NTT Docomo, "Further Views on Synchronized New Carrier Type Scenarios", 3GPP TSG RAN WG1 Meeting #69, May 21-25, 2012, p. 4, R1-122375, Prague, Czech Republic.
LG Electronics, "Discussions on Synchronized New Carrier Type", 3GPP TSG RAN WG1 Meeting #69, May 21-25, 2012, p. 4, R1-122276, Prague, Czech Republic.
Qualcomm Incorporated, "Bandwidth of NCT RS", 3GPP TSG-RAN WG4 #64BIS, Oct. 8-12, 2012, p. 4, R4-125322, Santa Rosa, CA, USA.
NTT Docomo, "DL Signals for Unsynchronized New Carrier Type", 3GPP TSG RAN WG1 Meeting #69, May 21-25, 2012, p. 2, R1-122374, Prague, Czech Republic.
Sony Corporation, "Some Issues on Synchronization in NCT CCS", 3GPP TSG RAN WG1 #71, Nov. 12-16, 2012, p. 3, R1-124751, New Orleans, USA.
Partial Supplementary European Search Report Received for European Patent Application No. 13850241.4, dated Jun. 27, 2016, p. 10.
Sony Corporation, "Some issues on synchronization in NCT CCs", New Orleans, USA, Nov. 12-16, 2012, pp. 3.
Nokia Siemens Networks, Nokia, "New Carrier Type for Synchronized Carriers", Jeju, Korea, Mar. 26-30, 2012, pp. 3.
LG Electronics, "Discussions on synchronized new carrier type", Prague, Czech Republic, May 21-25, 2012, p. 4.
Renesas Mobile Europe Ltd., "Further Discussions on New Carrier Type in LTE Rel-11 CA", Dresden, Germany, Feb. 6-10, 2012, pp. 4.
"Discussions on Synchronized New Carrier Type", R1-122276, 3GPP TSG RAN WG1 Meeting #69, Prague, Czech Republic, May 21-25, 2012, 05 pages.
Office Action for JP Patent Application No. 2014-544371, dated Jun. 20, 2017, 04 pages of Office Action and 04 pages of English Translation.
LG Electronics, "Discussions on synchronized new carrier type", 3GPP TSG-RAN WG1 Meeting #69 R1-122276, 3GPP, May 21-25, 2012.
Office Action for JP Patent Application No. 2014-544371, dated Sep. 26, 2017, 3 pages of Office Action and 3 pages of English Translation.
Office Action for CN Patent Application No. 201380055674.5, dated Jan. 17, 2018, 6 pages of Office Action and 10 pages of English Translation.
"Renesas Mobile Europe Ltd Further Discussions on New Carrier Type in LTE Rel-11 CA", 3GPP TSG RAN WG1 Meeting #68 R1-120371, Feb. 10, 2012, 4 pages.

* cited by examiner

FIG. 9

| LEGACY SYNC NCT | CC30A | CC 30B |
|---|---|---|
| CC 30C | SYNC | SYNC |

FIG. 11

| LEGACY SYNC NCT | CC 30A | CC 30B |
|---|---|---|
| CC 30C | | SYNC |

FIG. 13

| | UNSYNC NCT | CC 30D | CC 30E |
|---|---|---|---|
| UNSYNC NCT | | | |
| CC 30D | | | |
| CC 30E | | | |

FIG. 15

| | UNSYNC NCT | CC 30D | CC 30E |
|---|---|---|---|
| UNSYNC NCT | | | |
| CC 30D | | | SYNC |
| CC 30E | | SYNC | |

FIG. 17

| CC 30A | CC 30B | CC 30C | CC 30D | CC 30E |
|--------|--------|--------|--------|--------|
| CC 30A |        |        |        |        |
| SYNC   | CC 30B |        |        |        |
| SYNC   | SYNC   | CC 30C |        |        |
|        | SYNC   | SYNC   | CC 30D |        |
|        |        |        | SYNC   | CC 30E |

FIG. 20

| | CC 30F | CC 30G | CC 30H | CC 30I | CC 30J |
|---|---|---|---|---|---|
| CC 30F | | | | | |
| CC 30G | SYNC | | | | |
| CC 30H | | SYNC | | | |
| CC 30I | | | SYNC | | |
| CC 30J | | | | SYNC | |

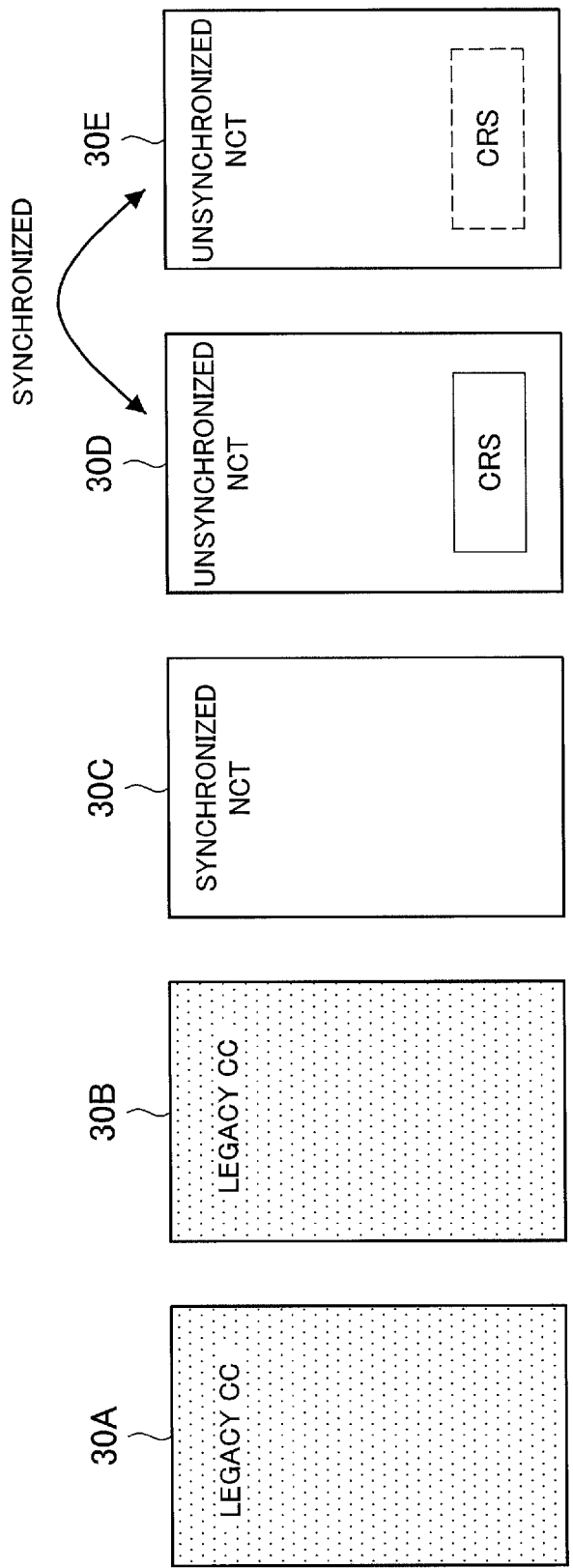

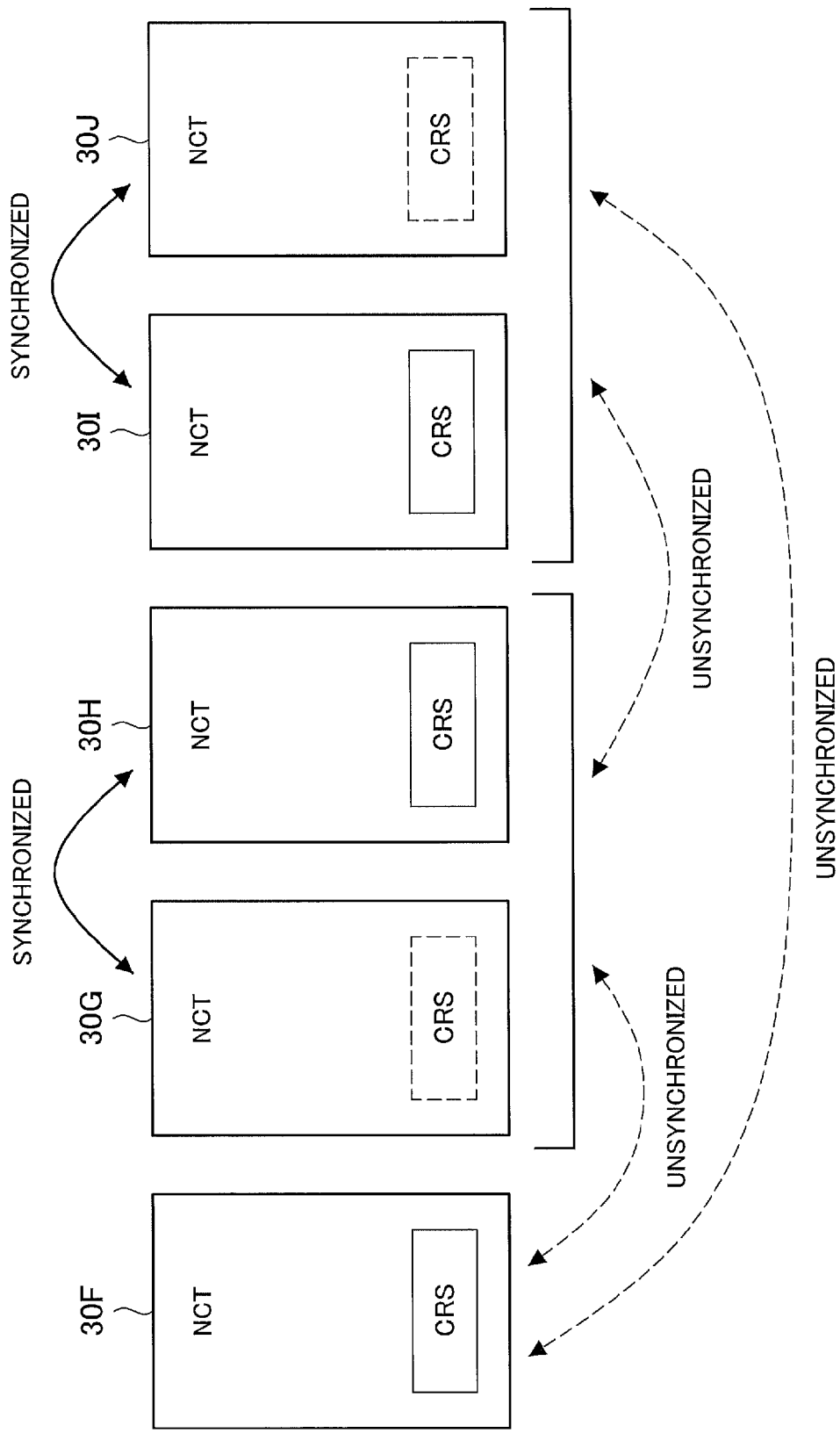

FIG. 32

| NCT | CC 30L | CC 30M | CC 30N | CC 30O |
|---|---|---|---|---|
| CRS | 5ms – 25RB | 10ms – 6RB | 10ms – 6RB | 5ms – 25RB |

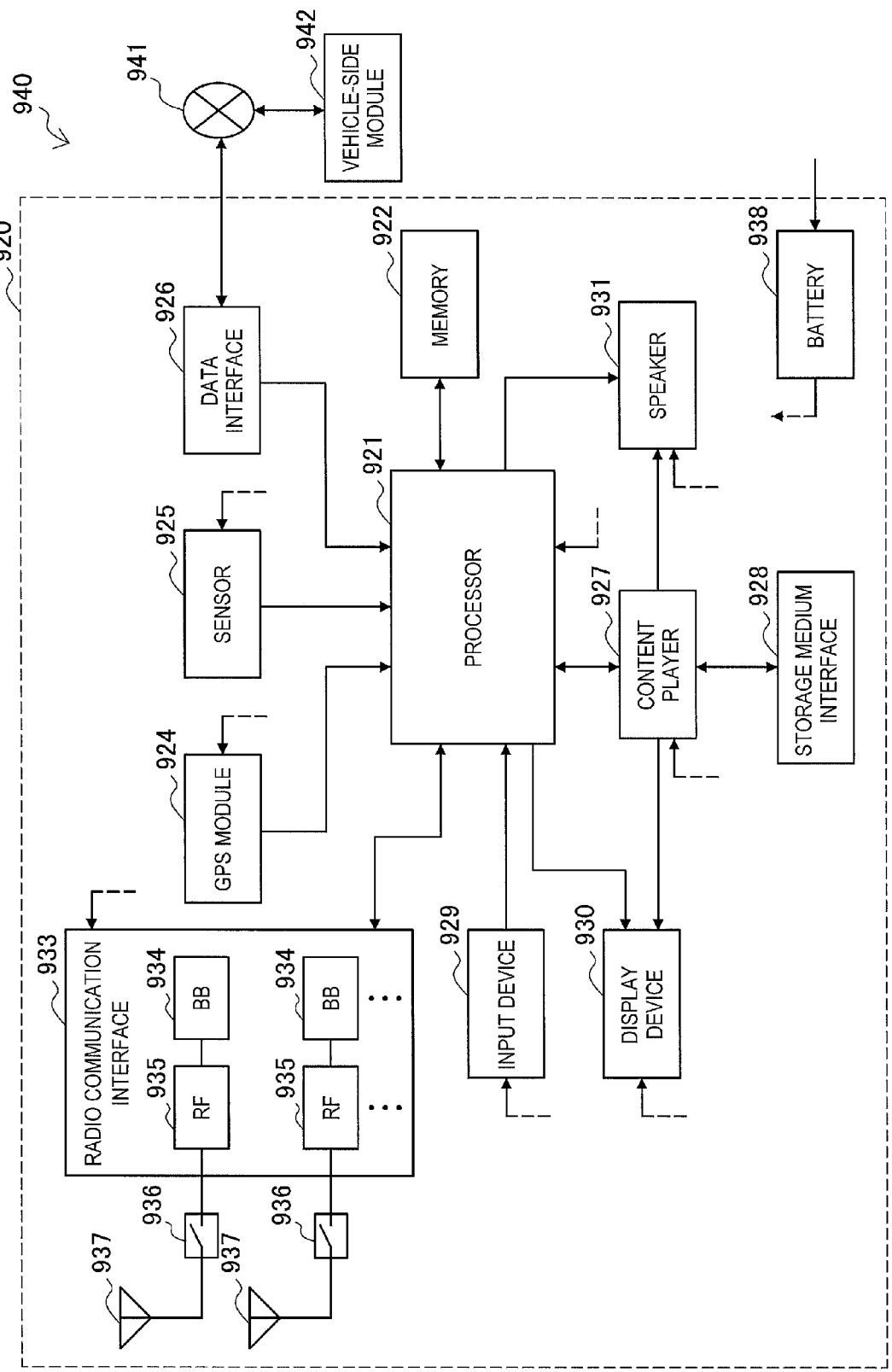

COMMUNICATION CONTROL WITH SYNCHRONIZATION RELATION INFORMATION FOR MUTUALLY SYNCHRONIZED FREQUENCY BANDS

TECHNICAL FIELD

The present disclosure relates to a communication control device, a program, a communication control method, and a terminal device.

BACKGROUND ART

At present, 4G radio communication systems have been standardized by the Third Generation Partnership Project (3GPP). In 4G, technologies such as carrier aggregation, relay, and Multi-User Multiple-Input Multiple-Output (MU-MIMO) have been noticed.

In particular, carrier aggregation is a technology capable of handling a bandwidth of 20 MHz×5=100 MHz by collectively handling, for example, five frequency bands with a bandwidth of 20 MHz. According to carrier aggregation, an advance in the maximum throughput is expected. Various technologies related to such carrier aggregation have been investigated.

For example, Patent Literature 1 discloses a technology for suppressing deterioration in throughput by controlling assignment of a management gap for each component carrier (CC) based on a determination result of urgency of handover.

CITATION LIST

Patent Literature

Patent Literature 1: JP 2011-120196A

SUMMARY OF INVENTION

Technical Problem

On the other hand, in Release 11 of the 3GPP, new carrier types (NCTs) have been investigated as new component carriers apart from legacy CCs (existing CCs) capable of maintaining backward compatibility. Here, the NCTs are assumed to be new types of CCs as well as the types of CCs. Further, as the NCTs, an NCT (Synchronized New Carrier Type: SNCT) synchronized with the existing CC and an NCT (Unsynchronized New Carrier Type: UNCT) not synchronized with the LCCs have been investigated.

The SNCT is synchronized with any legacy CC. When a UE acquires a synchronization state of the UE in one CC between the mutually synchronized SNCT and legacy CC, information regarding the synchronization state can be used in the other CC. That is, the UE may not acquire the synchronization state of the UE in the other CC. When the UE monitors the synchronization state of the UE in one CC between the mutually synchronized SNCT and legacy CC, a monitoring result of the synchronization state can be used in the other CC. That is, the UE may not monitor the synchronization state of the UE in the other CC.

The UNCT is not synchronized with any legacy CC, but can be synchronized with another UNCT. Therefore, when the UE acquires the synchronization state of the UE in one CC among two or more mutually synchronized UNCTs, information regarding the synchronization state can be used for the other CC. That is, the UE may not acquire the synchronization state of the UE in the other CC. When the UE monitors the synchronization state of the UE in one CC among two or more mutually synchronized UNCTs, a monitoring result of the synchronization state can be used in the other CC for the SNCT. That is, the UE may not monitor the synchronization state of the UE in the other CC.

However, in order for the UE to use the information regarding the synchronization state of the UE in a certain CC for another CC, there is a concern of a large load being applied to the UE.

For example, since a frequency band separate from the SNCT can be present in the legacy CC, the SNCT is not synchronized with all of the legacy CCs. Therefore, the UE verifies the synchronization between the SNCT and each of a plurality of legacy CCs in order to use the information regarding the synchronization state of the UE in the legacy CC for the SNCT. In this way, a large load may be applied to the UE.

For example, there is a possibility of the UNCT being synchronized with another UNCT, but not all of the UNCTs are necessarily synchronized. Therefore, the UE verifies the synchronization between the UNCTs in order to use the information regarding the synchronization state of the UE in a certain UNCT for another UNCT. In this way, a large load may be applied to the UE.

Originally, when the UE does not use the information regarding the synchronization state of the UE in a certain CC for another CC, the UE acquires the synchronization state of the UE in each CC and necessarily monitors the synchronization state of the UE in each CC. In this way, a large load may be applied to the UE.

Accordingly, it is desirable to supply a structure capable of reducing a load on a UE in carrier aggregation.

Solution to Problem

According to the present disclosure, there is provided a communication control device including an acquisition unit configured to acquire synchronization relation information indicating which frequency bands are mutually synchronized among a plurality of frequency bands used for radio communication, and a control unit configured to control transmission of the synchronization relation information to a terminal device. The plurality of frequency bands include one or more frequency bands with which a common reference signal is not transmitted in at least one subframe among subframes which are units of time in the radio communication.

According to the present disclosure, there is provided a program causing a computer to function as an acquisition unit configured to acquire synchronization relation information indicating which frequency bands are mutually synchronized among a plurality of frequency bands used for radio communication, and a control unit configured to control transmission of the synchronization relation information to a terminal device. The plurality of frequency bands include one or more frequency bands with which a common reference signal is not transmitted in at least one subframe among subframes which are units of time in the radio communication.

According to the present disclosure, there is provided a communication control method including acquiring synchronization relation information indicating which frequency bands are mutually synchronized among a plurality of frequency bands used for radio communication, and controlling transmission of the synchronization relation information to a terminal device. The plurality of frequency bands include one or more frequency bands with which a common reference signal is not transmitted in at least one subframe among subframes which are units of time in the radio communication.

According to the present disclosure, there is provided a terminal device including an acquisition unit configured to acquire synchronization relation information indicating which frequency bands are mutually synchronized among a plurality of frequency bands used for radio communication when the synchronization relation information is received, and a control unit configured to perform control for a purpose of synchronization in the plurality of frequency bands based on the synchronization relation information. The plurality of frequency bands include one or more frequency bands with which a common reference signal is not transmitted in at least one subframe among subframes which are units of time in the radio communication.

According to the present disclosure, there is provided a communication control device including a control unit configured to control transmission of a signal with a plurality of frequency bands used for radio communication. The plurality of frequency bands include two or more frequency bands with which the common reference signal is not transmitted in at least one subframe among the subframes which are the units of time in the radio communication. The control unit controls the transmission in a manner that the common reference signal is transmitted at different intervals with at least two frequency bands among the two or more frequency bands.

According to the present disclosure, there is provided a terminal device including a control unit configured to select a frequency band used for radio communication of the terminal device among a plurality of frequency bands used for the radio communication. The plurality of frequency bands include two or more frequency bands with which a common reference signal is not transmitted in at least one subframe among subframes which are units of time in the radio communication. The common reference signal is transmitted at different intervals with at least two frequency bands among the two or more frequency bands.

Advantageous Effects of Invention

According to an embodiment of the present disclosure, it is possible to reduce a load on the UE in carrier aggregation.

BRIEF DESCRIPTION OF DRAWINGS

FIG. 9 is an explanatory diagram illustrating an example of synchronization relation information corresponding to the first example of the synchronization relation illustrated in FIG. 8.

FIG. 11 is an explanatory diagram illustrating an example of synchronization relation information corresponding to the second example of the synchronization relation illustrated in FIG. 10.

FIG. 13 is an explanatory diagram illustrating an example of synchronization relation information corresponding to the first example of the synchronization relation illustrated in FIG. 12.

FIG. 15 is an explanatory diagram illustrating an example of synchronization relation information corresponding to the second example of the synchronization relation illustrated in FIG. 14.

FIG. 17 is an explanatory diagram illustrating an example of synchronization relation information corresponding to the example of the synchronization relations illustrated in FIG. 16.

FIG. 20 is an explanatory diagram illustrating an example of synchronization relation information corresponding to the example of the synchronization relations illustrated in FIG. 19.

FIG. 24 is an explanatory diagram illustrating a first example of transmission of the CRS according to a first modification example of the first embodiment.

FIG. 25 is an explanatory diagram illustrating a second example of the transmission of the CRS according to the first modification example of the first embodiment.

FIG. 32 is an explanatory diagram illustrating an example of synchronization determination information corresponding to the NCTs illustrated in FIG. 30.

FIG. 41 is a block diagram illustrating an example of a schematic configuration of a car navigation device to which technology according to an embodiment of the present disclosure may be applied.

DESCRIPTION OF EMBODIMENTS

Figure 1:
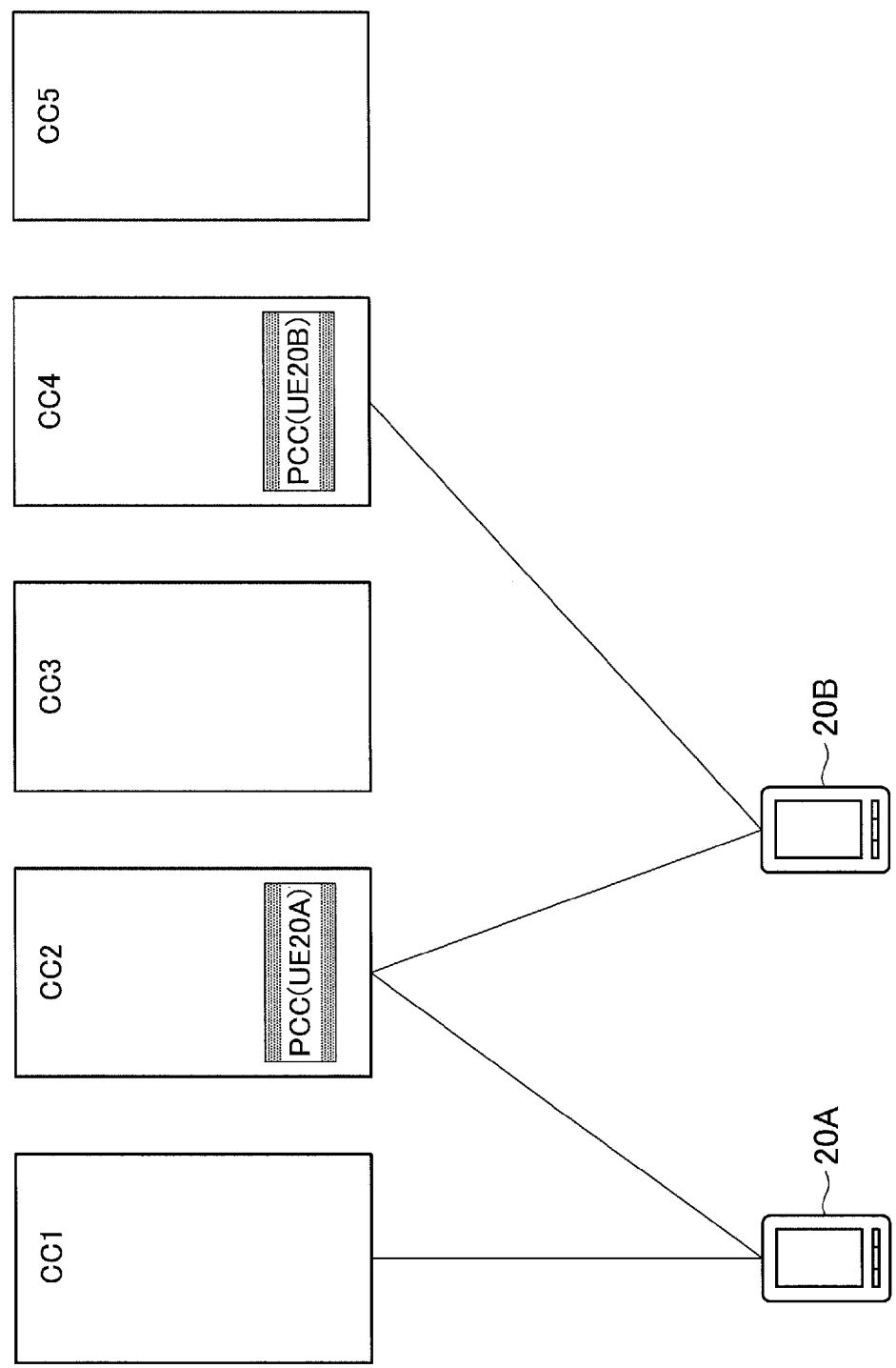
FIG. 1 is an explanatory diagram illustrating an example of a PCC of each UE.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Technology for radio communication in 3GPP
2. Schematic configuration of radio communication system
3. First Embodiment
3.1. Overview
3.2. Specific example of synchronization relation information
3.3. Configuration of each device
3.3.1. Configuration of eNodeB
3.3.2. Configuration of UE
3.4. Flow of process
3.5. Modification examples
3.5.1. First modification example
3.5.2. Second modification example
4. Second Embodiment
4.1. Overview
4.2. Configuration of each device
4.2.1. Configuration of eNodeB
4.2.2. Configuration of UE
4.3. Flow of process
4.4. Modification example
4.4.1. First modification example
4.4.2. Second modification example
5. Application examples
5.1. Applications related to eNodeB
5.2. Applications related to UE
6. Conclusion

1. TECHNOLOGY FOR RADIO COMMUNICATION IN 3GPP

First, a technology for radio communication in the 3GPP will be described as a premise.
(Carrier Aggregation of Release 10)
Component Carrier In carrier aggregation of Release 10, up to five component carriers (CCs) are bundled and used in a UE. Each CC is a bandwidth of up to 20 MHz. In carrier aggregation, CCs continuing in a frequency direction are used in some cases and CCs separated in the frequency direction are used in some cases. In carrier aggregation, the CCs to be used can be set for each UE.

Primary CC and Secondary CC

In carrier aggregation, one of the plurality of CCs used by the UE is a special CC. The one special CC is referred to as a primary component carrier (PCC). Of the plurality of CCs, the remaining CCs are referred to as secondary component carriers (SCCs). The PCC can differ for each UE. This point will be described more specifically below with reference to FIG. 1.

FIG. 1 is an explanatory diagram illustrating an example of the PCC of each UE. A UE 20A, a UE 20B, and five CCs 1 to 5 are illustrated in FIG. 1. In this example, the UE 20A uses two CCs, the CC 1 and the CC 2. The UE 20A uses the CC 2 as the PCC. On the other hand, the UE 20B uses two CCs, the CC 2 and the CC 4. The UE 20B uses the CC 4 as the PCC. In this way, each UE can use a different CC as the PCC.

Since the PCC is the most important CC among the plurality of CCs, the CC for which communication quality is the stablest is preferable. Which CC is used as the PCC actually depends the way in which they are installed.

The CC with which a UE initially establishes connection is the PCC in the UE. The SCC is added to the PCC. That is, the PCC is a main frequency band and the SCC is an auxiliary frequency band. The SCC is changed by deleting the existing SCC and adding a new SCC. The PCC is changed in an inter-frequency handover sequence of the related art. In carrier aggregation, a UE may not use only the SCC, but necessarily uses one PCC.

The PCC is also referred to as a primary cell. The SCC is also referred to as a secondary cell.

Acquisition of Synchronization State of UE in CRS

In carrier aggregation, a common reference signal (CRS) is transmitted with each CC. A UE acquires a synchronization state of the UE in each CC by the CRS. The common reference signal is also referred to as a cell-specific reference signal.

(Background of NCT of Release 11)

In carrier aggregation, each CC can be assumed to be used by a legacy UE (that is, an existing UE) from the viewpoint of guarantee of backward compatibility. However, more effective definition of the CCs in which the legacy UE may not be used has started to be investigated. That is, definition of new CCs referred to as new carrier types (NCT) or additional carriers has started to be investigated.

The ultimate motivation for the NCT is to reduce overhead of the CCs. Overhead is radio resources other than radio resources used to transmit user data. That is, overhead is radio resources used for control. When overhead increases, the radio resources used to transmit user data may decrease. Therefore, the increase in overhead is not preferable. One cause of overhead is a CRS present in each CC in a downlink. This point will be described more specifically below with reference to FIG. 2.

Figure 2:
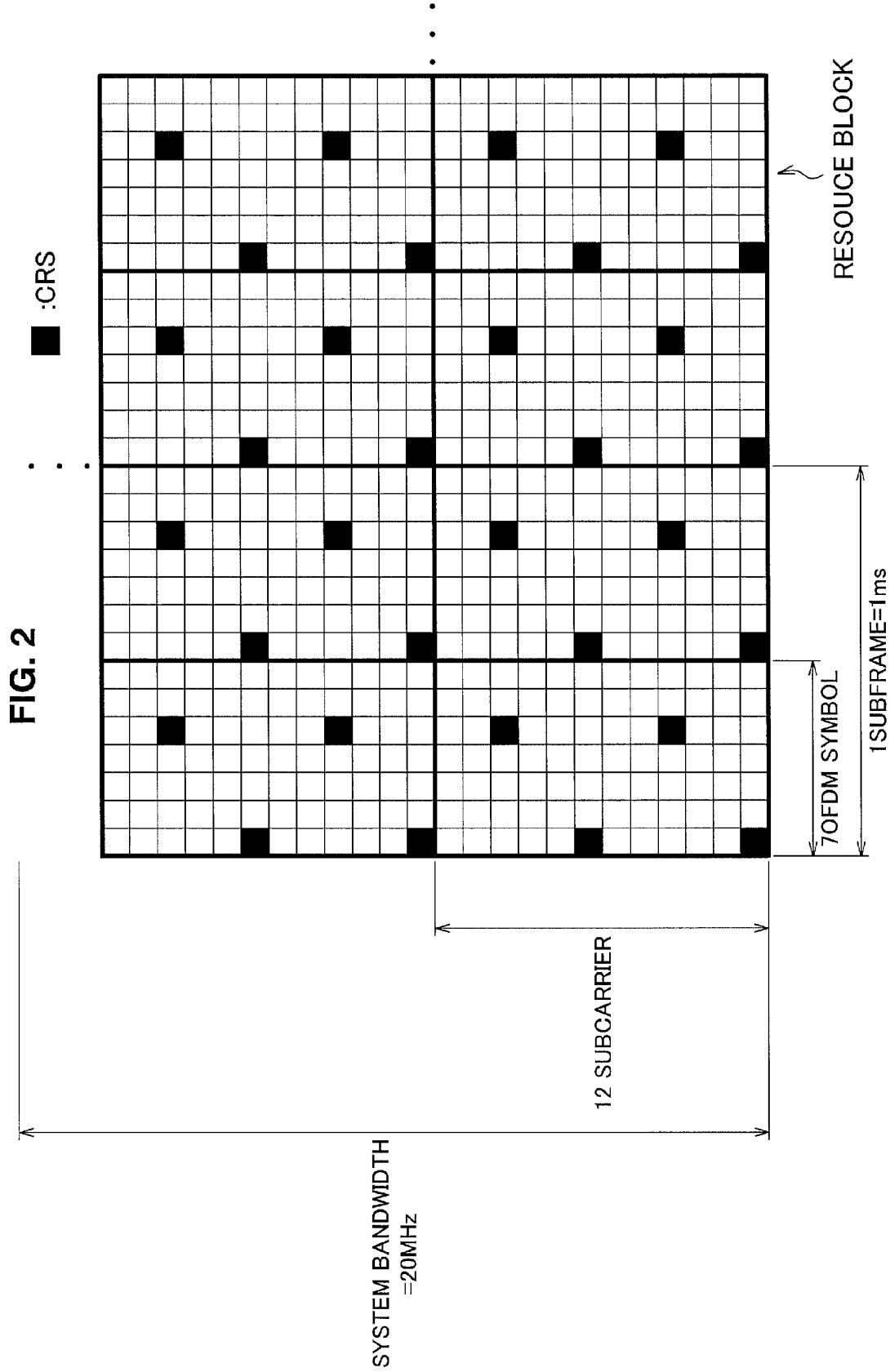
FIG. 2 is an explanatory diagram illustrating an example of a CRS transmitted with a CC on a downlink.

FIG. 2 is an explanatory diagram illustrating an example of a CRS transmitted with a CC on a downlink. Several radio resource blocks (RBs) corresponding to the CCs of 20 MHz are illustrated in FIG. 2. Each RB has a width of 12 subcarriers in a frequency direction and a width of 7 Orthogonal Frequency Division Multiplexing (OFDM) symbols in a time direction. The CRSs are transmitted with each RB. That is, the CRSs are transmitted with all of the RBs present across the bandwidth of the CCs in the frequency direction and present for each slot in the time direction. Accordingly, the CRS is transmitted with each CC and each subframe.

One objective of the CRS is to acquire a synchronization state of the UE. As synchronization, there is timing synchronization which is synchronization in the time direction and frequency synchronization which is synchronization in the frequency direction. The UE can acquire the synchronization state with high accuracy in the frequency direction and the time direction by the CRS. The synchronization state is continuously acquired with the CRS and is maintained.

Another objective of the CRS is that the UE properly demodulates a downlink signal. The UE demodulates different received signals based on the phases of the CRSs.

The common reference signal (CRS) is the most fundamental reference signal (RS) introduced in Release 8. On the other hand, at present, is are an intermittently transmitted RS such as a channel state information-reference signal (CSI-RS). The RS is used to demodulate a downlink signal. Accordingly, a current objective of the CRS is mainly to acquire a synchronization state of a UE. Therefore, when the synchronization state can be acquired, the interval at which the CRS is transmitted can also be decreased.

(Reduction in CRSs Investigated in NTC in Release 11)

Kinds of NCTs

As the NCTs investigated in Release 11, there are broadly two kinds of NCTs.

One of the two kinds of NCTs is an NCT that is synchronized with a legacy CC (that is, an existing CC). When the UE acquires a synchronization state in a legacy CC through a synchronization process in the legacy CC, the UE also acquires a synchronization state in the NCT synchronized with the legacy CC. Such an NCT is referred to as a synchronized NCT (hereinafter referred to as an "SNCT").

Here, the synchronization process is a process of performing frequency synchronization and timing synchronization by receiving the CRSs.

The other of the two kinds of NCTs is an NCT that is not synchronized with a legacy CC. The UE necessarily acquires a synchronization state in an NCT through the synchronization process in the NCT. Such an NCT is referred to as an unsynchronized NCT (hereinafter referred to as an "UNCT"). Since the synchronization process is necessary in the UNCT, the CRSs are transmitted in the UNCT.

As described above, as the NCT, there are the SNCT and the UNCT. Hereinafter, specific examples of the SNCT and the UNCT will be described with reference to FIG. 3.

Figure 3:
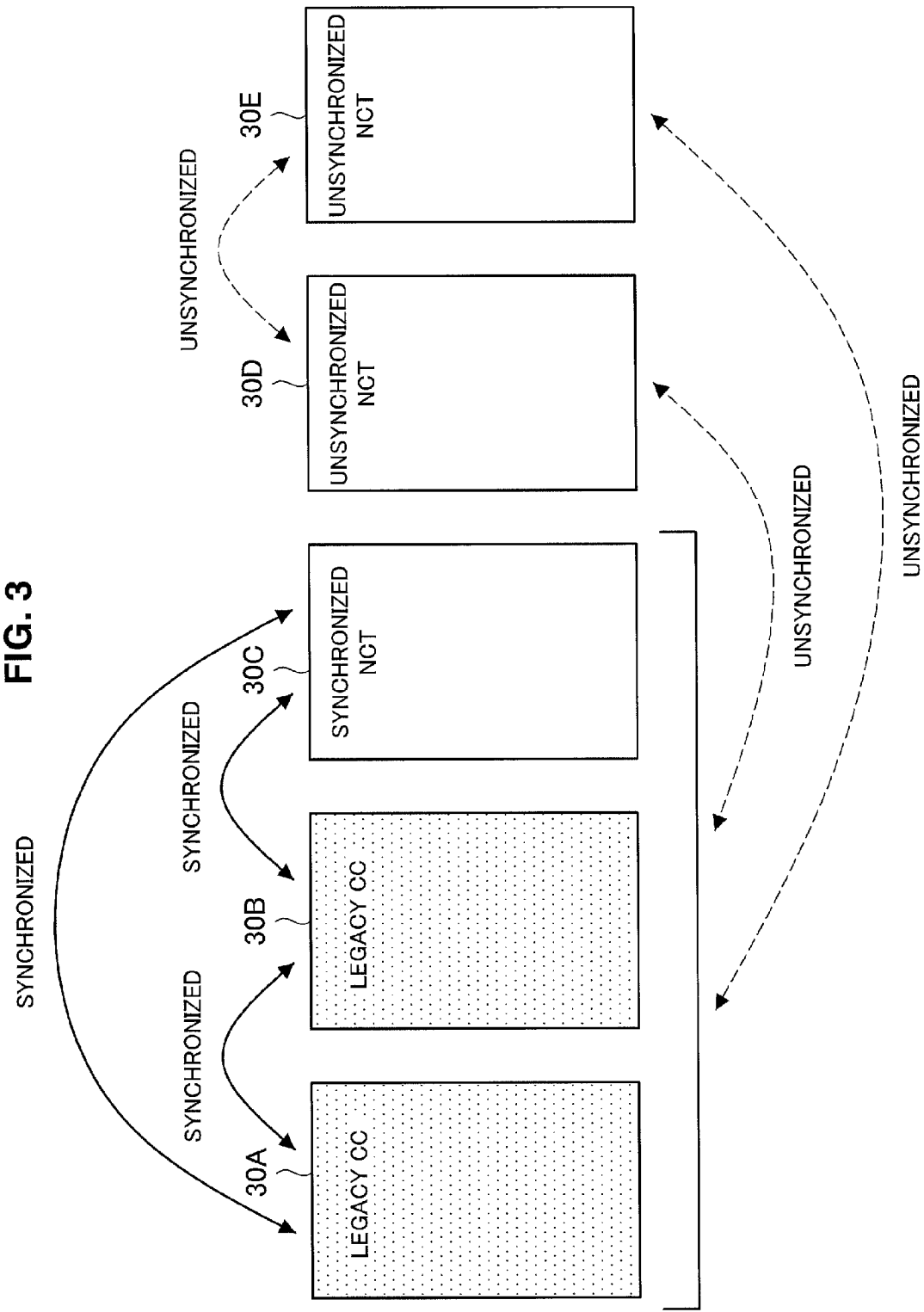
FIG. 3 is an explanatory diagram illustrating an example of an NCT. Five CCs 30 are illustrated in FIG. 3.

FIG. 3 is an explanatory diagram illustrating an example of the NCT. Five CCs 30 are illustrated in FIG. 3. Of the five CCs 30, a CC 30A and a CC 30B are legacy CCs. In this example, the CC 30A and the CC 30B are mutually synchronized. A CC 30C, a CC 30D, and a CC 30E are the NCTs. More specifically, the CC 30C is an SNCT that is synchronized with both of the CC 30A and the CC 30B which are the legacy CCs. The CC 30D and the CC 30E are UNCTs that are synchronized with neither the CC 30A nor the CC 30B. In this example, the CC 30D and the CC 30E are not mutually synchronized.

Reduction in CRSs in Unsynchronized NCT

Since the CRS transmitted with the legacy CC is transmitted not only to maintain the synchronization state but also to demodulate a received signal, the CRS is redundant. On the other hand, since the CIS-RS has been standardized as an RS for demodulation in releases after Release 10, it is possible to reduce the CRSs. Accordingly, an extent to which CRSs can be reduced while maintaining the synchronization state of the UE has been investigated. In particular, a reduction in the CRSs in the frequency direction and a reduction in the CRSs in the time direction have been investigated as the reduction in the CRSs of the unsynchronized NCT (that is, the UNCT).

As the reduction in the CRSs in the frequency direction, for example, the RBs with which the CRSs are transmitted is reduced to 6 RBs, 25 RBs, or 50 RBs. Hereinafter, this point will be described specifically with reference to FIG. 4.

Figure 4:
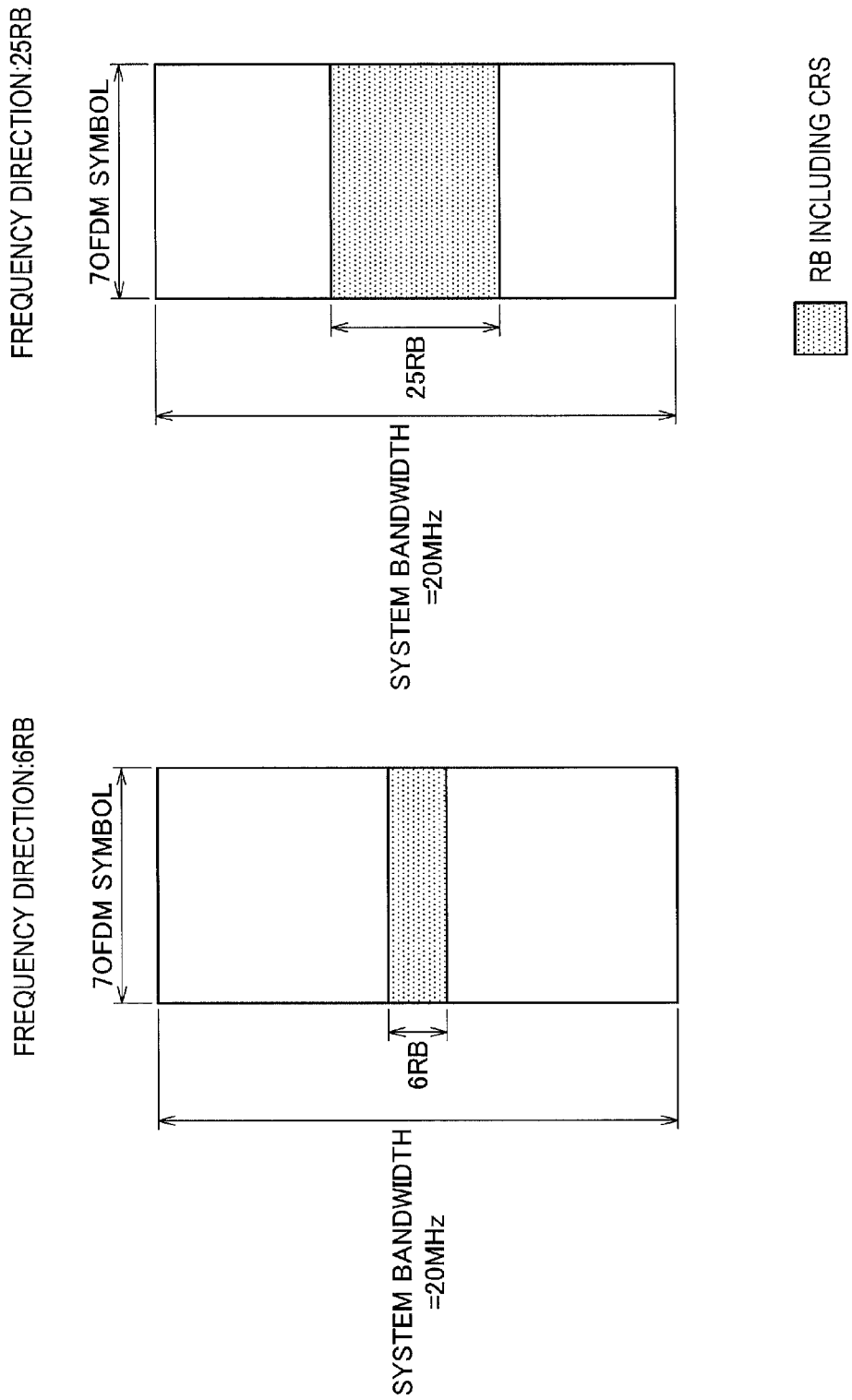
FIG. 4 is an explanatory diagram illustrating an example of a reduction in the CRSs in a frequency direction.

FIG. 4 is an explanatory diagram illustrating an example of a reduction in the CRSs in the frequency direction. A case in which the RBs with which the CRSs are transmitted are reduced to 6 RBs in the frequency direction and a case in which the RBs with which the CRSs are transmitted are reduced to 25 RBs in the frequency direction are illustrated in FIG. 4. In this way, not all of the CRSs in the RBs in the frequency direction are transmitted, but the CRSs in a limited number of the RBs are transmitted.

On the other hand, as the reduction in the CRSs in the time direction, for example, a transmission period of the CRSs is considered to be 5 ms or 10 ms. This point will be described specifically with reference to FIG. 5.

Figure 5:
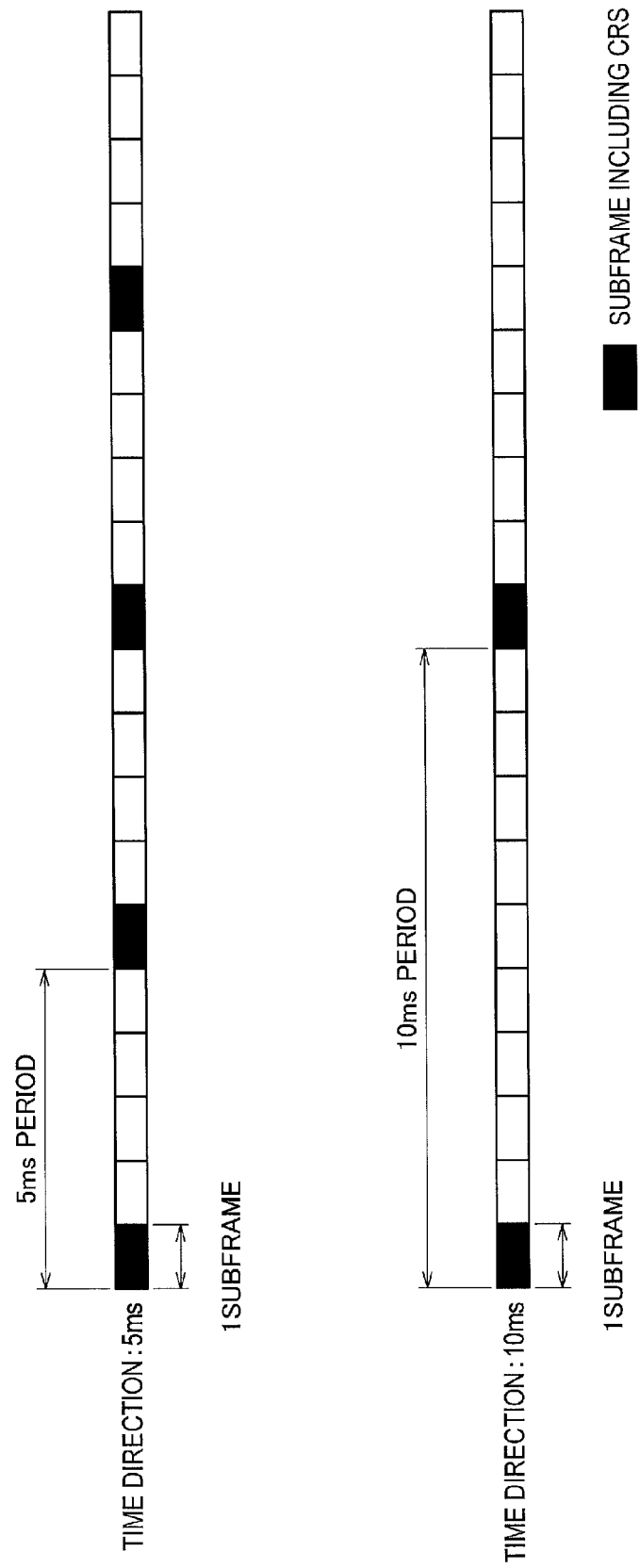
FIG. 5 is an explanatory diagram illustrating an example of a reduction of the CRS in the time direction.

FIG. 5 is an explanatory diagram illustrating an example of a reduction of the CRS in the time direction. A case in which the transmission period of the CRS is 5 ms and a case in which the transmission period of the CRS is 10 ms are illustrated in FIG. 5. In this way, not all of the CRSs of the slots or the subframes in the time direction are transmitted, but the CRSs of a limited number of the subframes are transmitted.

As described above, a method of combining the reductions in the CRSs in the frequency direction and the reductions in the CRSs in the time direction has been investigated. As an evaluation of whether a synchronization state is maintained, whether accuracy of about 500 Hz is maintained in an environment of an SNR of −8 dB was evaluated. As a result, in the environment of an SNR of −8 dB, it is necessary to transmit the CRS with 25 RBs every 5 ms.

Reduction in CRSs in Synchronized NCT

On the other hand, since the synchronized NCT (SNCT) is synchronized with the legacy CC, the existing CRSs can be basically deleted in the SNCT.

(Synchronization Monitoring Procedure)

The UE monitors whether the UE is in a synchronization state based on a block error rate (BLER) of a physical downlink control channel (PDCCH). In other words, the UE detects synchronization deviation of the UE based on the BLER of the PDCCH. For example, when the BLER of the PDCCH is equal to or greater than 10%, the UE detects the synchronization deviation.

When the synchronization deviation is detected a predetermined number of times, a timer starts. Then, when a period of time of the timer expires, radio link failure (RLF) is recognized. When the RLF is recognized, the UE stops all of the transmission within 40 ms from the recognition of the RLF in order to avoid interference with another UE. Thereafter, the UE performs a procedure of RRC reestablishment including cell selection and random access.

The UE performs the above-described synchronization monitoring on the PCC, but does not perform the synchronization monitoring on the SCC. The UE deactivates the SCC when the PDCCH is not detected in the SCC.

2. SCHEMATIC CONFIGURATION OF RADIO COMMUNICATION SYSTEM

Figure 6:
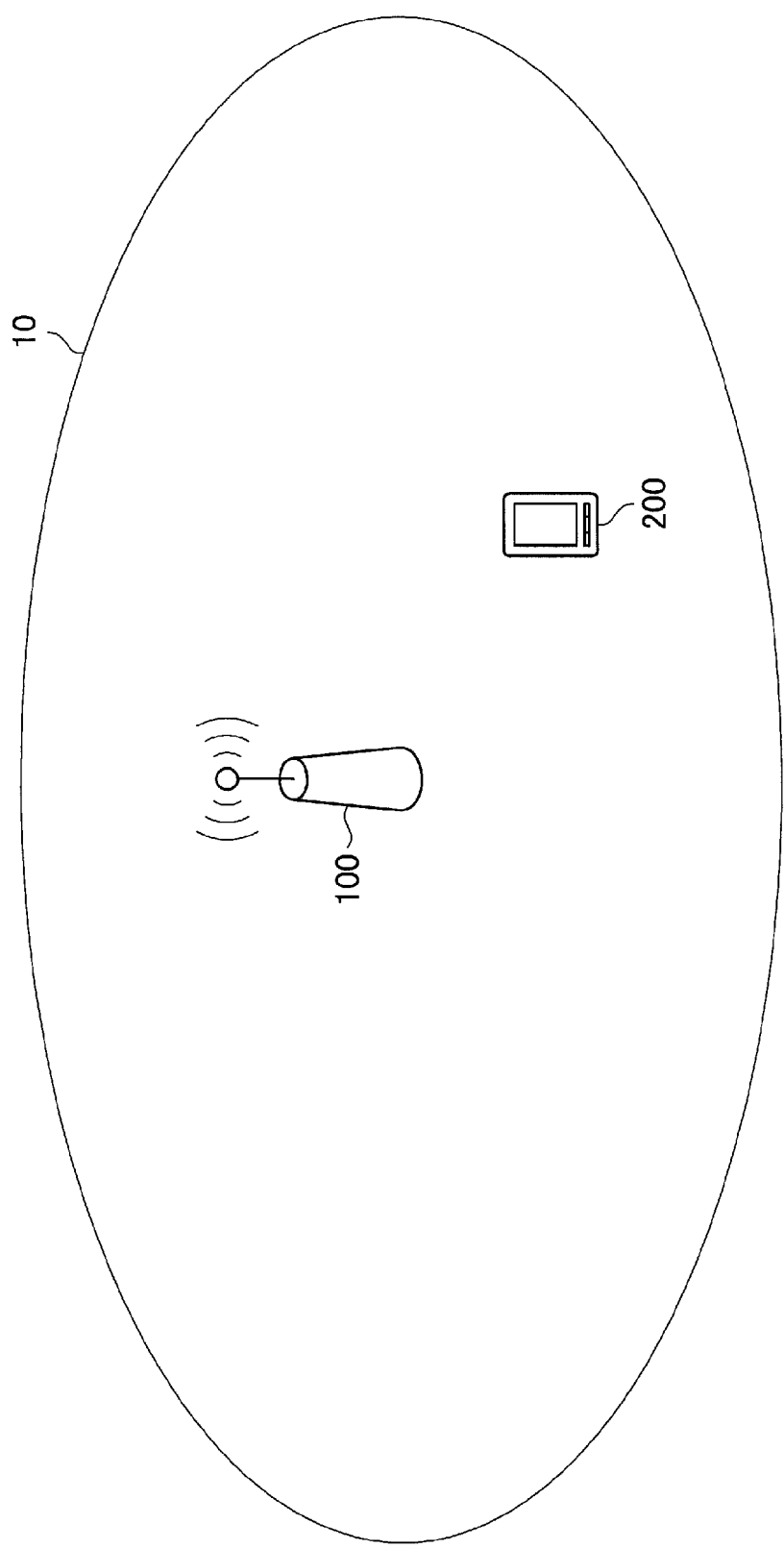
FIG. 6 is an explanatory diagram illustrating an example of a schematic configuration of a radio communication system according to a first embodiment.

Next, a schematic configuration of a radio communication system according to a first embodiment of the present disclosure will be described with reference to FIG. 6. FIG. 6 is an explanatory diagram illustrating an example of the schematic configuration of the radio communication system according to the first embodiment of the present disclosure. The radio communication system is a radio communication system that conforms to, for example, a series of communication standards of Long Term Evolution (LTE). Referring to FIG. 6, the radio communication system includes an eNodeB 100 and a UE 200.

The eNodeB 100 performs radio communication with the UE 200 located within a cell 10. For example, the eNodeB 100 performs the radio communication using a plurality of component carriers (CCs).

For example, the eNodeB 100 can simultaneously use the plurality of CCs to perform the radio communication with one UE 200. That is, the eNodeB 100 supports carrier aggregation.

In particular, in the first embodiment, the plurality of CCs include one or more CCs with which the CRSs are not transmitted in at least one of the subframes which are units of time in the radio communication. More specifically, for example, the plurality of CCs include one or more NCTs.

The UE 200 performs the radio communication with the eNodeB 100 of the cell 10. For example, the UE 200 can simultaneously use the plurality of CCs in the radio communication. Specifically, for example, the UE 200 can perform the radio communication with the eNodeB 100 of the cell 10 using the plurality of CCs simultaneously. That is, the UE 200 supports carrier aggregation.

Hereinafter, specific contents will be described in <<<3. First embodiment>>> and <<<4. Second embodiment>>>.

3. FIRST EMBODIMENT

Next, a first embodiment of the present disclosure will be described with reference to FIGS. 7 to 28.

3.1. OVERVIEW

First, an overview of the first embodiment of the present disclosure will be described.

In Release 11 of 3GPP, as described above, NCTs have been investigated as new component carriers apart from legacy CCs (existing CCs) capable of maintaining backward compatibility. Here, the NCTs are assumed to be new types of CCs and the types of CCs. Further, an NCT (SNCT) synchronized with the existing CC and an NCT (UNCT) not synchronized with the LCC have been investigated as the NCTs.

Since the SNCT is synchronized with any legacy CC. Therefore, when a UE acquires a synchronization state of the UE in one CC between the mutually synchronized SNCT and legacy CC, information regarding the synchronization state can be used in the other CC. That is, the UE may not acquire the synchronization state of the UE in the other CC. When the UE monitors the synchronization state of the UE in one CC between the mutually synchronized SNCT and legacy CC, a monitoring result of the synchronization state can be used in the other CC. That is, the UE may not monitor the synchronization state of the UE in the other CC.

The UNCT is not synchronized with any legacy CC, but can be synchronized with another UNCT. Therefore, when the UE acquires the synchronization state of the UE in one CC among two or more mutually synchronized UNCTs, information regarding the synchronization state can be used in the other CC. That is, the UE may not acquire the synchronization state of the UE in the other CC. When the UE monitors the synchronization state of the UE in one CC among two or more mutually synchronized UNCTs, a monitoring result of the synchronization state can be used in the other CC. That is, the UE may not monitor the synchronization state of the UE in the other CC.

However, in order for the UE to use the information regarding the synchronization state of the UE in a certain CC for another CC, there is a concern of a large load being applied to the UE.

For example, since a frequency band separate from the SNCT can be present in the legacy CC, the SNCT is not synchronized with all of the legacy CCs. Therefore, the UE verifies the synchronization between the SNCT and each of a plurality of legacy CCs in order to use the information regarding the synchronization state of the UE in the legacy CC for the SNCT. The verification includes confirming whether data can be received in the NCT without an error in the NCT, for example, using the information regarding the synchronization state of the UE in the plurality of legacy CCs. In this way, a large load is applied to the UE.

For example, there is a possibility of the UNCT being synchronized with another UNCT, but not all of the UNCTs are necessarily synchronized. Therefore, the UE verifies the synchronization between the UNCTs in order to use the information regarding the synchronization state of the UE in a certain UNCT for another UNCT. The verification includes confirming whether data can be received in another UNCT without an error, for example, using the information regarding the synchronization state of the UE in the plurality of UNCTs. In this way, a large load may be applied to the UE.

Originally, when the UE does not use the information regarding the synchronization state of the UE in a certain CC for another CC, the UE acquires the synchronization state of the UE in each CC and necessarily monitors the synchronization state of the UE in each CC. In this way, a large load is applied to the UE.

Accordingly, in the first embodiment of the present disclosure, it is possible to reduce the load on the UE in carrier aggregation.

Specifically, according to the first embodiment, the plurality of CCs used for the radio communication include one or more CCs with which the CRSs are not transmitted in at least one of the subframes. More specifically, for example, the one or more CCs are one or more NCTs. Further, an eNodeB 100-1 transmits synchronization relation information indicating which CCs are mutually synchronized among the plurality of CC to a UE 100-1.

3.2. SPECIFIC EXAMPLE OF SYNCHRONIZATION RELATION INFORMATION

Next, a specific example of the synchronization relation information transmitted from the eNodeB to the UE will be described with reference to FIGS. 7 to 20.

(Synchronization Relation Between Legacy CC and Synchronized NCT)

As described above, the plurality of CCs used for the radio communication includes one or more frequency bands with which the CRSs are not transmitted in at least one of the subframes. Further, for example, the plurality of CCs include one or more different CCs with which the CRSs are transmitted in each subframe. More specifically, for example, the plurality of CCs include one or more NCTs and one or more legacy CCs. Hereinafter, this point will be described more specifically with reference to FIG. 7.

Figure 7:
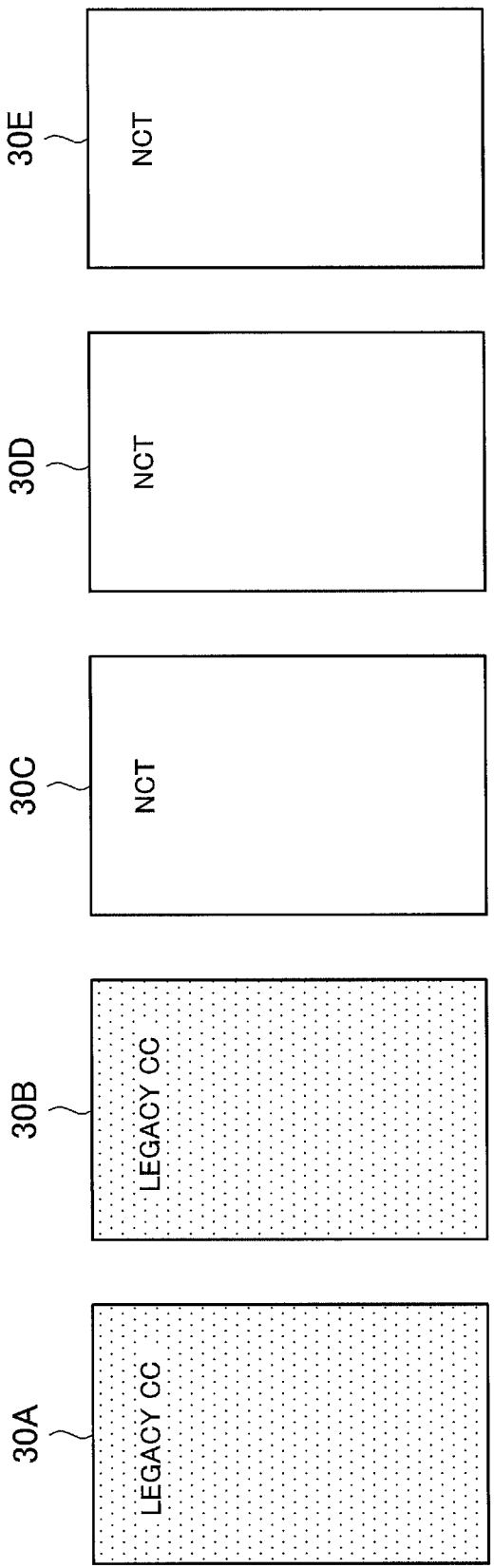
FIG. 7 is an explanatory diagram illustrating an example of the details of a plurality of CCs used for radio communication.

FIG. 7 is an explanatory diagram illustrating an example of the details of the plurality of CCs used for the radio communication. Five CCs 30 used for the radio communication are illustrated in FIG. 7. For example, the CCs 30 are used for the radio communication in the cell 10. Of the five CCs 30, the CC 30A and the CC 30B are legacy CCs. The CC 30C, the CC 30D, and the CC 30E are NCTs.

For example, the synchronization relation information at least indicates which frequency band among one or more frequency bands is synchronized with which frequency band among the one or more different frequency bands. More specifically, for example, the synchronization relation information at least indicates which NCT among one or more NCTs is synchronized with which legacy CC among one or more legacy CCs. In other words, the synchronization relation information indicates a synchronization relation between the NCT and the legacy CC.

For example, the one or more CCs include one or more synchronized frequency bands synchronized with any one of the one or more different frequency bands. The synchronization relation information at least indicates which frequency band among the one or more synchronized frequency bands is synchronized with which frequency band among the one or more different frequency bands. More specifically, for example, the one or more NCTs include one or more synchronized NCTs (that is, the SNCTs). The synchronization relation information at least indicates which SNCT among one or more SNCTs is synchronized with which legacy CC among one or more legacy CCs. In other words, the synchronization relation information indicates a synchronization relation between the SNCT and the legacy CC. Hereinafter, a first specific example of this point will be described with reference to FIGS. 8 and 9 and a second specific example of this point will be described with reference to FIGS. 10 and 11.

Figure 8:
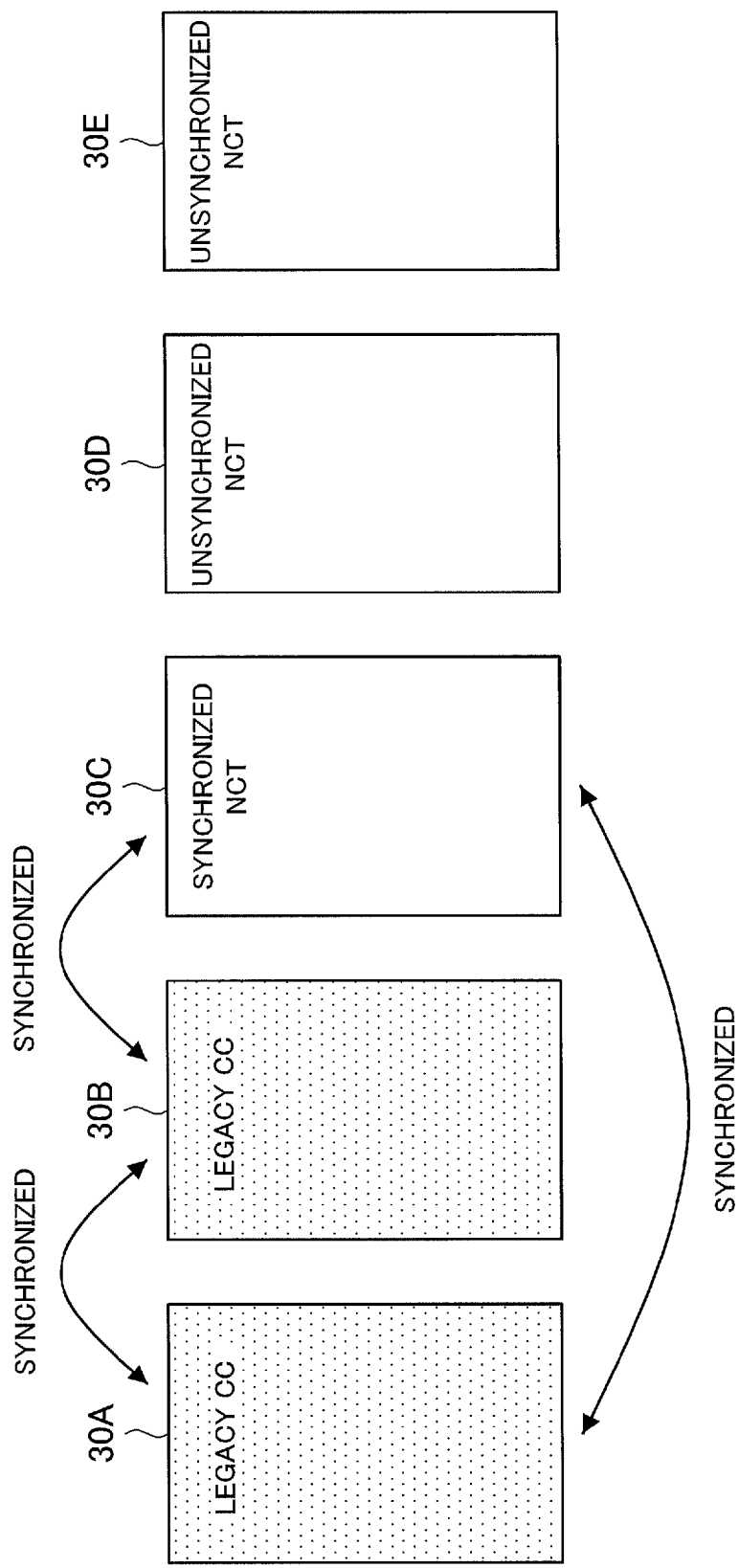
FIG. 8 is an explanatory diagram illustrating a first example of a synchronization relation between synchronized NCTs and legacy CCs.

FIG. 8 is an explanatory diagram illustrating the first example of the synchronization relation between the synchronized NCT and the legacy CC. FIG. 8, like FIG. 7, illustrates two legacy CCs and three NCTs. More specifically, the CC 30C is the synchronized NCT (that is, the SNCT) synchronized with any legacy CC. In this example, the CC 30C is synchronized with both of the CC 30A and the CC 30B which are the legacy CCs. The CC 30D and the CC 30E are the unsynchronized NCTs (that is, the UNCTs) which are not synchronized with any legacy CC.

FIG. 9 is an explanatory diagram illustrating an example of synchronization relation information corresponding to the first example of the synchronization relation illustrated in FIG. 8. Information indicating the synchronization relation between the legacy CCs and the SNCTs is illustrated as a table in FIG. 9. In the example of FIG. 8, the CC 30C which is the SNCT is synchronized with both of the CC 30A and the CC 30B which are the legacy CCs. Accordingly, as illustrated in FIG. 9, SYNC indicating synchronization is shown in a field corresponding to the CC 30C and the CC 30A and a field corresponding to the CC 30C and the CC 30B. In this way, for example, the synchronization relation information indicates the synchronization relation between the SNCT and the legacy CC. In FIG. 9, the synchronization relation information is illustrated as the table for description, but the synchronization relation information can be any type of information indicating the synchronization relation between the CCs. The same also applies to the subsequent drawings.

Figure 10:
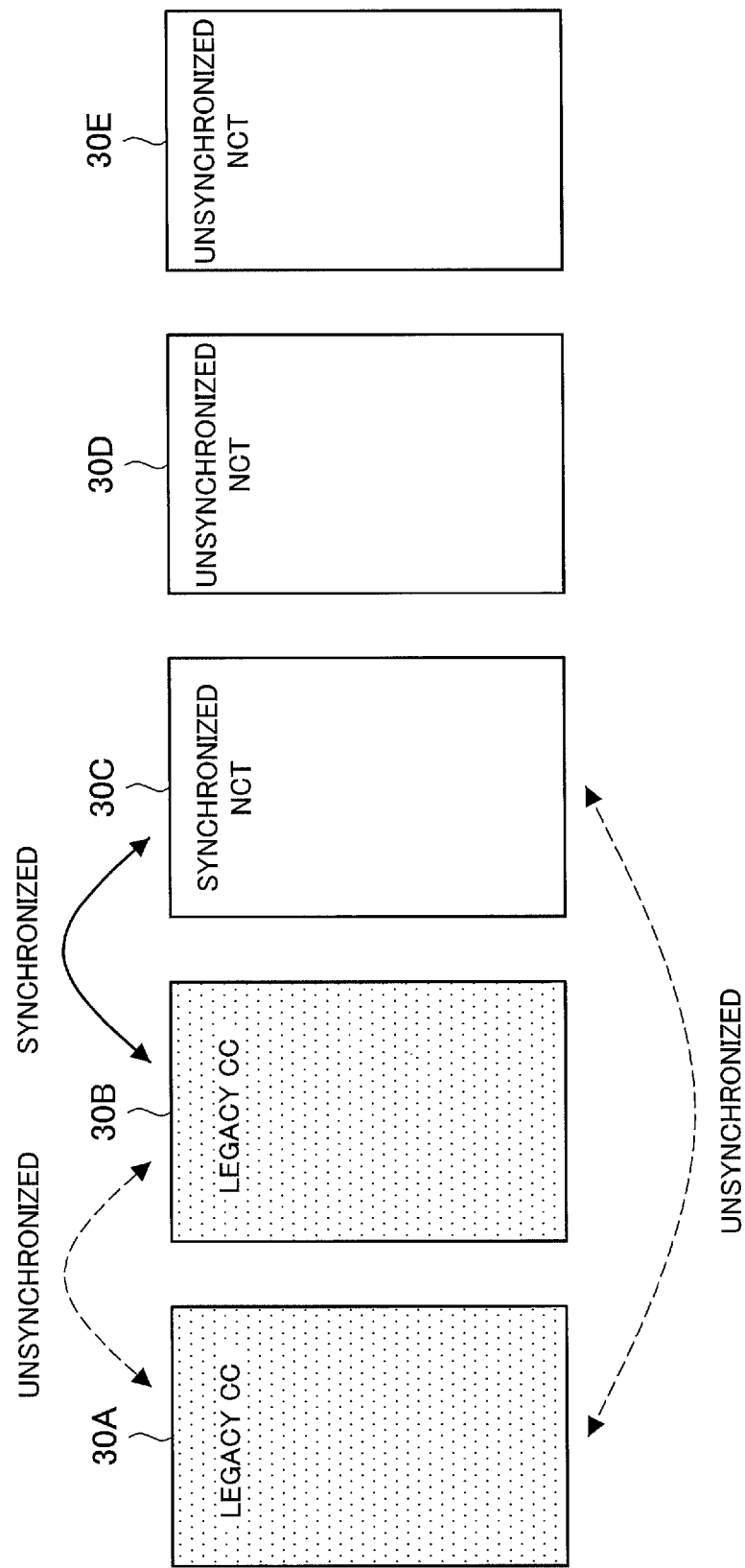
FIG. 10 is an explanatory diagram illustrating a second example of the synchronization relation between the synchronized NCTs and the legacy CCs.

FIG. 10 is an explanatory diagram illustrating the second example of the synchronization relation between the synchronized NCT and the legacy CC. As illustrated in FIG. 10, in this example, the CC 30A and the CC 30B which are the legacy CCs are not mutually synchronized. The CC 30C is synchronized with the CC 30B which is the legacy CC, but is not synchronized with the CC 30A which is the legacy CC.

Figure 11:
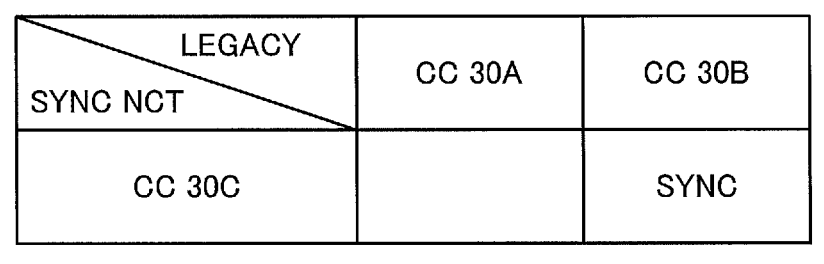

FIG. 11 is an explanatory diagram illustrating an example of synchronization relation information corresponding to the second example of the synchronization relation illustrated in FIG. 10.

In the example of FIG. 10, the CC 30C which is the SNCT is synchronized with the CC 30B which is the legacy CC, but is not synchronized with the CC 30A which is the legacy CC. Accordingly, as illustrated in FIG. 11, SYNC indicating the synchronization is shown only in a field corresponding to the CC 30C and the CC 30B. In this way, for example, the synchronization relation information indicates the synchronization relation between the SNCT and the legacy CC.

In the examples of FIGS. 9 and 11, the synchronization relation information indicates only the synchronization relation between the SNCT and the legacy CCs, but the first embodiment is not limited thereto. The synchronization relation information may also indicate a synchronization relation between the NCT and the legacy CC. That is, the synchronization relation information may also indicate with which legacy CC each NCT is synchronized. In this case, the NCT which is not synchronized with any legacy CC in the synchronization relation information is the UNCT. The NCT which is synchronized with any one legacy CC in the synchronization relation information is the SNCT.

By transmitting such synchronization relation information, it is not necessary for the UE 200-1 to separately verify with which legacy CC the SNCT is synchronized. For example, the UE 200-1 can use the information regarding the synchronization state in the legacy CC synchronized with the SNCT in the SNCT. In this way, it is possible to reduce the load on the UE 200-1.

(Synchronization Relation Between UNCTs)

For example, the synchronization relation information at least indicates which frequency bands are mutually synchronized among the one or more frequency bands. More specifically, for example, the synchronization relation information at least indicates which NCTs are mutually synchronized among the foregoing one or more NCTs. In other words, the synchronization relation information indicates the synchronization relation between the NCTs.

For example, the plurality of CCs include one or more different CCs with which the CRSs are transmitted in each subframe. The one or more CCs include two or more unsynchronized frequency bands which are synchronized with none of the one or more different frequency bands. The synchronization relation information at least indicates which frequency bands are mutually synchronized among the two or more unsynchronized frequency bands. Specifically, for example, the plurality of CCs include one or more legacy CCs and the one or more NCTs include two or more unsynchronized CCs (that is, the UNCTs) synchronized with none of the one or more legacy CCs. The synchronization relation information at least indicates which UNCTs are mutually synchronized among two or more UNCTs. In other words, the synchronization relation information indicates the synchronization relation between the UNCTs. Hereinafter, a first specific example of this point will be described with reference to FIGS. 12 and 13 and a second specific example of this point will be described with reference to FIGS. 14 and 15.

Figure 12:
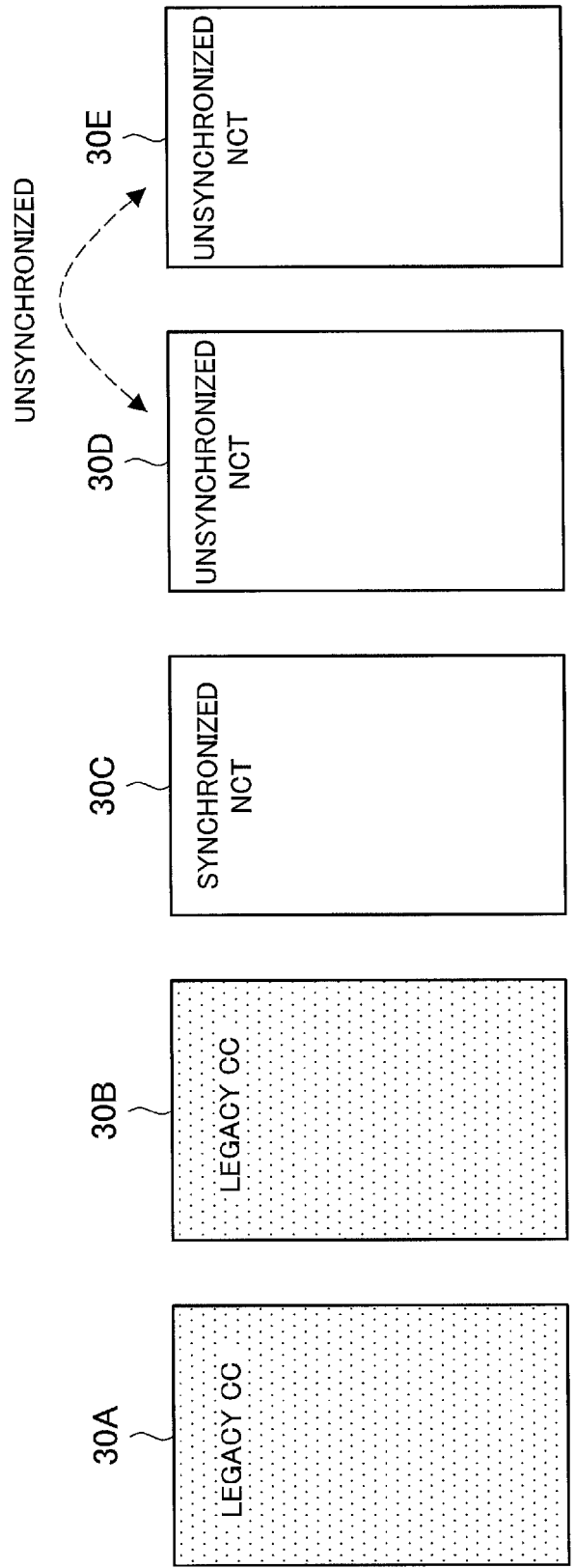
FIG. 12 is an explanatory diagram illustrating a first example of a synchronization relation between unsynchronized NCTs.

FIG. 12 is an explanatory diagram illustrating the first example of the synchronization relation between unsynchronized NCTs. FIG. 12, like FIG. 7, illustrates two legacy CCs and three NCTs. More specifically, the CC 30D and the CC 30E are unsynchronized NCTs (that is, the UNCTs) which are not synchronized with any legacy CC. In this example, the CC 30D and the CC 30E are not mutually synchronized. The CC 30C is the synchronized NCT (that is, the SNCT) synchronized with one legacy CC.

FIG. 13 is an explanatory diagram illustrating an example of synchronization relation information corresponding to the first example of the synchronization relation illustrated in FIG. 12. Information indicating the synchronization relation between the UNCTs is illustrated as a table in FIG. 13. In the example of FIG. 12, the CC 30D and the CC 30E which are the UNCTs are not mutually synchronized. Accordingly, as illustrated in FIG. 13, SYNC indicating the synchronization is not shown in a field corresponding to the CC 30D and the CC 30E. In this way, for example, the synchronization relation information indicates the synchronization relation between the UNCTs.

Figure 14:
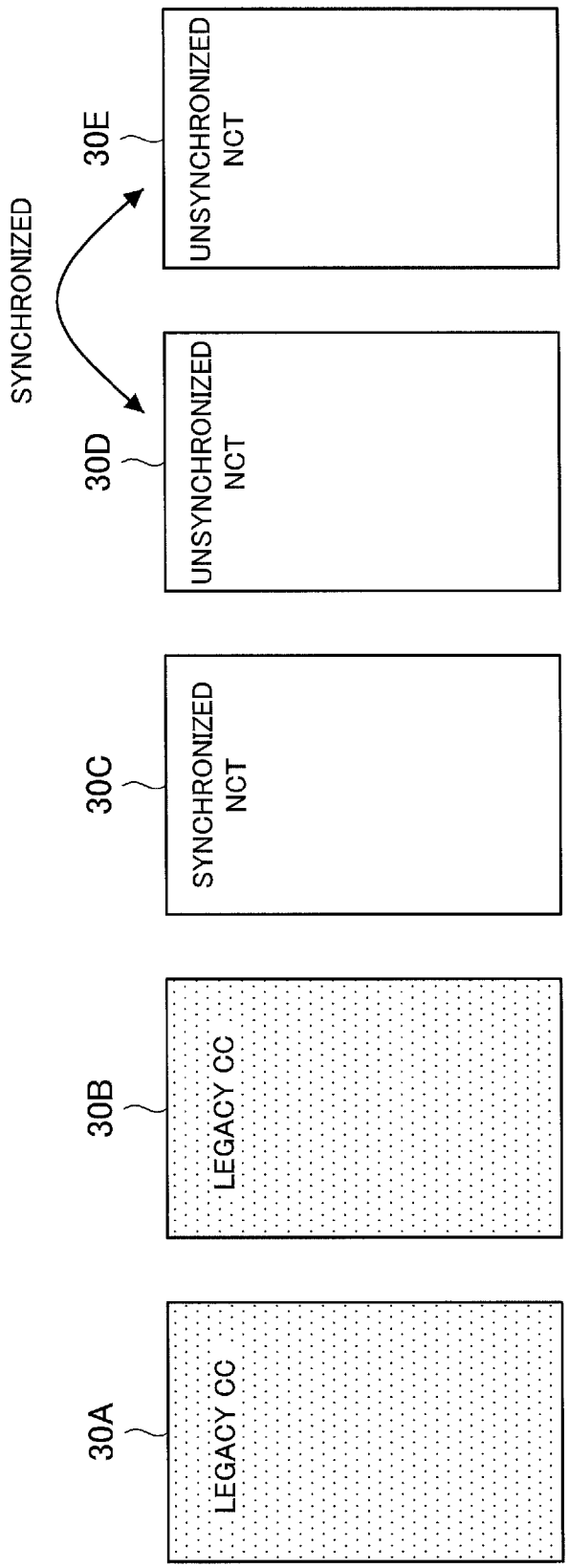
FIG. 14 is an explanatory diagram illustrating the second example of the synchronization relation between the unsynchronized NCTs.

FIG. 14 is an explanatory diagram illustrating the second example of the synchronization relation between the unsynchronized NCTs. As illustrated in FIG. 14, in this example, the CC 30D and the CC 30E are mutually synchronized.

FIG. 15 is an explanatory diagram illustrating an example of synchronization relation information corresponding to the second example of the synchronization relation illustrated in FIG. 14. In the example of FIG. 14, the CC 30D and the CC 30E which are the UNCTs are mutually synchronized. Accordingly, as illustrated in FIG. 15, SYNC indicating the synchronization is shown in a field corresponding to the CC 30D and the CC 30E. In this way, for example, the synchronization relation information indicates a synchronization relation between the UNCTs.

By transmitting such synchronization relation information, it is not necessary for the UE 200-1 to separately verify which UNCT is synchronized with which UNCT. For example, the UE 200-1 can use the information regarding the synchronization state in one UNCT for another UNCT synchronized with the UNCT. In this way, it is possible to reduce the load on the UE 200-1.

(Synchronization Relations Between all CCs)

The examples of the synchronization relation information indicating the synchronization relation between the legacy CC and the SNCT and the synchronization relation between the UNCTs have been described above. The synchronization relation may be indicated in synchronization relation information indicating a synchronization relation between all of the CCs. Hereinafter, a specific example of this point will be described with reference to FIGS. 16 and 17.

Figure 16:
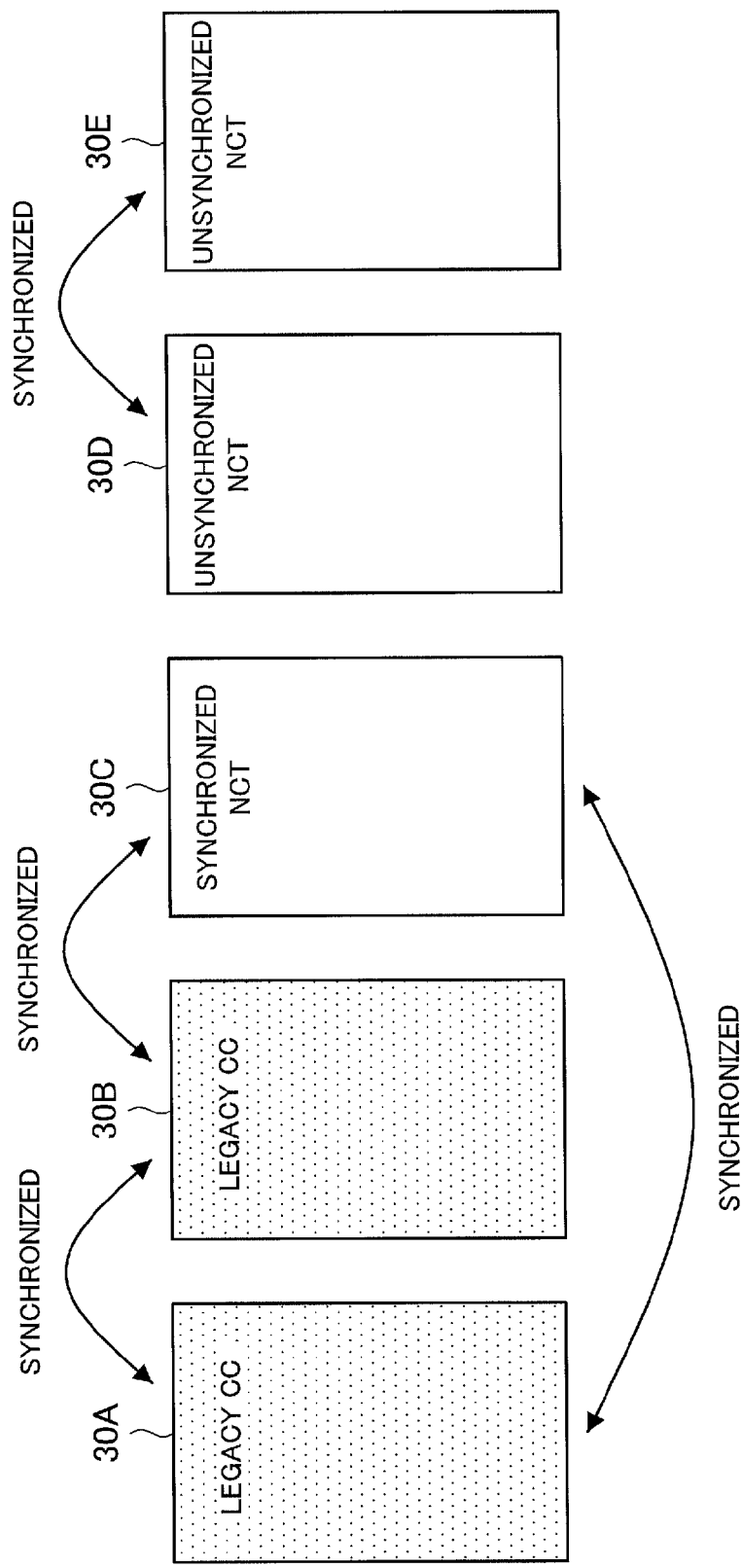
FIG. 16 is an explanatory diagram illustrating an example of synchronization relations between all of the CCs.

FIG. 16 is an explanatory diagram illustrating an example of the synchronization relations between all of the CCs. Referring to FIG. 16, for example, the CC 30A which is the legacy CC, the CC 30B which is the legacy CC, and the CC 30C which is the SNCT are mutually synchronized. The CC 30D and the CC 30E which are the UNCTs are mutually synchronized.

FIG. 17 is an explanatory diagram illustrating an example of synchronization relation information corresponding to the example of the synchronization relation illustrated in FIG. 16. The synchronization relations between all of the CCs are illustrated in FIG. 17. In this example, SYNC indicating the synchronization is shown in a field corresponding to the CC 30A and the CC 30B, a field corresponding to the CC 30A and the CC 30C, a field corresponding to the CC 30B and the CC 30C, and a field corresponding to the CC 30D and the CC 30E. In this way, for example, the synchronization relation information indicates the synchronization relations between the CCs.

(Synchronization Relations Between NCTs in which there is No Legacy CC)

The example in which the plurality of CCs used for the radio communication include the legacy CCs has been described above, but the legacy CC may not be included in the plurality of CCs. That is, each of the plurality of CCs may be the CC with which the CRS is not transmitted in at least one subframe. That is, each of the plurality of CCs may be the NCT. Hereinafter, this point will be described more specifically with reference to FIG. 18.

Figure 18:
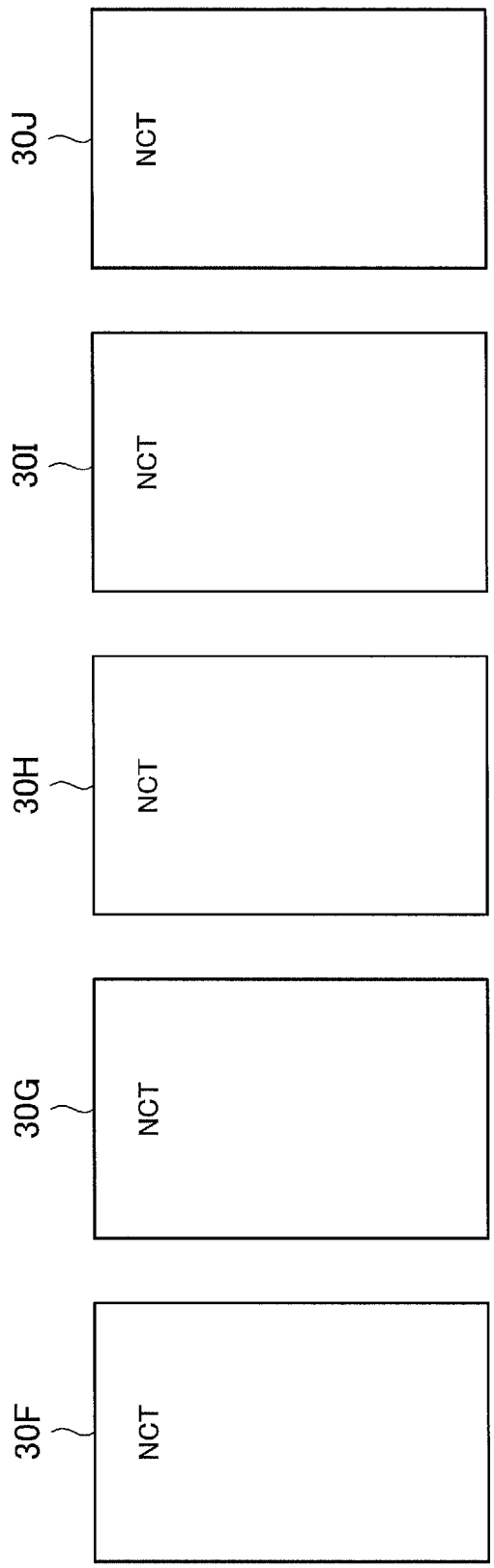
FIG. 18 is an explanatory diagram illustrating another example of the details of the plurality of CCs used for the radio communication.

FIG. 18 is an explanatory diagram illustrating another example of the details of the plurality of CCs used for the radio communication. Five CCs 30 used for the radio communication are illustrated in FIG. 18. For example, the CCs 30 are used for the radio communication in the cell 10. The five CCs 30 are each the NCT.

The synchronization relation information indicates which CCs are mutually synchronized among the plurality of CCs. That is, in this example, the synchronization relation information indicates which NCTs are mutually synchronized among the plurality of NCTs. Hereinafter, a specific example of this point will be described with reference to FIGS. 19 and 20.

Figure 19:
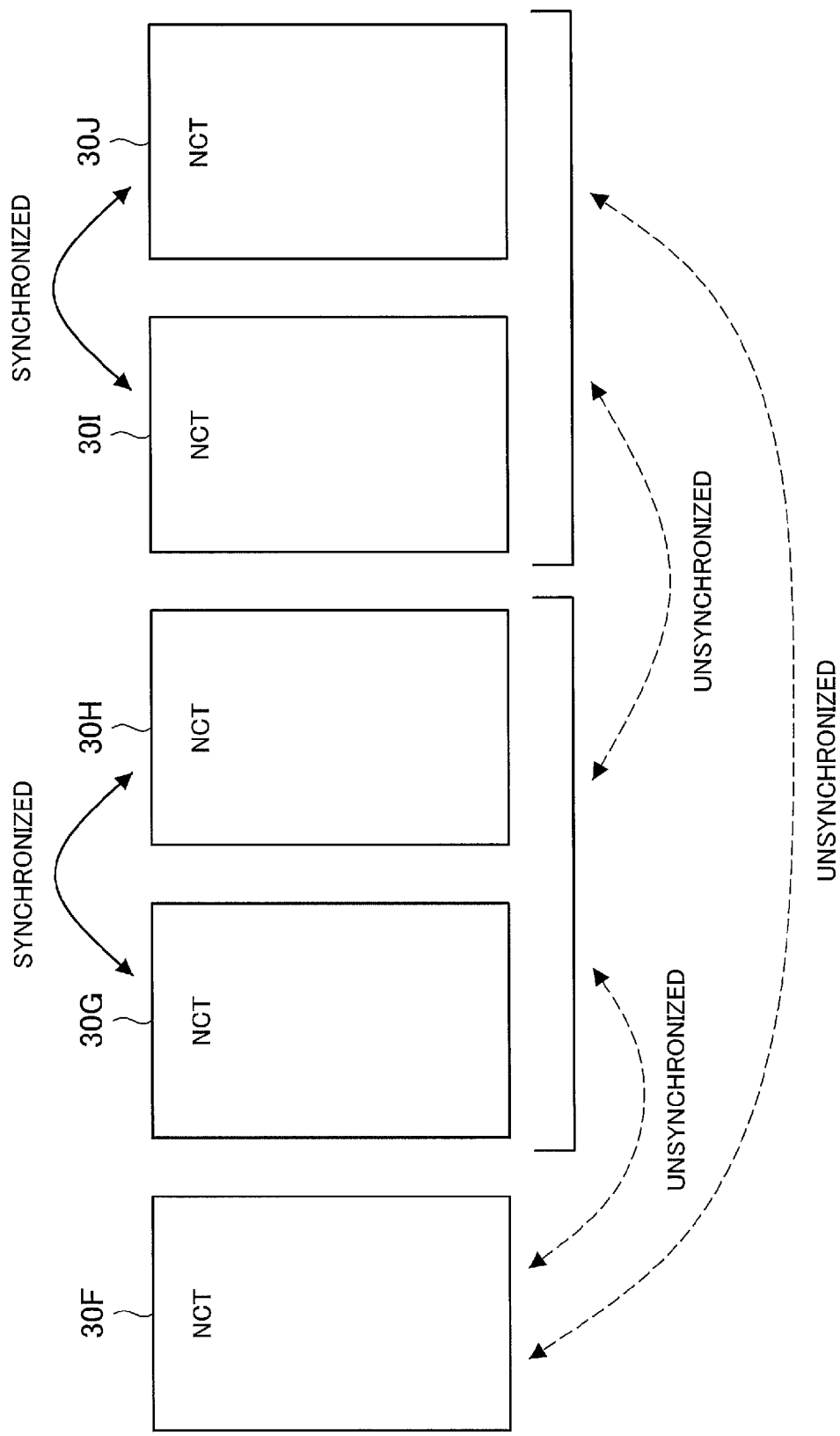
FIG. 19 is an explanatory diagram illustrating an example of synchronization relations between the NCTs.

FIG. 19 is an explanatory diagram illustrating an example of synchronization relations between the NCTs. FIG. 19, like FIG. 18, illustrates five CCs which are the NCTs. In this example, a CC 30G and a CC 30H are mutually synchronized. A CC 30I and a CC 30J are mutually synchronized. Other combinations of the CCs are not mutually synchronized.

FIG. 20 is an explanatory diagram illustrating an example of synchronization relation information corresponding to the example of the synchronization relations illustrated in FIG. 19. Synchronization relations between all of the CCs are illustrated in FIG. 20. In this example, SYNC indicating the synchronization is shown in a field corresponding to the CC 30G and the CC 30H and a field corresponding to the CC 30I and the CC 30J. In this way, for example, the synchronization relation information indicates the synchronization relations between the CCs.

By transmitting such synchronization relation information, it is not necessary for the UE 200-1 to separately verify which NCT is synchronized with which NCT. For example, the UE 200-1 can use the information regarding the synchronization state in one NCT for another NCT synchronized with the NCT. In this way, it is possible to reduce the load on the UE 200-1.

3.3. CONFIGURATION OF EACH DEVICE

Next, examples of the configurations of the eNodeB 100-1 and the UE 200-1 according to the first embodiment of the present disclosure will be described.

<3.3.1. Configuration of eNodeB>

Figure 21:
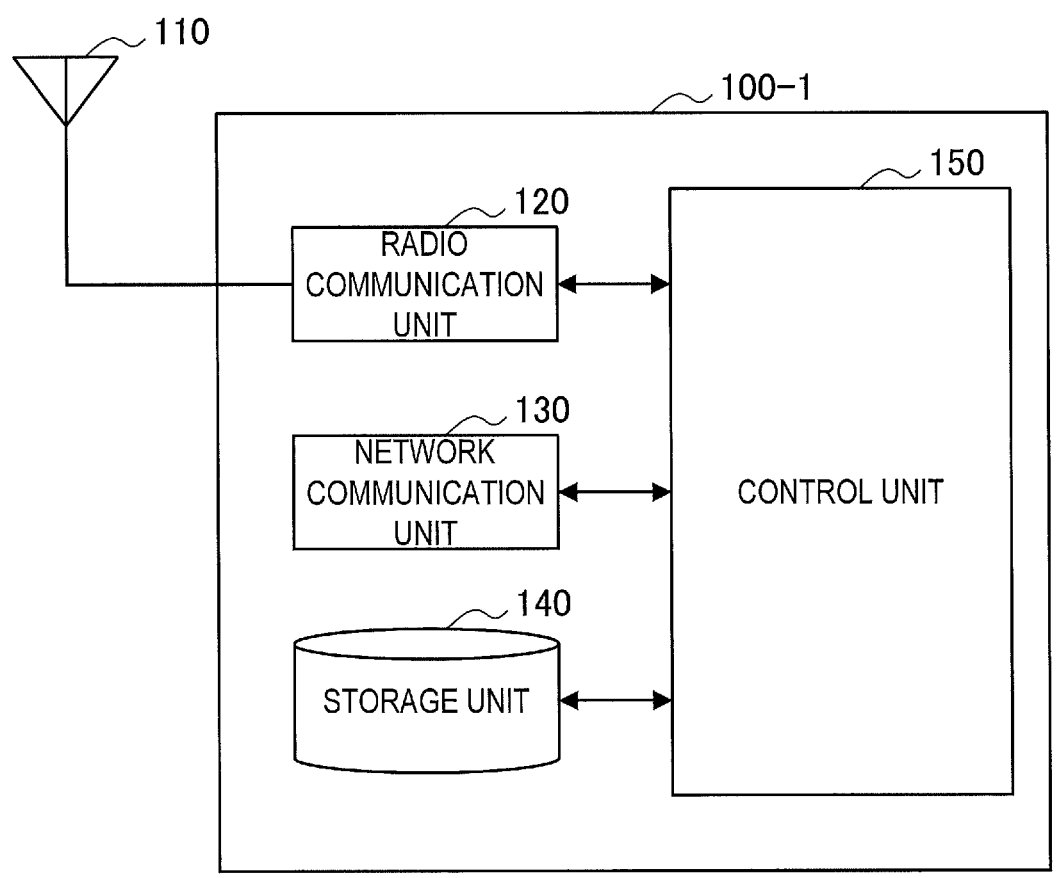
FIG. 21 is a block diagram illustrating an example of the configuration of an eNodeB according to the first embodiment.

First, an example of the configuration of the eNodeB 100-1 according to the first embodiment of the present disclosure will be described with reference to FIG. 21. FIG. 21 is a block diagram illustrating an example of the configuration of the eNodeB 100-1 according to the first embodiment of the present disclosure. Referring to FIG. 21, the eNodeB 100-1 includes an antenna unit 110, a radio communication unit 120, a network communication unit 130, a storage unit 140, and a control unit 150.

(Antenna Unit 110)

The antenna unit 110 receives a radio signal and outputs the received radio signal to the radio communication unit 120. The antenna unit 110 transmits a transmission signal output by the radio communication unit 120.

(Radio Communication Unit 120)

The radio communication unit 120 performs radio communication with the UE 200-1 located within the cell 10. For example, the radio communication unit 120 performs the radio communication simultaneously using the plurality of CCs.

For example, the radio communication unit 120 can perform the radio communication with one UE 200 simultaneously using the plurality of CCs. That is, the eNodeB 100 supports carrier aggregation.

(Network Communication Unit 130)

The network communication unit 130 communicates with another communication node. For example, the network communication unit 130 communicates with another eNodeB, a mobility management entity (MME), or the like.

(Storage Unit 140)

The storage unit 140 stores a program and data for an operation of the eNodeB 100-1.

For example, the storage unit 140 stores the synchronization relation information indicating which CCs are mutually synchronized among the plurality of CCs used for the radio communication. A specific example of the synchronization relation information has been described above.

(Control Unit 150)

The control unit 150 supplies various functions of the eNodeB 100-1.

In particular, in the first embodiment, the control unit 150 acquires the synchronization relation information indicating which frequency bands are mutually synchronized among the plurality of CCs used for the radio communication. More specifically, for example, the control unit 150 acquires the synchronization relation information stored in the storage unit 140.

Then, the control unit 150 controls the transmission of the synchronization relation information to the UE 200. More specifically, for example, the control unit 150 generates system information including the synchronization relation information and causes the radio communication unit 120 to transmit the system information. Thus, the UE 200-1 can receive the synchronization relation information. The synchronization relation information may also be transmitted by radio resource control (RRC) signaling to the UE 200-1.

The plurality of CCs include one or more CCs with which the CRSs are not transmitted in at least one of the subframes. More specifically, the plurality of CCs include one or more NCTs.

As described above, by transmitting the synchronization relation information, it is possible to reduce the load on the UE 200-1 in carrier aggregation. That is, when the synchronization relation information is transmitted from the eNodeB 100-1 to the UE 200-1, it is not necessary for the UE 200-1 to separately verify which CC is synchronized with which CC. For example, when there are the mutually synchronized CCs (for example, the legacy CC, the SNCT, the UNCT, and the UNCT), the UE 200-1 can use the information regarding the synchronization state of the UE 200-1 in one CC for another CC. In this way, it is possible to reduce the load on the UE 200-1.

<3.3.2. Configuration of UE>

Figure 22:
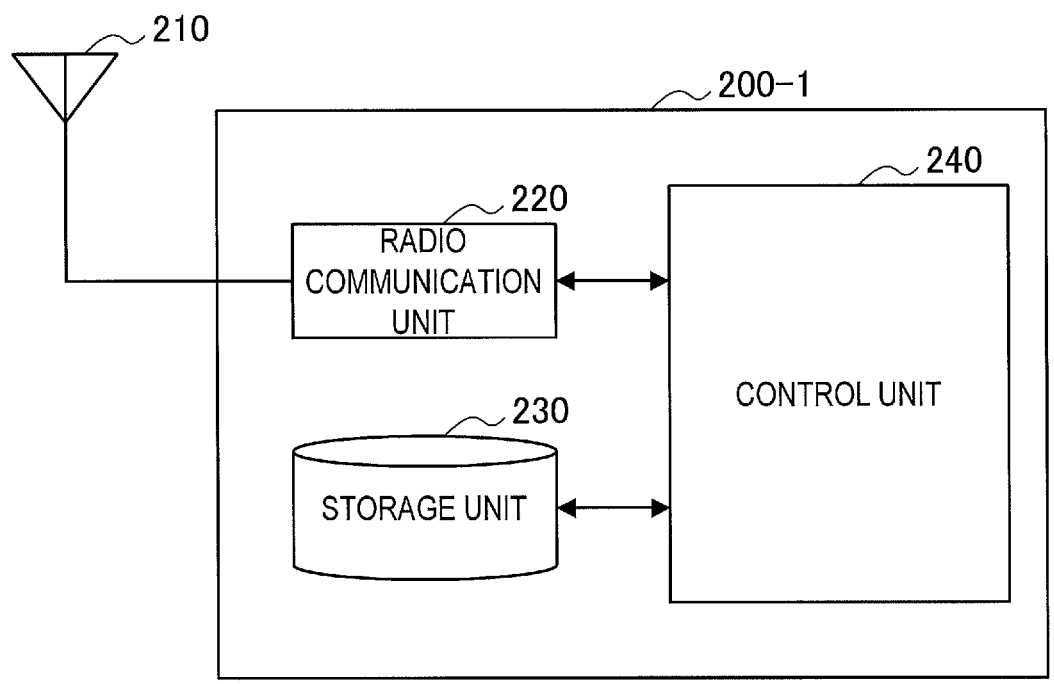
FIG. 22 is a block diagram illustrating an example of the configuration of the UE according to the first embodiment.

First, an example of the configuration of the UE 200-1 according to the first embodiment of the present disclosure will be described with reference to FIG. 22. FIG. 22 is a block diagram illustrating an example of the configuration of the UE 200-1 according to the first embodiment of the present disclosure. Referring to FIG. 22, the UE 200-1 includes an antenna unit 210, a radio communication unit 220, a storage unit 230, and a control unit 240.

(Antenna Unit 210)

The antenna unit 210 receives a radio signal and outputs the received radio signal to the radio communication unit 220. The antenna unit 210 transmits the transmitted signal output by the radio communication unit 220.

(Radio Communication Unit 220)

The radio communication unit 220 performs radio communication with the eNodeB 100-1 of the cell 10. For example, the radio communication unit 220 can simultaneously use the plurality of CCs. Specifically, for example, the radio communication unit 220 can perform the radio communication with the eNodeB 100-1 simultaneously using the plurality of CCs. That is, the UE 200-1 supports carrier aggregation.

(Storage Unit 230)

The storage unit 230 stores a program and data for an operation of the UE 200-1.

For example, the storage unit 230 stores the synchronization relation information indicating which CCs are mutually synchronized among the plurality of CCs used for the radio communication. Specifically, for example, when the control unit 240 acquires the synchronization relation information, the storage unit 230 stores the synchronization relation information.

(Control Unit 240)

The control unit 240 supplies various functions of the UE 200-1.

In particular, in the first embodiment, the control unit 240 acquires the synchronization relation information when the synchronization relation information indicating which CCs are mutually synchronized among the plurality of CCs used for the radio communication is received. Specifically, for example, when the eNodeB 100-1 transmits the system information including the synchronization relation information, the radio communication unit 220 receives the system information. Then, the control unit 240 acquires the synchronization relation information from the received system information.

The control unit 240 performs control for the purpose of the synchronization between the plurality of CCs based on the synchronization relation information.

For example, the control unit 240 specifies the mutually synchronized CCs from the synchronization relation information. The control unit 240 acquires the synchronization state of the UE 200-1 in some of the CCs among the mutually synchronized CCs and uses the information regarding the synchronization state for the remaining CCs. More specifically, for example, the control unit 240 acquires the synchronization state of the UE 200-1 in one CC between the mutually synchronized CCs by the CRS. Then, the control unit 240 uses the acquired information regarding the synchronization state of the UE 200-1 in the one CC for the remaining CC. Thus, the control unit 240 may not acquire the synchronization state of the UE 200-1 in regard to the remaining CC by the CRS. That is, the load on the UE 200-1 is reduced.

The plurality of CCs include one or more CCs with which the common reference signal is not transmitted in at least one of the subframes. Specifically, for example, the plurality of CCs include one or more NCTs. The mutually synchronized CCs are, for example, the legacy CC and the SNCT or two or more UNCTs.

3.4. FLOW OF PROCESS

Next, an example of a communication control process according to the first embodiment of the present disclosure will be described with reference to FIGS. 23A and 23B.
(Communication Control Process on Side of eNodeB)

Figure 23A:
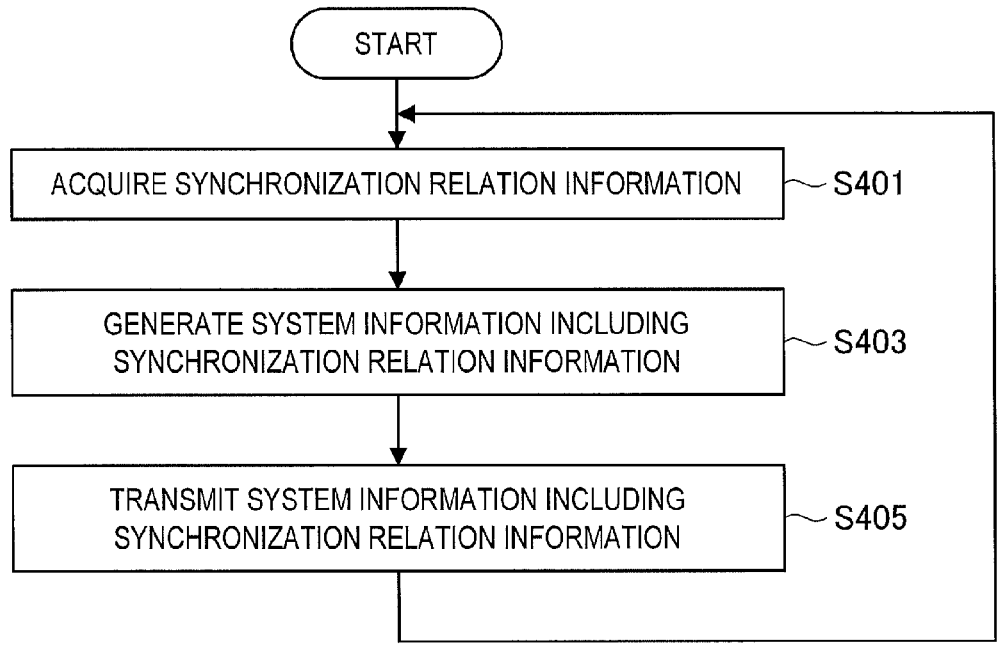
FIG. 23A is a flowchart illustrating an example of a schematic flow of a communication control process of the eNodeB according to the first embodiment.

FIG. 23A is a flowchart illustrating an example of a schematic flow of the communication control process of the eNodeB 100-1 according to the first embodiment of the present disclosure.

In step S401, the control unit 150 acquires the synchronization relation information stored in the storage unit 140.

Next, in step S403, the control unit 150 generates the system information including the synchronization relation information.

Then, in step S405, the control unit 150 causes the radio communication unit 120 to transmit the system information including the synchronization relation information. That is, the radio communication unit 120 transmits the system information including the synchronization relation information. Then, the process returns to step S401.
(Communication Control Process on Side of UE)

Figure 23B:
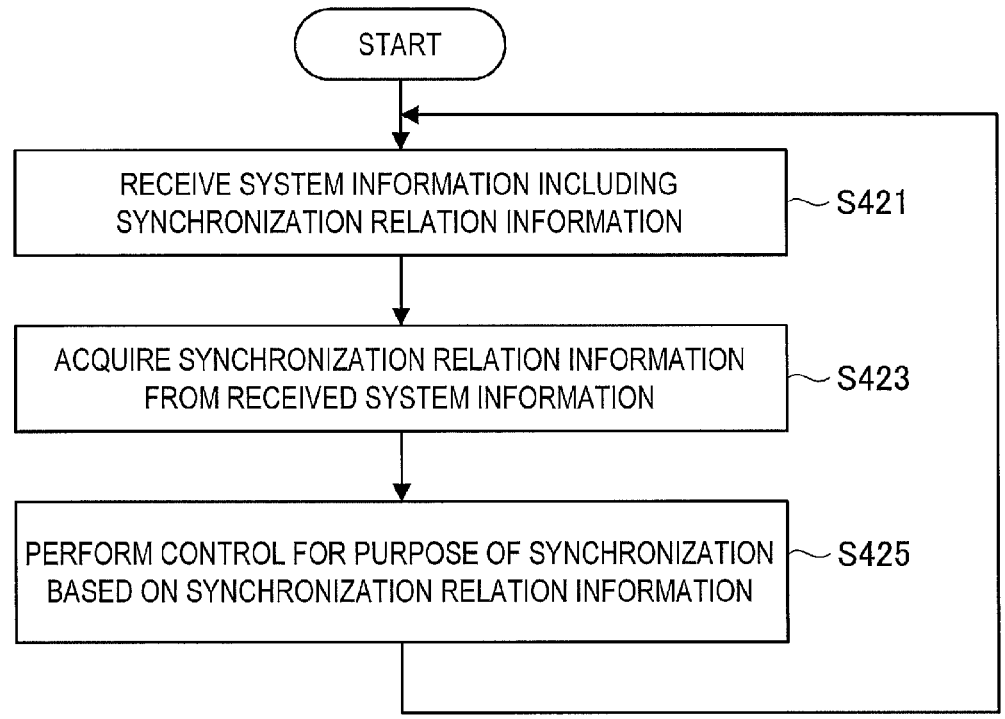
FIG. 23B is a flowchart illustrating an example of a schematic flow of a communication control process of the UE according to the first embodiment of the present disclosure.

FIG. 23B is a flowchart illustrating an example of a schematic flow of a communication control process of the UE 200-1 according to the first embodiment of the present disclosure.

In step S421, when the eNodeB 100-1 transmits the system information including the synchronization relation information, the radio communication unit 220 receives the system information.

In step S423, the control unit 240 acquires the synchronization relation information from the received system information.

In step S425, the control unit 240 performs control for the purpose of the synchronization in the plurality of CCs based on the synchronization relation information. Then, the process returns to step S421.

3.5. MODIFICATION EXAMPLES

Next, first and second modification examples of the first embodiment of the present disclosure will be described with reference to FIGS. 24 to 28.

3.5.1. First Modification Example

First, a first modification example of the first embodiment will be described with reference to FIGS. 24 and 25.
(Overview)

In the related art, the CRS is transmitted with each CC. For this reason, even when the NCT is used, the CRS can be transmitted with each NCT as in the related art.

As described above, however, when the UE 200-1 acquires the synchronization state in a certain UNCT, the UE 200-1 can use the information regarding the synchronization state of the UE 200-1 for another UNCT synchronized with the certain UNCT. Therefore, from the viewpoint of effective use of radio resources, it is not preferable to transmit the CRSs with each of the two or more mutually synchronized UNCTs.

When each of the plurality of CCs used for the radio communication is the NCT (that is, when there is no legacy CC) and the UE 200-1 acquires the synchronization state of the UE 200-1 in a certain NCT, the UE 200-1 can use the information regarding the synchronization state for another NCT synchronized with the certain NCT. Therefore, from the viewpoint of effective use of radio resources, it is not preferable to transmit the CRSs with each of the two or more mutually synchronized NCTs.

Accordingly, in the first modification example according to the first embodiment, the one or more CCs with which the CRSs are not transmitted in at least one of the subframes include two or more mutually synchronized CCs. The CRSs are transmitted in at least one of the subframes with some of the CCs among the two or more CCs and the CRSs are not transmitted with the remaining CCs among the two or more CCs.

Thus, the radio resources can be effectively used. That is, it is possible to reduce the radio resources used to transmit the control signal.
(Specific Example of Transmission of CRS)

Specifically, for example, the NCTs included in the plurality of CCs used for the radio communication include two or more mutually synchronized NCTs. The two or more NCTs are, for example, the two or more UNCTs or two or more NCTs when there is no legacy CC. The CRSs are transmitted with some of the NCTs among the two or more NCTs and the CRSs are not transmitted with the remaining NCTs among the two or more NCTs. Hereinafter, a specific example of this point will be described with reference to FIGS. 24 and 25.

FIG. 24 is an explanatory diagram illustrating a first example of transmission of the CRS according to the first modification example of the first embodiment. Five CCs 30 used for the radio communication are illustrated in FIG. 24. In this example, of the five CCs 30, the CC 30A and the CC 30B are the legacy CCs and the CC 30C, the CC 30D, and the CC 30E are the NCTs. More specifically, the CC 30D and the CC 30E are the unsynchronized NCTs (that is, the UNCTs) synchronized with none of the legacy CCs. In this example, the CC 30D and the CC 30E which are the UNCTs are mutually synchronized. In this case, the CRS is transmitted with the CC 30D, but the CRS is not transmitted with the CC 30E. The UE 200-1 acquires the synchronization state of the UE 200-1 in the CC 30D and uses the information regarding the synchronization state for the CC 30E.

FIG. 25 is an explanatory diagram illustrating a second example of the transmission of the CRS according to the first modification example of the first embodiment. Five CCs 30 used for the radio communication are illustrated in FIG. 25. In this example, the five CCs 30 are each the NCT. Here, the CC 30G and the CC 30H are mutually synchronized. The CC 30I and the CC 30J are mutually synchronized. Other combinations of the CCs are not mutually synchronized. In this case, the CRSs are transmitted with the CC 30F, the CC 30H, and the CC 30I, but the CRSs are not transmitted with the CC 30G and the CC 30J. The UE 200-1 acquires the synchronization state of the UE 200-1 in the CC 30H and uses the information regarding the synchronization state for the CC 30G. The UE 200-1 acquires the synchronization state of the UE 200-1 in the CC 30I and uses the information regarding the synchronization state for the CC 30J.

(Configuration of Each Device)

eNodeB 100-1: Control Unit 150

The control unit 150 of the eNodeB 100 controls transmission of a signal in each CC such that the CRSs are transmitted in at least one of the subframes with some of the CCs among the two or more mutually synchronized CCs and the CRSs are not transmitted with the remaining CCs among the two or more CCs.

More specifically, for example, the control unit 150 of the eNodeB 100 causes the radio communication unit 120 to transmit the CRSs with some of the NCTs among the two or more mutually synchronized NCTs. The control unit 150 causes the radio communication unit 120 not to transmit the CRSs with the remaining NCTs among the two or more NCTs.

As one example, the control unit 150 causes the radio communication unit 120 to transmit the CRS with each NCT according to setting of the transmission of the CRS. The setting includes, for example, a transmission period of the CRS in the time direction, the transmission target RB of the CRS in the frequency direction, and a transmission position in the RB. The radio communication unit 120 transmits the CRS with each NCT according to the setting of the transmission of the CRS. Specifically, for example, mapping of signals to resource elements (REs) is performed by the radio communication unit 120. The radio communication unit 120 maps the CRSs to the REs according to the setting of the transmission of the CRS. Thereafter, the radio communication unit 120 transmits the CRSs.

As another example, mapping of signals to the REs may be performed by the control unit 150. The control unit 150 may map the CRSs to the REs according to the transmission interval of the CRS decided in advance. The radio communication unit 120 may transmit the CRSs with the REs. In this case, for example, the control unit 150 includes a communication processing circuit configured to perform some of the processes of the physical layer of a radio communication protocol.

In this way, for example, the control unit 150 controls the transmission of the signals.

eNodeB 100-1: Radio Communication Unit 120

The radio communication unit 120 of the eNodeB 100 transmits the CRSs in at least one of the subframes with some of the CCs among the two or more mutually synchronized CCs and does not transmit the CRSs with the remaining CCs among the two or more CCs. More specifically, for example, the radio communication unit 120 of the eNodeB 100 transmits the CRSs with some of the NCTs among the two or more mutually synchronized NCTs. The radio communication unit 120 does not transmit the CRSs with the remaining NCTs among the two or more NCTs.

3.5.2. Second Modification Example

First, a second modification example of the first embodiment will be described with reference to FIGS. 26 to 28.

(Overview)

In the first embodiment, as described above, the UE 200-1 performs the control for the purpose of the synchronization in the plurality of CCs used for the radio communication based on the synchronization relation information. For example, the UE 200-1 acquires the synchronization state of the UE 200-1 in some of the CCs among the mutually synchronized CCs by the CRSs. Then, the UE 200-1 uses the acquired information regarding the synchronization state of the UE 200-1 in the some of the CCs for the remaining CCs.

In the second modification example of the first embodiment, first, the one or more CCs with which the CRS are not transmitted in at least one of the subframes include two or more mutually synchronized CCs. The UE 200-1 monitors the synchronization state of the UE 200-1 in some of the CCs among the two or more CCs and does not monitor the synchronization state of the UE 200-1 in the remaining CCs among the two or more CCs.

For example, the UE 200-1 uses the monitoring result of the synchronization state of the UE 200 in the some of the CCs for the remaining CCs.

As described above, when there are the mutually synchronized NCTs and the UE 200-1 monitors the synchronization state of the UE 200-1 in some of the NCTs, the UE 200-1 may not monitor the synchronization state of the UE 200-1 in the remaining CCs. In this way, it is possible to reduce the load on the UE 200-1.

(Specific Example of Synchronization Monitoring)

Specifically, for example, the plurality of CCs used for the radio communication include two or more mutually synchronized NCTs. The two or more NCTs are, for example, two or more UNCTs or two or more NCTs when there is no legacy CC. The UE 200-1 monitors the synchronization state of the UE 200-1 in some of the NCTs among the two or more NCTs. On the other hand, the UE 200-1 does not monitor the synchronization state of the UE 200-1 in the remaining NCTs among the two or more NCTs. Hereinafter, a specific example of this point will be described with reference to FIGS. 26 and 27.

Figure 26:
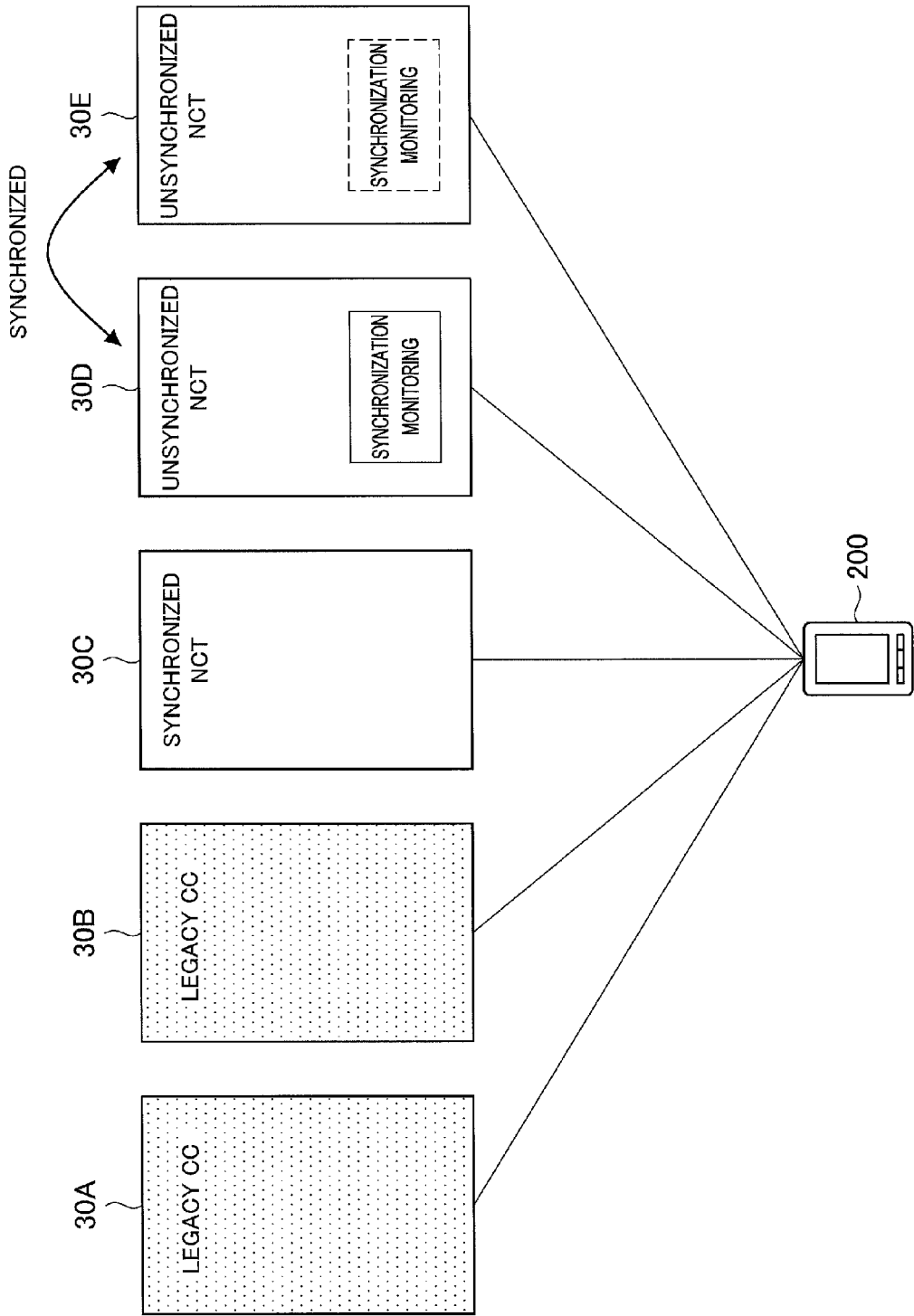
FIG. 26 is an explanatory diagram illustrating a first example of synchronization monitoring according to a second modification example of the first embodiment.

FIG. 26 is an explanatory diagram illustrating a first example of synchronization monitoring according to the second modification example of the first embodiment. Five CCs 30 used for the radio communication are illustrated in FIG. 26. In this example, of the five CCs 30, the CC 30A and the CC 30B are the legacy CCs and the CC 30C, the CC 30D, and the CC 30E are the NCTs. More specifically, the CC 30D and the CC 30E are the unsynchronized NCTs (that is, the UNCTs) which are not synchronized with any legacy CC. In this example, the CC 30D and the CC 30E which are the UNCTs are mutually synchronized. In this case, the UE 200-1 monitors the synchronization state of the UE 200-1 in the CC 30D, but does not monitor the synchronization state of the UE 200-1 in the CC 30E. The UE 200-1 uses the monitoring result of the synchronization state of the UE 200 in the CC 30D for the CC 30E.

Figure 27:
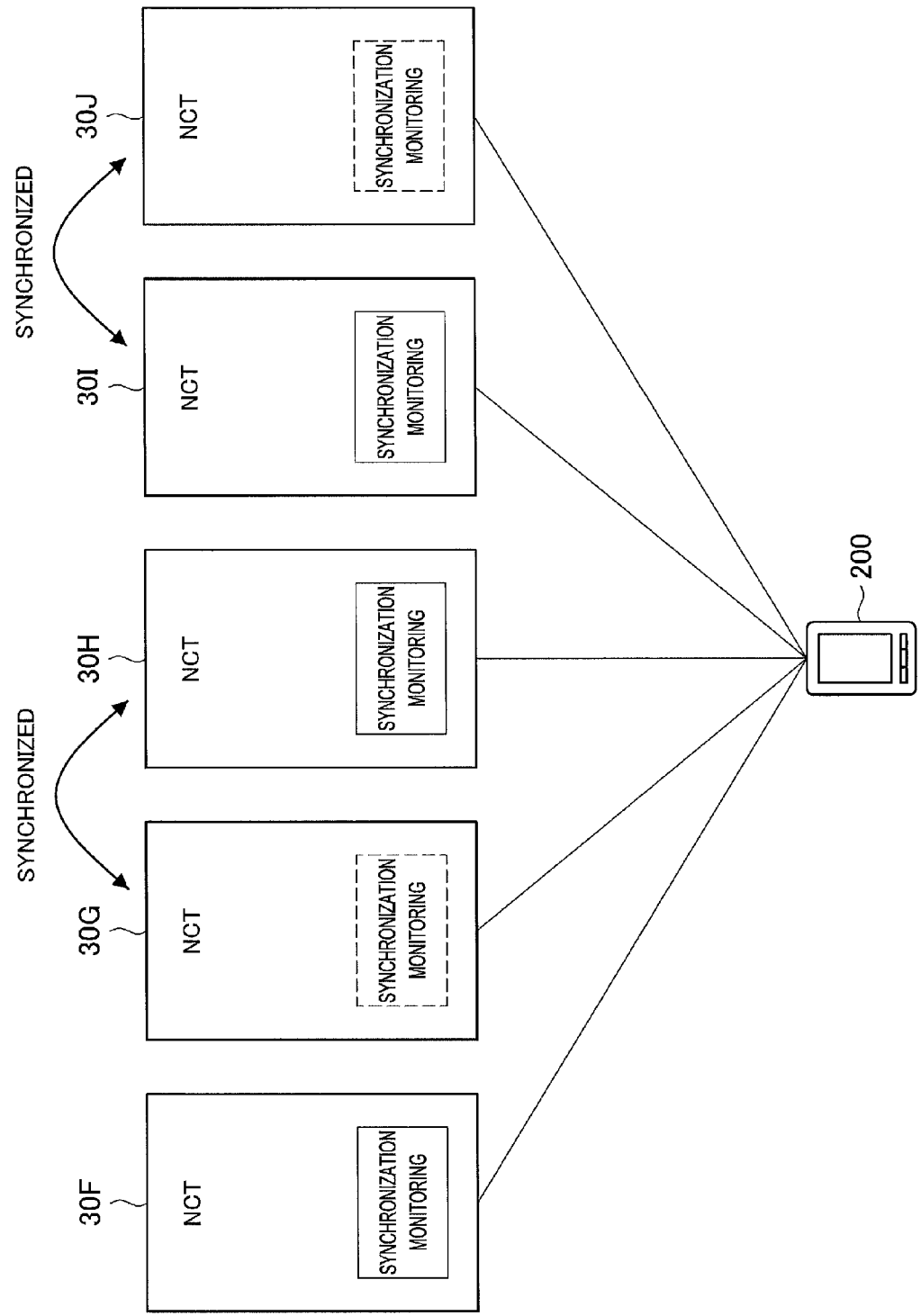
FIG. 27 is an explanatory diagram illustrating a second example of the transmission of the CRS according to the second modification example of the first embodiment.
Figure 28:
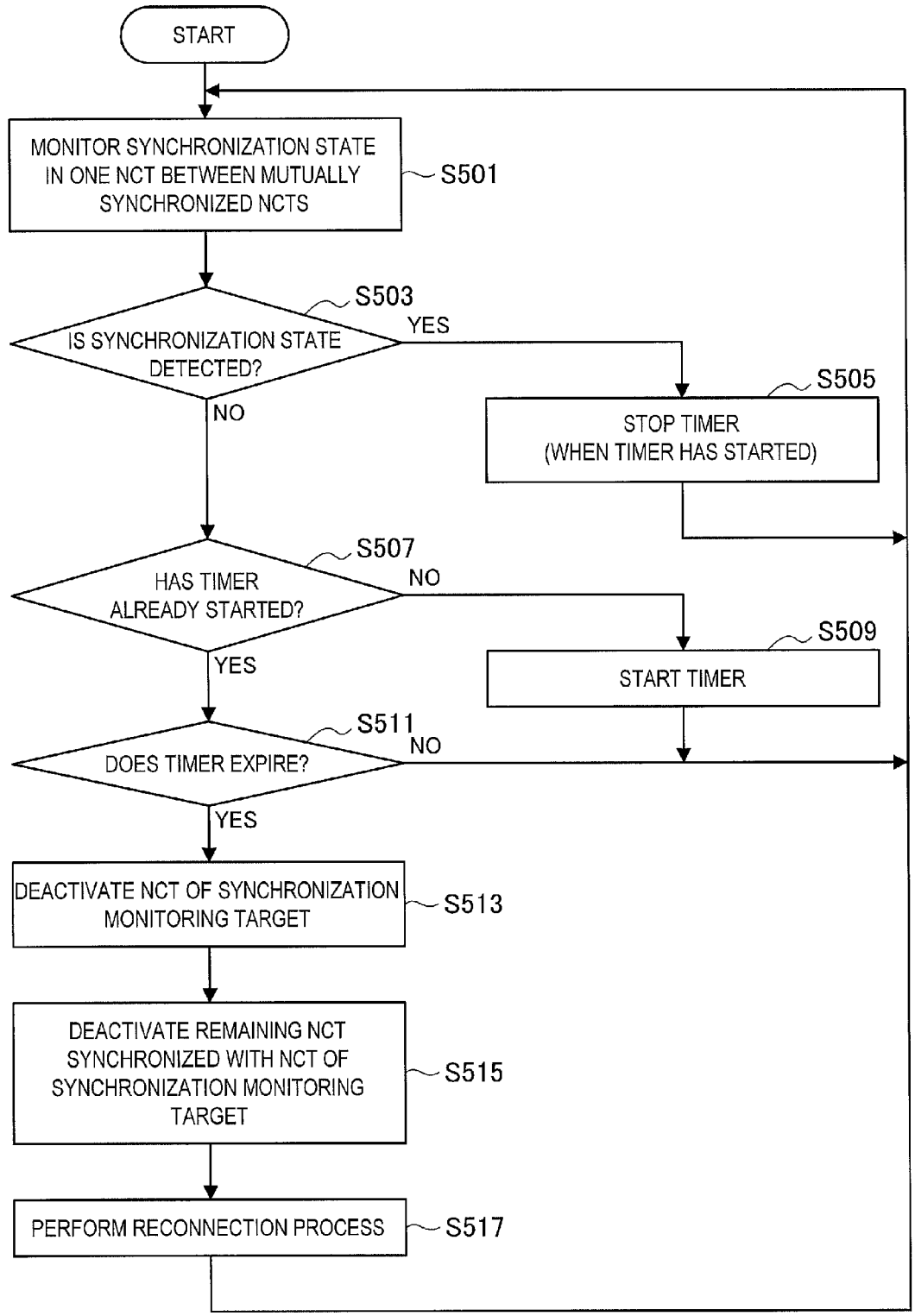
FIG. 28 is a flowchart illustrating an example of a schematic flow of a communication control process of the UE according to the second modification example of the first embodiment.

FIG. 27 is an explanatory diagram illustrating a second example of the transmission of the CRS according to the second modification example of the first embodiment. Referring to FIG. 27, five CCs 30 used for the radio communication are illustrated. In this example, the five CCs 30 are each the NCT. Here, a CC 30G and a CC 30H are mutually synchronized. A CC 30I and a CC 30J are mutually synchronized. Other combinations of the CCs are not mutually synchronized. In this case, the UE 200-1 monitors the synchronization state of the UE 200-1 in a CC 30F, a CC 30H, and the CC 30I, but does not monitor the synchronization state of the UE 200-1 in the CC 30G and the CC 30J. The UE 200-1 uses the monitoring result of the synchronization state of the UE 200 in the CC 30H for the CC 30G. The UE 200-1 uses the monitoring result of the synchronization state of the UE 200 in the CC 30I for the CC 30J.

(Configuration of Each Device)

UE 200-1: Control Unit 240

The control unit 240 of the UE 200-1 performs control for the purpose of the synchronization in the plurality of CCs based on the synchronization relation information. In particular, in the second modification example of the first embodiment, the control unit 240 monitors the synchronization state of the UE 200-1 in some of the CCs among the two or more CCs and does not monitor the synchronization state of the UE 200-1 in the remaining CCs among the two or more CCs.

For example, the control unit 240 specifies the mutually synchronized NCTs from the synchronization relation information. The control unit 240 monitors the synchronization state of the UE 200-1 in some of the CCs among the mutually synchronized NCTs and does not monitor the synchronization state of the UE 200-1 in the remaining NCTs among the mutually synchronized NCTs. More specifically, for example, the control unit 240 monitors whether the synchronization state of the UE 200-1 in the some of the NCTs is made based on the BLER of the PDCCH. In other words, the UE 200-1 detects synchronization deviation of the UE 200-1 in the some of the NCTs based on the BLER of the PDCCH. For example, the UE 200-1 detects the synchronization deviation when the BLER is less than a predetermined value (for example, 10%).

When the UE 200-1 detects the synchronization deviation a predetermined number of times, a timer starts. Thereafter, when the UE 200-1 detects the synchronization state before expiration of the timer, the UE 200-1 stops the timer. The reason for stopping the timer in this way is that an influence on the other NCT synchronized with the NCT is large when the NCT is immediately deactivated due to the detection of the synchronization deviation.

When the timer expires, the UE 200-1 deactivates the NCT. The UE 200-1 also similarly deactivates the NCT using the information regarding the synchronization state of the UE 200-1 in the NCT.

An SCC (that is, an SCC of carrier aggregation of Release 10) of the related art is deactivated only when the PDCCH is not detected. On the other hand, the synchronization monitoring target NCT synchronized with the other NCT is not deactivated despite the fact that the NCT is the SCC through the above-described synchronization and monitoring processes even when the PDCCH is not detected. Accordingly, since the synchronization monitoring target NCT is not simply deactivated, it is difficult to have an adverse influence on the other NCT synchronized with the NCT.

For example, the NCT synchronized with none of the NCTs is deactivated by the UE 200-1 as in the SCC of the related art. That is, the UE 200-1 deactivates the NCT synchronized with none of the NCTs only when the PDCCH is not detected.

(Flow of Process)

Next, an example of the communication control process of the UE 200-1 according to the second modification example of the first embodiment will be described with reference to FIG. 28. FIG. 28 is a flowchart illustrating an example of a schematic flow of a communication control process of the UE 200-1 according to the second modification example of the first embodiment.

In step S501, the control unit 240 monitors the synchronization state of the UE 200-1 in one NCT between the mutually synchronized NCTs and does not monitor the synchronization state of the UE 200-1 in the remaining CC.

In step S503, the control unit 240 determines whether the synchronization state of the UE 200-1 is detected in the synchronization monitoring target NCT. When the synchronization state is not detected, the process proceeds to step S505. Otherwise, (that is, when the synchronization deviation is detected), the process proceeds to step S507.

In step S505, if the timer has already started, the control unit 240 stops the timer. Then, the process returns to step S501.

In step S507, the control unit 240 determines whether the timer has already started. When the timer has already started, the process proceeds to step S511. Otherwise, the process proceeds to step S509.

In step S509, the control unit 240 starts the timer.

In step S511, the control unit 240 determines whether the timer expires. When the timer expires, the process proceeds to step S513. Otherwise, the process returns to step S501.

In step S513, the control unit 240 deactivates the synchronization monitoring target NCT. In step S515, the control unit 240 deactivates the NCT synchronized with the synchronization monitoring target NCT.

In step S517, the control unit 240 performs a reconnection process on the deactivated NCT. When the NCT is activated, the process returns to step S501.

The first embodiment of the present disclosure has been described with reference to FIGS. 7 to 28. According to the first embodiment, it is possible to reduce the load on the UE in the carrier aggregation.

4. SECOND EMBODIMENT

Next, a second embodiment of the present disclosure will be described with reference to FIGS. 29 to 37.

4.1. OVERVIEW

First, an overview of the second embodiment of the present disclosure will be described.

In Release 11 of 3GPP, as described above, NCTs have been investigated as new component carriers apart from legacy CCs (existing CCs) capable of maintaining backward compatibility. The biggest motivation for the NCTs is to reduce the overheads of the CCs (that is, to reduce the radio resources used for control).

To reduce the overhead, an extent to which CRSs can be reduced while maintaining the synchronization state of the UE has been investigated. Thus, it was found that it is necessary to transmit the CRSs with 25 RBs every 5 ms in an environment of an SNR of −8 dB.

In practice, however, since the SNR changes depending on a location within a cell, there is a probability of the SNR of a UE close to the center of the cell being 10 dB even when the SNR of the UE located at a certain location within the cell is −8 dB. Therefore, for example, when the CRSs are transmitted with 25 RBs every 5 ms uniformly in the NCTs, many CRS in all of the NCTs may be transmitted due to the UE present in a poor environment. As a result, there is a concern of the overhead not being sufficiently reduced.

Accordingly, in the second embodiment of the present disclosure, it is possible to further reduce the overhead by the common reference signals (CRSs) while realizing the acquisition of a synchronization state of a terminal device (UE).

Specifically, in the second embodiment, the plurality of CCs used for the radio communication include two or more CCs with which the CRSs are not transmitted in at least one of the subframes. More specifically, for example, the two or more CCs are, for example, two or more NCTs. Then, the CRS is transmitted at different intervals between at least two CCs among the two or more CCs. Hereinafter, a specific example of this point will be described with reference to FIGS. 29 and 30.

Figure 29:
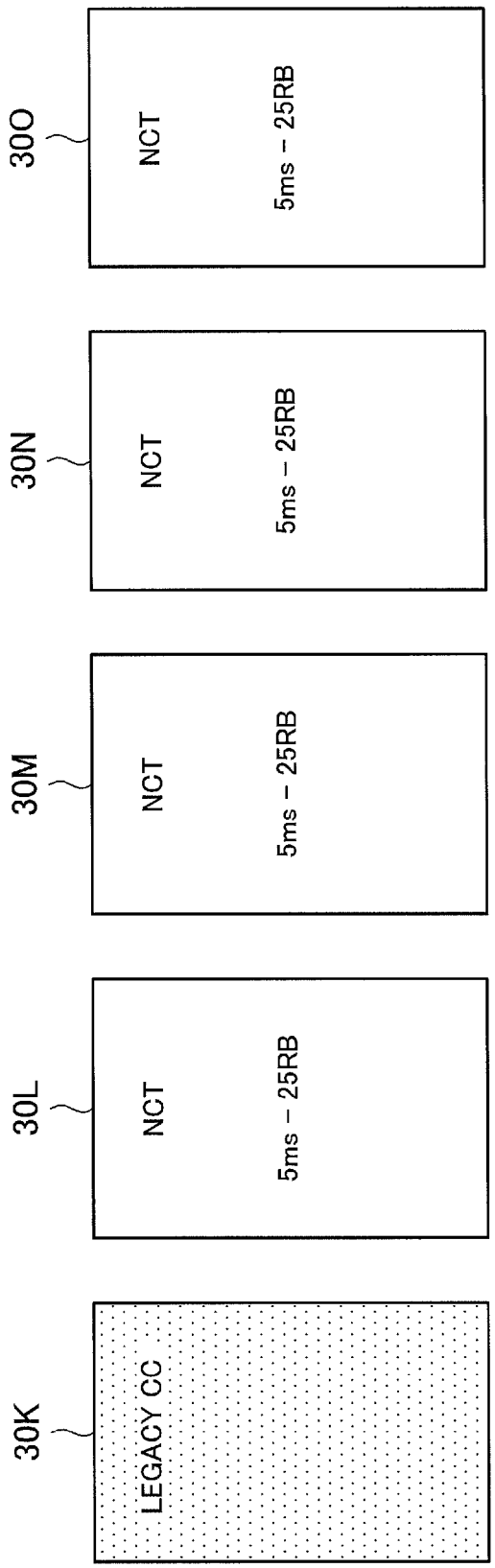
FIG. 29 is an explanatory diagram illustrating examples of the NCTs in which a transmission interval of the CRS is set uniformly.

FIG. 29 is an explanatory diagram illustrating examples of the NCTs in which a transmission interval of the CRS is set uniformly. Five CCs 30 used for the radio communication are illustrated in FIG. 29. Of the five CCs 30, a CC 30K is the legacy CC and the other CCs 30 are the NCTs. In the NCTs, the CRS is transmitted with 25 RBs every 5 ms uniformly.

Figure 30:
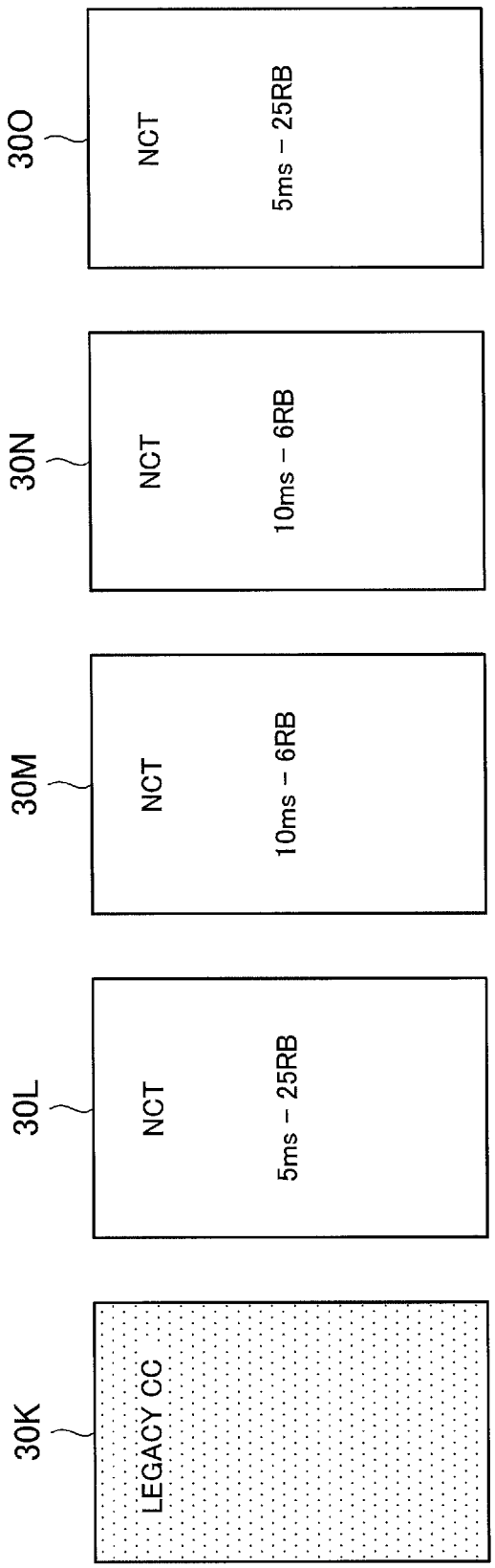
FIG. 30 is an explanatory diagram illustrating examples of NCTs according to a second embodiment.

FIG. 30 is an explanatory diagram illustrating examples of the NCTs according to the second embodiment of the present disclosure. FIG. 30, like FIG. 29, illustrates the five CCs 30 used for the radio communication. Of the five CCs 30, a CC 30K is the legacy CC and the other CCs 30 are the NCTs. In a CC 30L and a CC 30O, the CRS is transmitted with 25 RBs every 5 ms. In a CC 30M and a CC 30N, the CRS is transmitted with 6 RBs every 10 ms. In the example illustrated in FIG. 30, the overhead by the CRSs in the CC 30M and the CC 30N is reduced more than in the example illustrated in FIG. 29.

In this way, when there are the NCTs with which the CRS is transmitted at the different intervals, the UE 200 can selectively use the NCTs according to an environment. For example, the UE 200 present in an environment in which the SNR is low uses the NCT with which the CRS is transmitted at higher intervals. A UE 300 present in an environment in which the SNR is high uses the NCT with which the CRS is transmitted at lower intervals. As a result, the UE 200 can acquire the synchronization state of the UE 200. As described with reference to FIG. 30, it is possible to reduce the overhead by the CRS.

4.2. CONFIGURATION OF EACH DEVICE

Next, examples of an eNodeB 100-2 and a UE 200-2 according to the second embodiment of the present disclosure will be described.

<4.2.1. Configuration of eNodeB>

Figure 31:
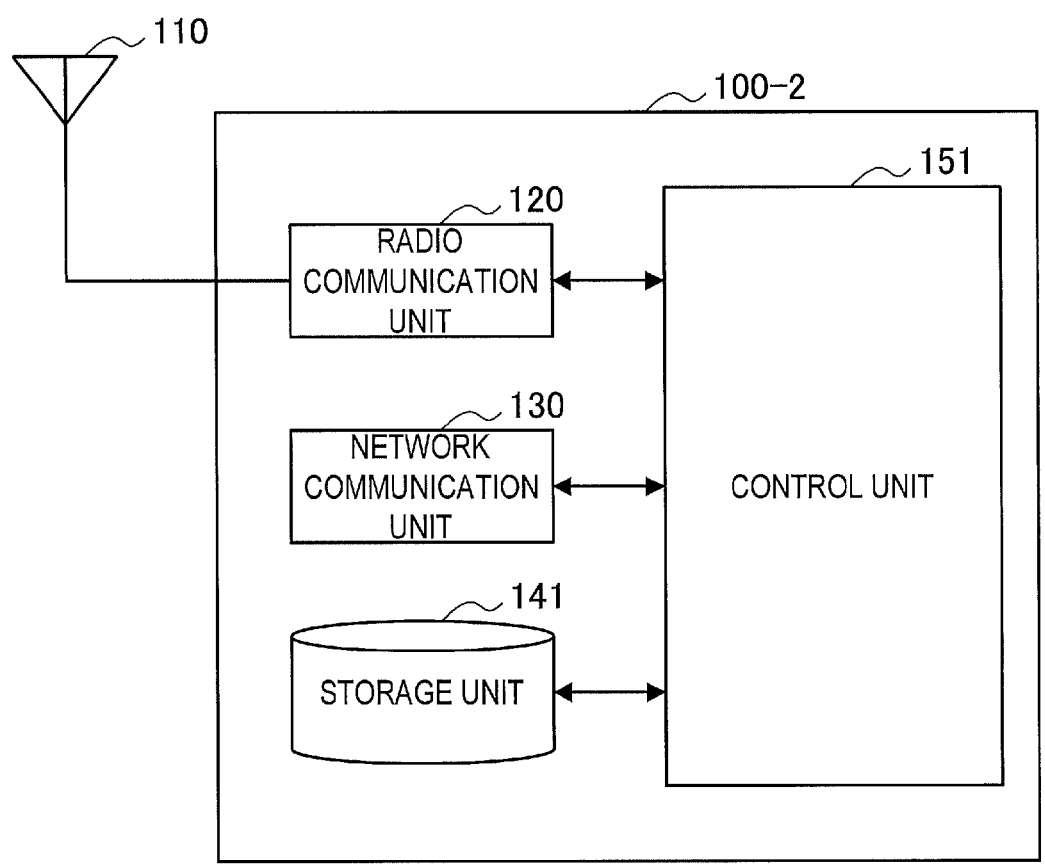
FIG. 31 is a block diagram illustrating an example of the configuration of an eNodeB according to the second embodiment.

First, the example of the configuration of the eNodeB 100-2 according to the second embodiment of the present disclosure will be described with reference to FIGS. 31 and 32. FIG. 31 is a block diagram illustrating an example of the configuration of the eNodeB 100-2 according to the second embodiment of the present disclosure. Referring to FIG. 31, the eNodeB 100-2 includes an antenna unit 110, a radio communication unit 120, a network communication unit 130, a storage unit 141, and a control unit 151.

Here, there is no difference in the antenna unit 110, the radio communication unit 120, and the network communication unit 130 between the first and second embodiments. Accordingly, the storage unit 141 and the control unit 151 will be described here.

(Storage Unit 141)

The storage unit 141 stores a program and data for an operation of the eNodeB 100-2.

For example, the storage unit 141 stores synchronizability determination information used to determine whether the UE 200-2 can be synchronized in each of the two or more frequency bands with which the CRSs are not transmitted in at least one of the subframes. More specifically, for example, the synchronizability determination information is information used to determine whether the UE 200-2 can be synchronized in each of two or more NCTs. A specific example of the synchronizability determination information will be described below.

(Control Unit 151)

The control unit 151 supplies various functions of the eNodeB 100-2.

Signal Transmission Control Related to CRS

In particular, in the second embodiment, the control unit 151 controls transmission of signals in the plurality of CCs used for the radio communication. The plurality of CCs include two or more CCs with which the CRSs are not transmitted in at least one of the subframes. The control unit 151 controls the transmission such that the CRS is transmitted at mutually different intervals between at least two CCs among the two or more CCs.

More specifically, for example, the control unit 151 controls transmission of the signals such that the CRS is transmitted at different intervals between at least two NCTs among the two or more NCTs. For example, the control unit 151 controls the transmission of the signals such that the CRS is transmitted with 25 RBs every 5 ms in a certain NCT and the CRS is transmitted with 6 RBs every 10 ms in another NCT.

As one example, the control unit 151 causes the radio communication unit 120 to transmit the CRS with each NCT according to setting of the transmission of the CRS. The setting includes, for example, a transmission period of the CRS in the time direction, the transmission target RB of the CRS in the frequency direction, and a transmission position in the RB. The radio communication unit 120 transmits the CRS with each NCT according to the setting of the transmission of the CRS. Specifically, for example, mapping of signals to resource elements (REs) is performed by the radio communication unit 120. The radio communication unit 120 maps the CRSs to the REs according to the setting of the transmission of the CRS. Thereafter, the radio communication unit 120 transmits the CRSs.

As another example, mapping of signals to the REs may be performed by the control unit 151. The control unit 151 may map the CRSs to the REs according to the transmission interval of the CRS decided in advance. The radio communication unit 120 may transmit the CRSs with the REs.

In this way, for example, the control unit 151 controls the transmission of the signals.

Transmission of Synchronizability Determination Information

The control unit 151 acquires the synchronizability determination information used to determine whether the UE 200-2 can be synchronized in each of the two or more frequency bands with which the CRSs are not transmitted in at least one of the subframes. More specifically, for example, the synchronizability determination information is information used to determine whether the UE 200-2 can be synchronized in each of two or more NCTs. The control unit 151 acquires the synchronizability determination information stored in the storage unit 141.

The control unit 151 controls the transmission of the synchronizability determination information to the UE 200-2. More specifically, for example, the control unit 151 generates the system information including the synchronizability determination information and causes the radio communication unit 120 to transmit the system information. Thus, the UE 200-2 can receive the synchronizability determination information. The synchronizability determination information may be transmitted by RRC signaling to the UE 200-2.

When such information is supplied, the UE 200-2 can know which NCT is necessary to achieve the synchronization state despite the fact that the transmission interval of the CRS is different due to the NCT. Accordingly, the UE 200-2 can achieve the synchronization state without trial and error more reliably by selecting and using the proper NCT according to an environment (that is, establishing connection with the eNodeB 100-1 in the proper NCT).

For example, the synchronizability determination information includes information regarding the transmission interval of the CRS in each of the two or more CCs with which the CRSs are not transmitted in at least one of the subframes. More specifically, for example, the synchronizability determination information includes the information regarding the transmission interval of the CRS in each of two or more NCTs. The transmission interval includes one or both of an interval in the time direction and an interval in the frequency direction. Hereinafter, a specific example of the synchronizability determination information will be described with reference to FIG. 32.

FIG. 32 is an explanatory diagram illustrating an example of the synchronization determination information corresponding to the NCTs illustrated in FIG. 30. The transmission interval of the CRS in each NCT is illustrated in FIG. 32. As described with reference to FIG. 30, the transmission interval of the CRS in the CC 30L and the CC 30O among the CCs 30 which are the NCTs is a period of 5 ms in the time direction and is the width of 25 RBs in the frequency direction. The transmission interval of the CRS in the CC 30M and the CC 30N is a period of 10 ms in the time direction and is the width of 6 RBs in the frequency direction. For example, in this way, the synchronizability determination information includes information indicating the transmission interval of the CRS in each NCT. Of course, the synchronizability determination information does not necessarily include a specific numerical value of the transmission interval of the CRS. For example, the synchronizability determination information includes identification information (for example, an ID) used to identify the transmission interval of the CRS.

When such information is supplied, the UE 200-2 can know the transmission frequency of the CRS in each NCT. Accordingly, the UE 200-2 can achieve the synchronization state without trial and error more reliably by selecting the proper transmission interval of the CRS according to an environment and using the CRS associated with the transmission interval.

The synchronizability determination information may include information regarding communication quality recommended in each of the two or more CCs with which the CRSs are not transmitted in at least one of the subframes. For example, the synchronizability determination information may include a recommended SNR (for example, an SNR=−8 dB) as the information regarding the communication quality recommended in the CC 30L and the CC 30O in the example of FIGS. 30 and 32.

When such information is supplied, the UE 200-2 can know the extent of the communication quality (for example, an SNR) necessary to achieve the synchronization state in each NCT. Accordingly, the UE 200-2 can achieve the synchronization state without trial and error more reliably by selecting the proper NCT according to an actual SNR in each NCT and using the NCT.

The synchronizability determination information may include information regarding power control of each of the two or more CCs with which the CRSs are not transmitted in at least one of the subframes. For example, the synchronizability determination information may include information indicating whether or not power boosting in two or more NCTs is applied.

When such information is supplied, the UE 200-2 can know which NCT is necessary to achieve the synchronization state more easily. Accordingly, the UE 200-2 can achieve the synchronization state without trial and error more reliably by selecting and using the proper NCT.

Assignment of CCs to UE

For example, the control unit 151 selects the CCs used for the radio communication of the UE 200-2 among the plurality of CCs used for the radio communication.

Specifically, for example, the control unit 151 selects the SCC used for the radio communication of the UE 200-2. Here, the control unit 151 selects the SCC used for the radio communication of the UE 200-2 based on, for example, the SNR of the UE 200-2 in each CC and the transmission interval of the CRS in each CC. For example, the control unit 151 selects the NCT with which the CRS is transmitted at the higher interval (for example, 5 ms and 25 RBs) as the SCC of the UE 200-2 present in an environment in which the SNR is low. The control unit 151 selects the NCT with which the CRS is transmitted at a lower interval (for example, 10 ms and 6 RBs) as the SCC of the UE 200-2 present in an environment in which the SNR is high. As the result of the selection, the UE 200-2 can achieve the synchronization state of the UE 200-2 in the selected CC.

The SNR differs depending on the CC even in the same UE 200-2, but considerably differs depending on the location of the UE 200-2. For example, depending on a fading environment of the UE 200-2, a difference of about 10 dB can occur between the SNR in regard to a certain CC and the SNR in regard to another CC in some cases. The difference in the SNR caused by the CC may be increased due to the position of the UE 200-2. Accordingly, for example, when the UE 200-2 is distant from the center of the cell 10 (for example, a timing advanced value is large), the control unit 151 may select the NCT with which the CRS is transmitted at the higher interval (for example, 5 ms and 25 RBs) as the SCC of the UE 200-2. When the UE 200-2 is close to the center of the cell 10 (for example, a timing advanced value is small), the control unit 151 may select the NCT with which the CRS is transmitted at the lower interval (for example, 10 ms and 6 RBs) as the SCC of the UE 200-2.

For a certain UE 200-2, the SNR of a first NCT associated with the CRS of the lower interval (for example, 10 ms and 6 RBs) is considerably greater than the SNR of a second NCT associated with the CRS of the higher interval (for example, 5 ms and 25 RBs) in some cases. In this case, the control unit 151 may select the first NCT as the SCC of the certain UE 200-2.

Dynamic Change in Transmission Interval of CRS in NCT

The control unit 151 may change the transmission interval of the CRS in each NCT. More specifically, for example, the control unit 151 acquires the SNR (for example, the SNR of each UE 200-2 in the legacy CC) in regard to each UE 200-2. Then, the control unit 151 decides the transmission interval of the CRS in each NCT based on a distribution of the acquired SNRs. Thus, it is possible to set the more proper transmission interval according to the environment of the cell 10.

<4.2.2. Configuration of UE>

Figure 33:
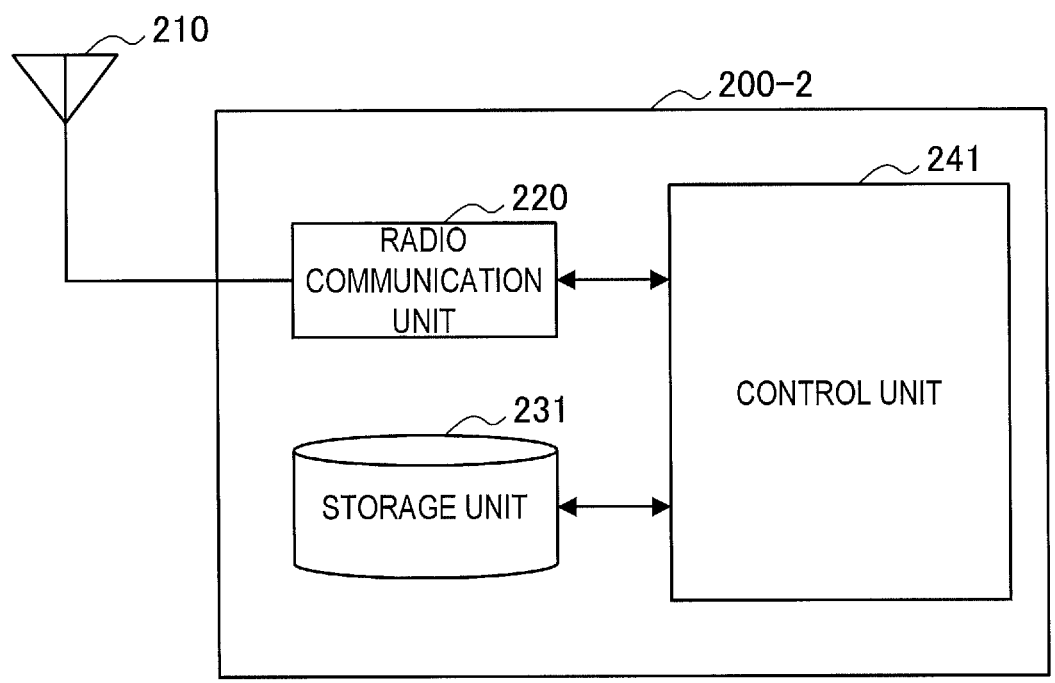
FIG. 33 is a block diagram illustrating an example of the configuration of the UE according to the second embodiment.

First, an example of the UE 200-2 according to the second embodiment of the present disclosure will be described with reference to FIG. 33. FIG. 33 is a block diagram illustrating an example of the configuration of the UE 200-2 according to the second embodiment. Referring to FIG. 33, the UE 200-2 includes an antenna unit 210, a radio communication unit 220, a storage unit 231, and a control unit 241.

(Storage Unit 231)

The storage unit 230 stores a program and data for an operation of the UE 200-2.

For example, the storage unit 231 stores the synchronizability determination information used to determine whether the UE 200-2 can be synchronized in each of the two or more frequency bands with which the CRSs are not transmitted in at least one of the subframes. Specifically, for example, the synchronizability determination information is information used to determine whether the UE 200-2 can be synchronized in each of two or more NCTs. When the control unit 241 acquires the synchronizability determination information, the storage unit 231 stores the synchronizability determination information.

(Control Unit 241)

Selection of CC Used for Radio Communication

The control unit 241 supplies various functions of the UE 200-2.

In particular, in the second embodiment, the control unit 241 selects the CC used for the radio communication of the UE 200-2 among the plurality of CCs used for the radio communication. The plurality of CCs include two or more CCs with which the CRSs are not transmitted in at least one of the subframes. The CRS is transmitted at mutually different intervals between at least two CCs among the two or more CCs.

More specifically, for example, the plurality of CCs include two or more NCTs. The CRS is transmitted at the mutually different intervals between at least two NCTs among the two or more NCTs. The control unit 241 selects the proper CC for the UE 200-2 and establishes connection with the eNodeB 100-2 with the CC. For example, in this way, the CC selected by the UE 200-2 for the connection is used as the PCC by the UE 200-2.

Selection of CC Based on Synchronizability Determination Information

The control unit 241 acquires the synchronizability determination information when the synchronizability determination information used to determine whether the UE 200-2 can be synchronized in each of the two or more frequency bands is received. Specifically, for example, the synchronizability determination information is information used to determine whether the UE 200-2 can be synchronized in each of two or more NCTs. When the eNodeB 100-2 transmits the system information including the synchronizability determination information, the radio communication unit 220 receives the system information. Then, the control unit 241 acquires the synchronizability determination information from the received system information.

The control unit 241 selects the CC used for the radio communication of the UE 200-2 among the plurality of CCs based on the synchronizability determination information. Specifically, for example, the control unit 241 measures a signal intensity by the CRS transmitted in each CC. The control unit 241 calculates the SNR from the signal intensity and noise power. The control unit 241 selects the proper CC based on the synchronizability determination information (for example, the transmission interval of the CRS) and the SNR in each CC. For example, the UE 200-2 present in the environment in which the SNR is low selects the NCT with which the CRS is transmitted at the higher interval (for example, 5 ms and 25 RBs) and establishes the connection with the eNodeB 100-2 with the NCT. The UE 300 present in the environment in which the SNR is high selects the NCT with which the CRS is transmitted at the lower interval (for example, 10 ms and 6 RBs) and establishes the connection with the eNodeB 100-2 with the NCT. As a result, the UE 200 can acquire the synchronization state of the UE 200 in the selected CC.

For example, when the UE 200-2 is distant from the center of the cell 10 (for example, a timing advanced value is large), the control unit 241 may select the NCT with which the CRS is transmitted at the higher interval (for example, 5 ms and 25 RBs). When the UE 200-2 is close to the center of the cell 10 (for example, a timing advanced value is small), the control unit 241 may select the NCT with which the CRS is transmitted at the lower interval (for example, 10 ms and 6 RBs). However, when the SNR of the first NCT associated with the CRS of the lower interval (for example, 10 ms and 6 RBs) is considerably greater than the SNR of the second NCT associated with the CRS of the higher interval (for example, 5 ms and 25 RBs), the UE 200-2 may select the first NCT.

When the synchronizability determination information includes a recommended SNR, the control unit 241 may select the NCT associated with the SNR equal to or greater than the recommended SNR. When the synchronizability determination information includes information indicating whether or not the power boosting is applied, the control unit 241 may select the NCT in consideration of the information.

4.3. FLOW OF PROCESS

Next, an example of a communication control process according to the first embodiment of the present disclosure will be described with reference to FIGS. 34A and 34B.

(Communication Control Process on Side of eNodeB)

Figure 34A:
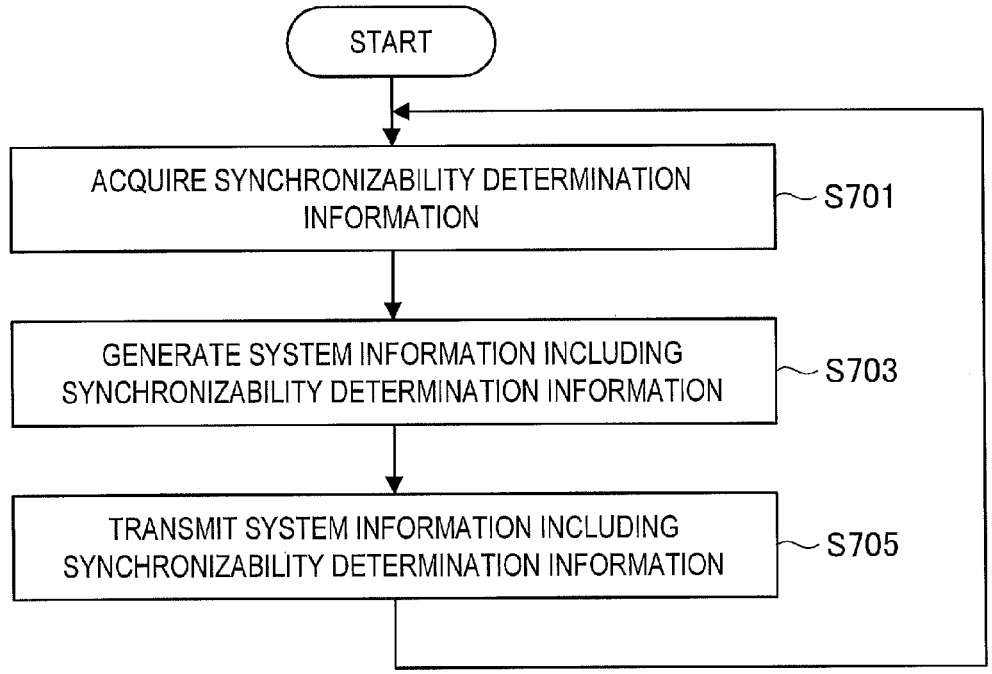
FIG. 34A is a flowchart illustrating an example of a schematic flow of a communication control process of the eNodeB according to the second embodiment.

FIG. 34A is a flowchart illustrating an example of a schematic flow of a communication control process of the eNodeB 100-2 according to the second embodiment. The communication control process is a process performed to transmit the synchronizability determination information.

In step S701, the control unit 151 acquires the synchronizability determination information stored in the storage unit 141.

Next, in step S703, the control unit 151 generates the system information including the synchronizability determination information.

In step S705, the control unit 151 causes the radio communication unit 120 to transmit the system information including the synchronizability determination information. That is, the radio communication unit 120 transmits the system information including the synchronizability determination information. Then, the process returns to step S701.

(Communication Control Process on Side of UE)

Figure 34B:
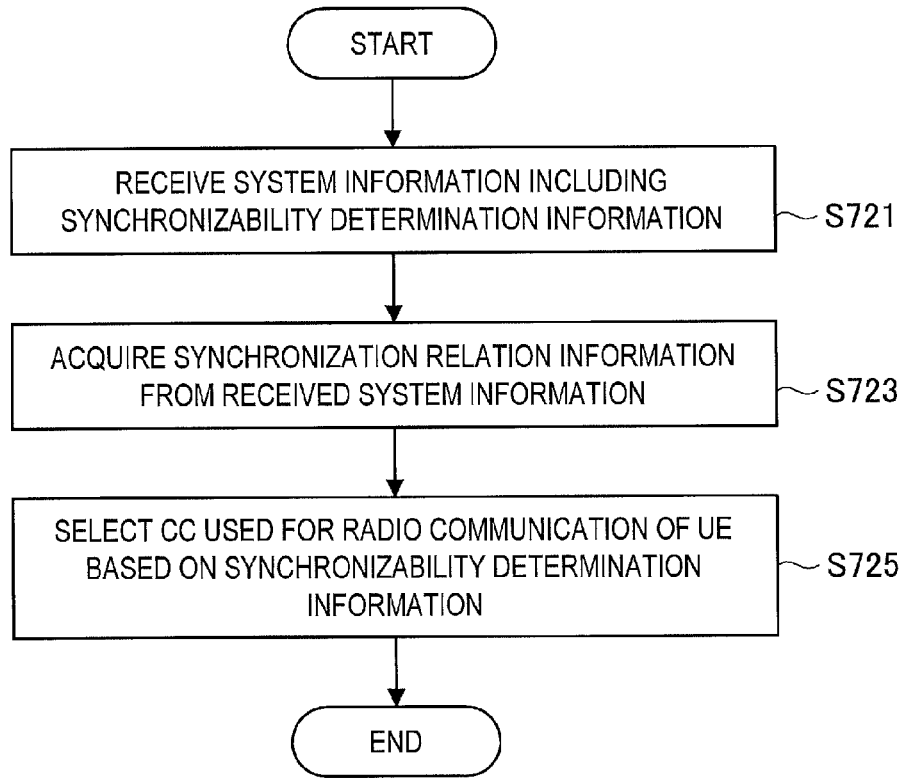
FIG. 34B is a flowchart illustrating an example of a schematic flow of a communication control process of the UE according to the second embodiment.

FIG. 34B is a flowchart illustrating an example of a schematic flow of a communication control process of the UE 200-2 according to the second embodiment. The communication control process is a process performed to select the CC based on the synchronizability determination information.

In step S721, when the eNodeB 100-1 transmits the system information including the synchronizability determination information, the radio communication unit 220 receives the system information.

In step S723, the control unit 241 acquires the synchronizability determination information from the received system information.

In step S725, the control unit 240 selects the CC used for the radio communication of the UE from the plurality of CCs based on the synchronizability determination information. Then, the process ends.

4.4. MODIFICATION EXAMPLE

Next, first and second modification examples of the first embodiment of the present disclosure will be described with reference to FIGS. 35 to 37.

4.4.1. First Modification Example

First, the first modification example of the second embodiment will be described with reference to FIGS. 35 and 36.
(Overview)

In the second embodiment, as described above, the transmission interval of the CRS can be different between the NCTs. Therefore, the transmission interval in the time direction of the CRS is also different between the NCTs in some cases. Hereinafter, a specific example of this point will be described with reference to FIG. 35.

Figure 35:
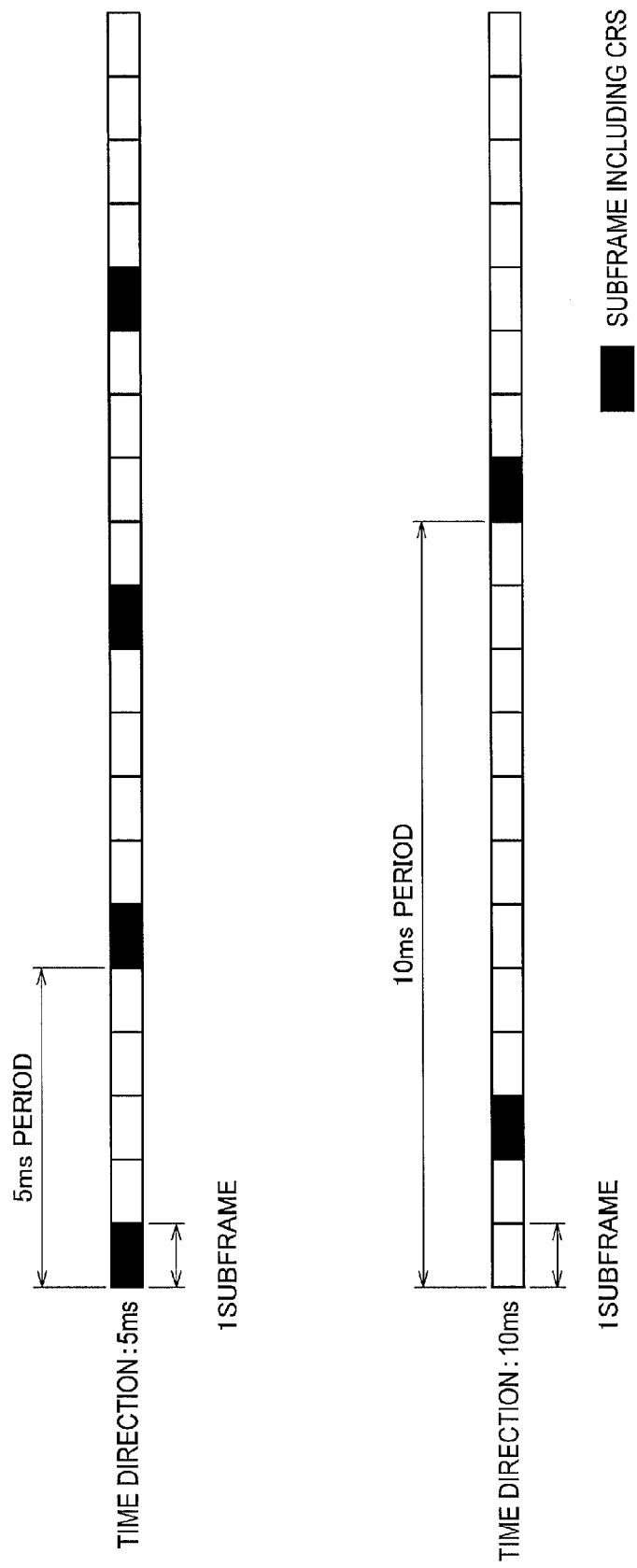
FIG. 35 is an explanatory diagram illustrating examples of transmission timings of CRSs in two NCTs in association with different transmission intervals of the CRSs.

FIG. 35 is an explanatory diagram illustrating examples of transmission timings of CRSs in two NCTs in association with different transmission intervals of the CRSs. Transmission timings of the CRS in the NCT with which the CRS is transmitted at a period of 5 ms in the time direction and transmission timings of the CRS in the NCT with which the CRS is transmitted at a period of 10 ms in the time direction are illustrated in FIG. 35. In this way, for example, when the transmission intervals in the time direction of the CRS are different between the NCTs, there is a probability of the transmission timings (for example, the subframes in which the CRSs are transmitted) of the CRS being deviated between the NCTs. As a result, since a time in which the UE 200-2 operates increases, power consumption of the UE 200-2 increases.

Accordingly, in the first modification example, some or all of the subframes in which the CRSs are transmitted with the NCTs with which the CRSs are transmitted at the lower interval in the time direction are the subframes in which the CRSs are transmitted with the CCs with which the CRSs are transmitted at the higher interval. That is, the subframes in which the CRSs are transmitted are matched between the NCTs as much as possible. Hereinafter, a specific example of this point will be described with reference to FIG. 36.

Figure 36:
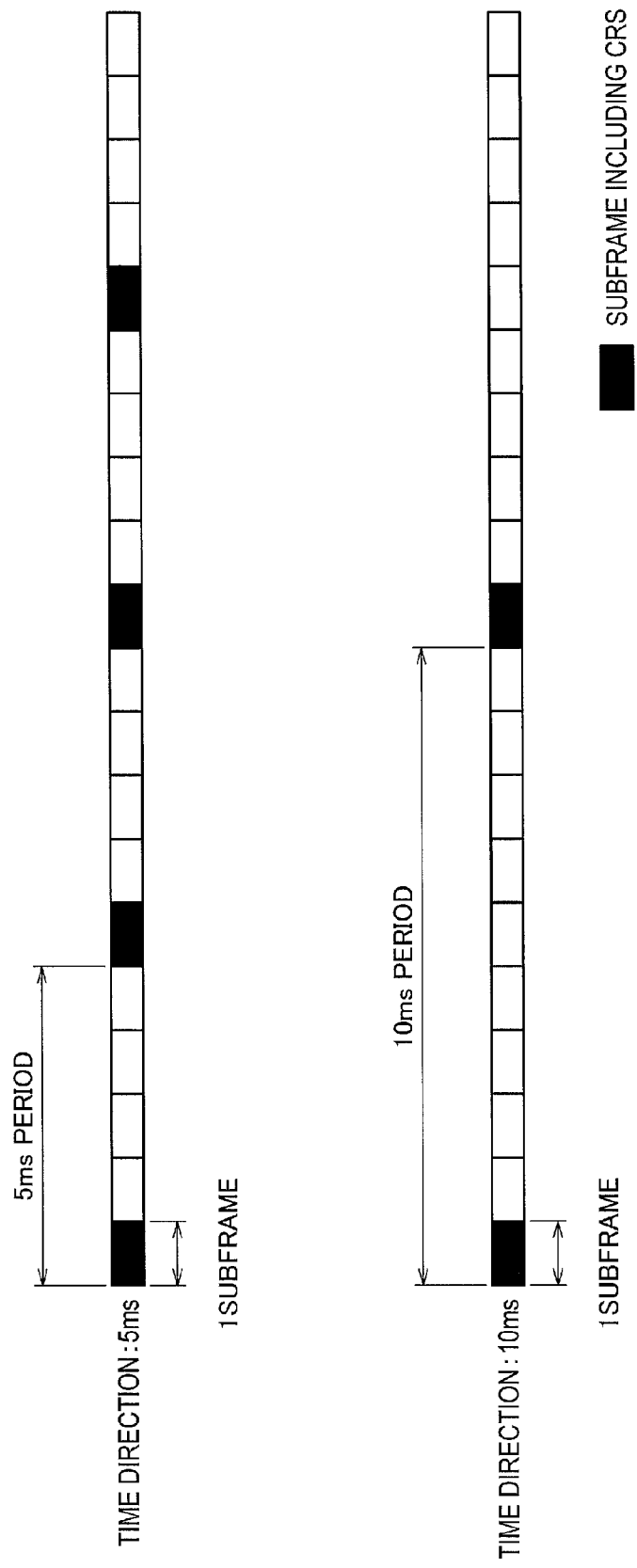
FIG. 36 is an explanatory diagram illustrating examples of transmission timings of the CRSs in two NCTs in association with different transmission intervals of the CRSs according to a first modification example of the second embodiment.

FIG. 36 is an explanatory diagram illustrating examples of transmission timings of the CRSs in two NCTs in association with different transmission intervals of the CRSs according to a first modification example of the second embodiment. Transmission timings of the CRS in the NCT with which the CRS is transmitted at a period of 5 ms in the time direction and transmission timings of the CRS in the NCT with which the CRS is transmitted at a period of 10 ms in the time direction are illustrated in FIG. 36. In this example, all of the transmission timings (the subframes in which the CRSs are transmitted) of the CRS in the NCT with which the CRS is transmitted at the period of 10 ms match some of the transmission timings (the subframes in which the CRSs are transmitted) of the CRS in the NCT with which the CRS is transmitted at the period of 5 ms. The number of subframes in which the CRSs are transmitted is less in the example illustrated in FIG. 36 than in the example illustrated in FIG. 35.

Thus, since the time in which the UE 200-2 operates can be reduced, the power consumption of the UE 200-2 can be prevented from increasing.
(Configuration of Each Device)

eNodeB 100-2: Control Unit 151

The two or more CCs with which the CRSs are not transmitted in at least one of the subframes include the CC of a low interval with which the CRSs are transmitted at a first interval in the time direction and the CC of a high interval with which the CRSs are transmitted at a second interval higher than the first interval in the time direction. More specifically, for example, two or more NCTs include, for example, the NCT with which the CRS is transmitted with 6 RBs every 10 ms and the NCT with which the CRS is transmitted with 25 RBs every 5 ms.

The control unit 151 controls the transmission such that some or all of the subframes in which the CRSs are transmitted with the CCs of the low interval become the subframes in which the CRSs are transmitted with the CCs of the high interval. More specifically, for example, the control unit 151 controls the transmission such that all of the subframes in which the CRSs are transmitted with the NCTs with which the CRSs are transmitted with 6 RBs every 10 ms become the subframes in which the CRSs are transmitted with the NCTs with which the CRSs are transmitted with 25 RBs every 5 ms.

4.4.2. Second Modification Example

Next, the second modification example of the second embodiment will be described with reference to FIG. 37.
(Overview)

As described above, the NCT (the SNCT) synchronized with the existing CC and the NCT (the UNCT) not synchronized with the LCC have been investigated as the NCTs. As described in the first embodiment, the information regarding the synchronization state of the UE 200 in some of the UNCTs among the mutually synchronized UNCTs can also be used in the remaining UNCTs.

However, for example, when the transmission interval of the CRS in one of the mutually synchronized UNCTs is low (for example, the CRS is transmitted with 6 RBs every 10 ms) and the UE 200 is present in the environment in which the SNR is low, there is a possibility of the synchronization state not being achieved in the one of the UNCTs. As a result, there is a concern of the UE 200 not using the UNCTs in the radio communication.

Accordingly, in the second modification example, the CRSs are transmitted at the mutually different intervals at the mutually synchronized frequency band among the mutually synchronized NCTs. A specific example of this point will be described with reference to FIG. 37.

Figure 37:
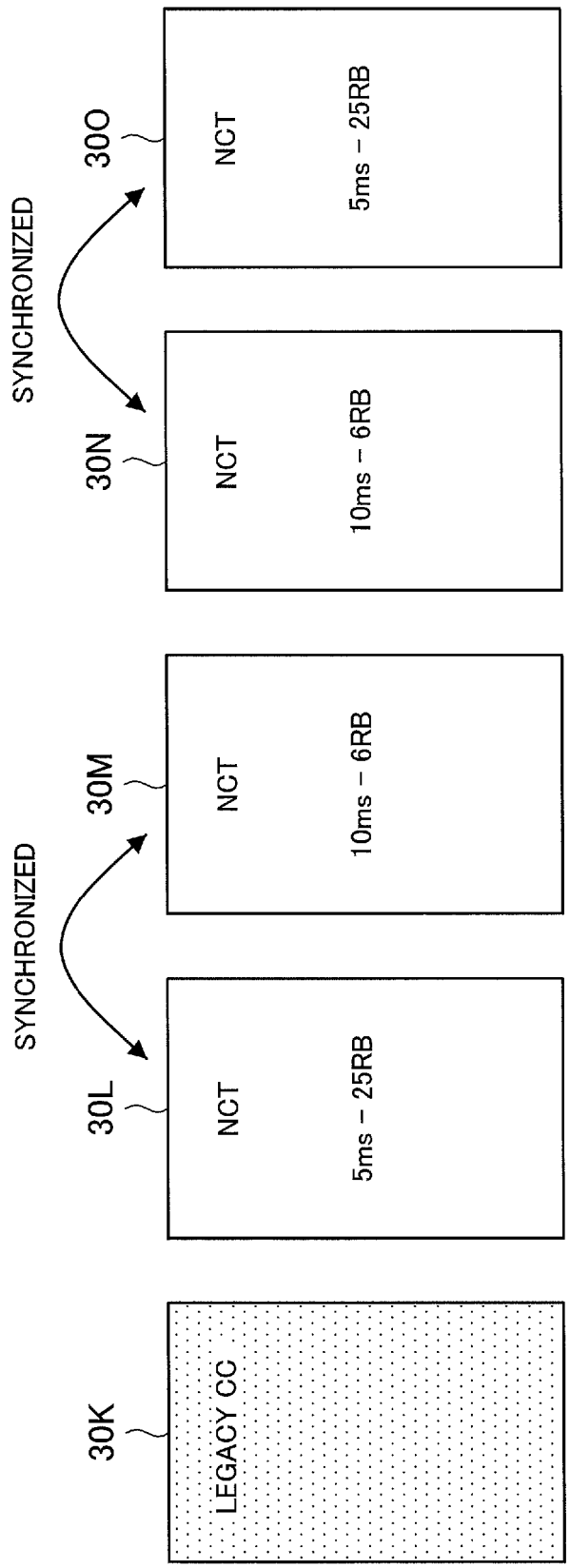
FIG. 37 is an explanatory diagram illustrating an example of a transmission interval of the CRS in each CC according to a synchronization relation between component carriers (CC).

FIG. 37 is an explanatory diagram illustrating an example of a transmission interval of the CRS in each CC according to a synchronization relation between component carriers (CC). Five CCs 30 used for the radio communication are illustrated in FIG. 37. Of the five CCs 30, a CC 30K is the legacy CC and the other CCs 30 are the NCTs. A CC 30L and a CC 30M are mutually synchronized. A CC 30N and a CC 30O are mutually synchronized. In this case, for example, the CRS is transmitted with 25 RBs every 5 ms in the CC 30L and the CRS is transmitted with 6 RBs every 10 ms in the CC 30M. The CRS is transmitted with 25 RBs every 5 ms in the CC 30O and the CRS is transmitted with 6 RBs every 10 ms in the CC 30N.

Since the UE 200-2 can achieve the synchronization state in one NCT between the mutually synchronized NCTs more reliably through the transmission of the CRS, it is possible to use the NCTs more reliably. For example, even in an environment in which communication quality is not good, the UE 200-2 can achieve the synchronization state in the NCT associated with the higher transmission interval of the CRS. The UE 200-2 can use the information regarding the synchronization state for another NCT.

(Configuration of Each Device)

eNodeB 100-2: Control Unit 151

The control unit 151 controls the transmission of the signals such that the CRSs are transmitted at the mutually different intervals in at least two or more mutually synchronized CCs among the two or more CCs with which the common reference signals are not transmitted in at least one of the subframes. More specifically, for example, when there are mutually synchronized first and second NCTs, the control unit 151 causes the radio communication unit 120 to transmit the CRS with 6 RBs every 10 ms in the first NCT and to transmit the CRS with 25 RBs every 5 ms in the second NCT.

5. APPLICATION EXAMPLES

The technology related to the present disclosure can be applied to various products. For example, the eNodeB 100 may be realized as an eNodeB 800 including a body (also referred to as a base station device) controlling radio communication and an antenna. Alternatively, the eNodeB 100 may be realized as an eNodeB 830 including a body controlling radio communication, one or more remote radio heads (RRHs) disposed in different locations from the body, and an antenna.

In addition, the UE 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the UE 200 may also be realized as a terminal that conducts machine-to-machine (M2M) communication (also called a machine-type communication (MTC) terminal). Furthermore, the UE 200 may be a radio communication module mounted onboard these terminals (for example, an integrated circuit module configured on a single die).

<<5.1. Applications Related to eNodeB>>

(First Application)

Figure 38:
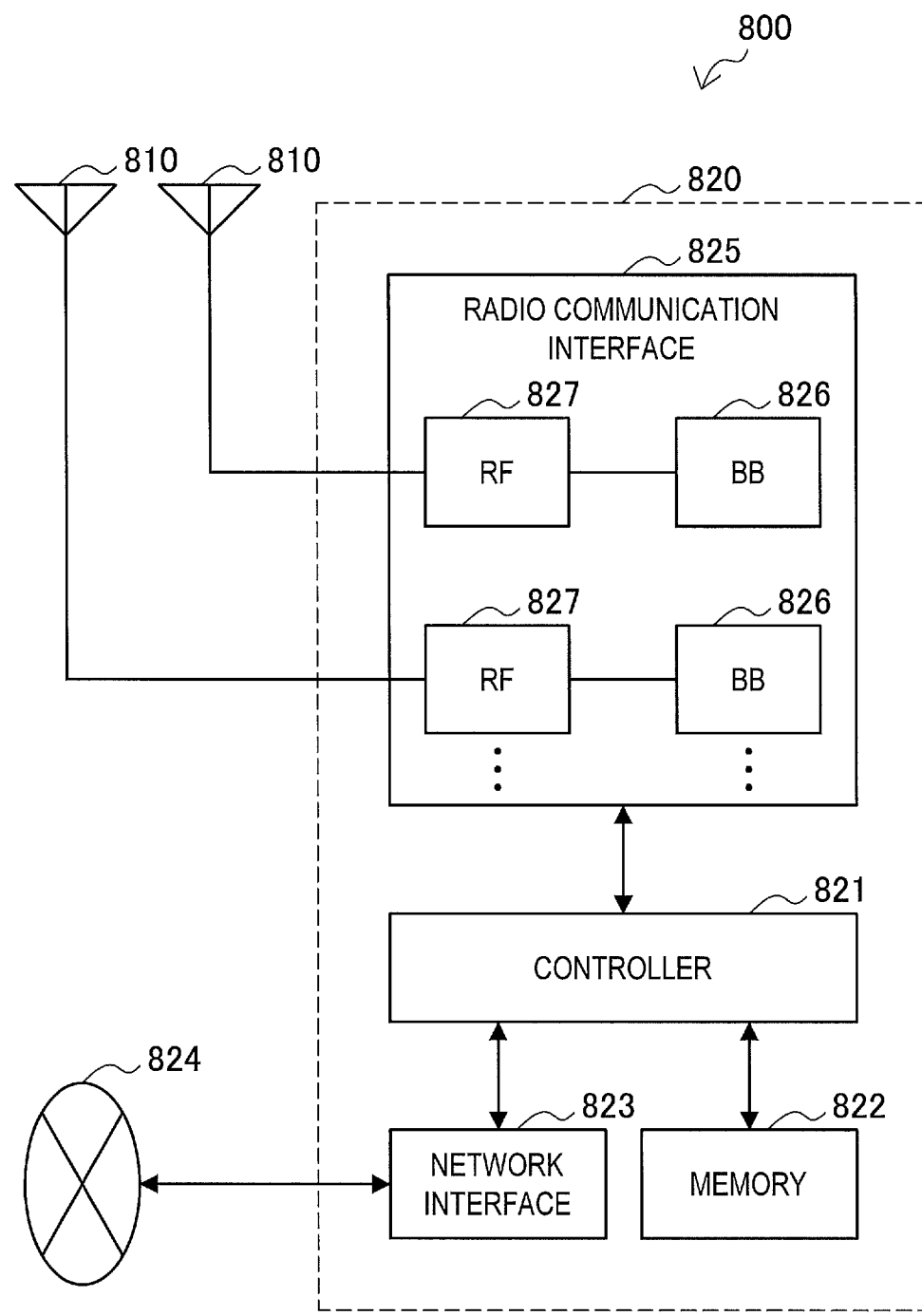
FIG. 38 is a block diagram illustrating a first example of a schematic configuration of an eNodeB to which technology according to an embodiment of the present disclosure may be applied.

FIG. 38 is a block diagram illustrating a first example of a schematic configuration of an eNodeB to which technology according to an embodiment of the present disclosure may be applied. An eNodeB 800 includes one or more antennas 810, and a base station device 820. The respective antennas 810 and the base station device 820 may be connected to each other via an RF cable.

Each antenna 810 includes a single or multiple antenna elements (for example, multiple antenna elements constituting a MIMO antenna), and is used by the base station device 820 to transmit and receive radio signals. The eNodeB 800 may include multiple antennas 810 as illustrated in FIG. 38, and the multiple antennas 810 may respectively correspond to multiple frequency bands used by the eNodeB 800, for example. Note that although FIG. 38 illustrates an example of the eNodeB 800 including multiple antennas 810, the eNodeB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from multiple baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNodeB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNodeB via the network interface 823. In this case, the eNodeB 800 and the core network node or other eNodeB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNodeB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include multiple BB processors 826 as illustrated in FIG. 38, and the multiple BB processors 826 may respectively correspond to multiple frequency bands used by the eNodeB 800, for example. In addition, the radio communication interface 825 may also include multiple RF circuits 827 as illustrated in FIG. 38, and the multiple RF circuits 827 may respectively correspond to multiple antenna elements, for example. Note that although FIG. 38 illustrates an example of the radio communication interface 825 including multiple BB processors 826 and multiple RF circuits 827, the radio communication interface 825 may also include a single BB processor 826 or a single RF circuit 827.

(Second Application)

Figure 39:
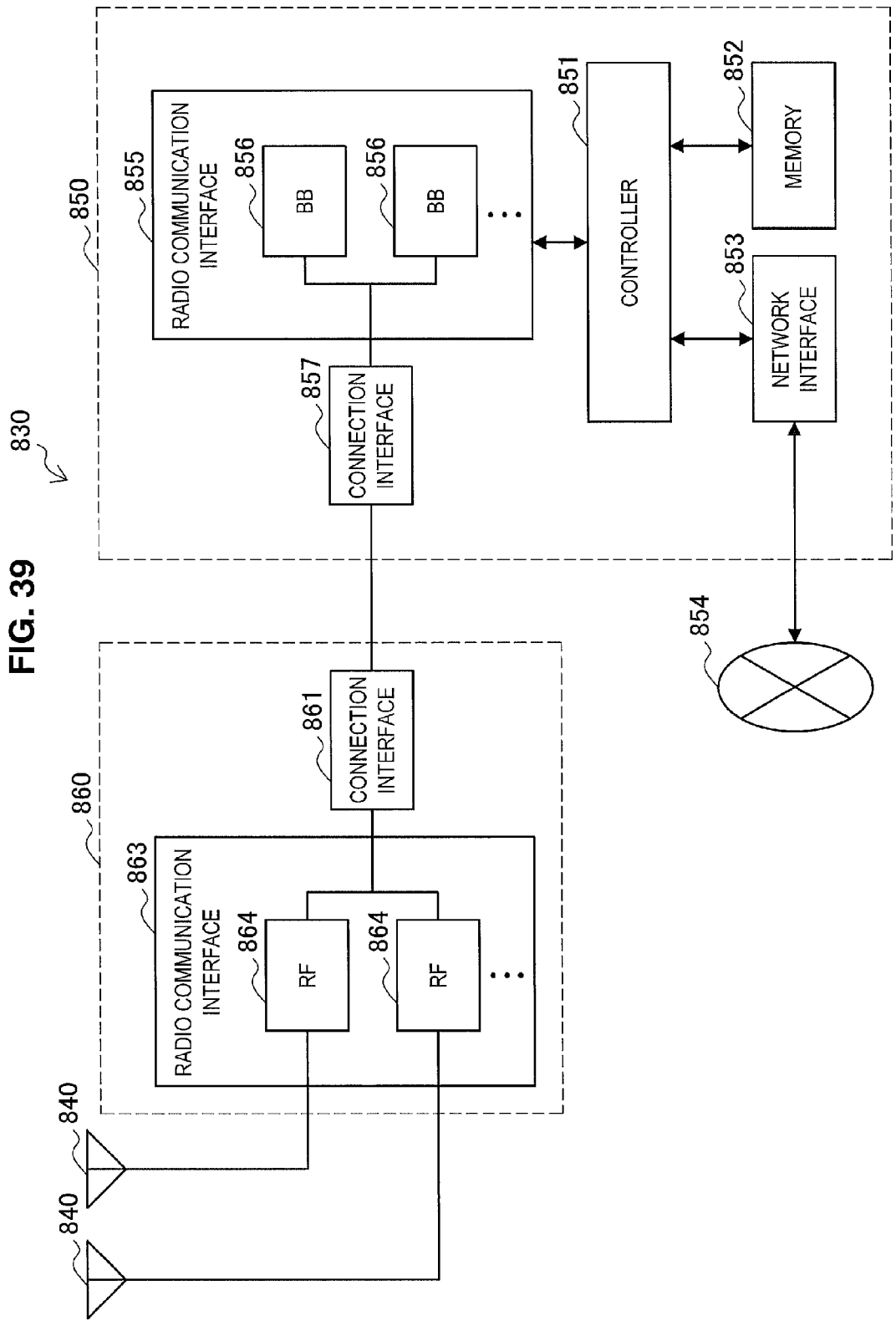
FIG. 39 is a block diagram illustrating a second example of a schematic configuration of an eNodeB to which technology according to an embodiment of the present disclosure may be applied.

FIG. 39 is a block diagram illustrating a second example of a schematic configuration of an eNodeB to which technology according to an embodiment of the present disclosure may be applied. An eNodeB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or multiple antenna elements (for example, multiple antenna elements constituting a MIMO antenna), and is used by the RRH 860 to transmit and receive radio signals. The eNodeB 830 may include multiple antennas 840 as illustrated in FIG. 39, and the multiple antennas 840 may respectively correspond to multiple frequency bands used by the eNodeB 830, for example. Note that although FIG. 39 illustrates an example of the eNodeB 830 including multiple antennas 840, the eNodeB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 38.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 38, except for being connected to an RF circuit 864 of the RRH 860 via the connection interface 857. The radio communication interface 855 may also include multiple BB processors 856 as illustrated in FIG. 39, and the multiple BB processors 856 may respectively correspond to multiple frequency bands used by the eNodeB 830, for example. Note that although FIG. 39 illustrates an example of the radio communication interface 855 including multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include multiple RF circuits 864 as illustrated in FIG. 39, and the multiple RF circuits 864 may respectively correspond to multiple antenna elements, for example. Note that although FIG. 39 illustrates an example of the radio communication interface 863 including multiple RF circuits 864, the radio communication interface 863 may also include a single RF circuit 864.

In the eNodeB 800 and the eNodeB 830 illustrated in FIGS. 38 and 39, the control unit 150 described with reference to FIG. 21 as well as the control unit 151 described with reference to FIG. 31 may be implemented in the radio communication interface 825 as well as the radio communication interface 855 and/or the radio communication interface 863. Also, at least some of these functions may also be implemented in the controller 821 and the controller 851.

<<5.2. Applications Related to UE>>

(First Application)

Figure 40:
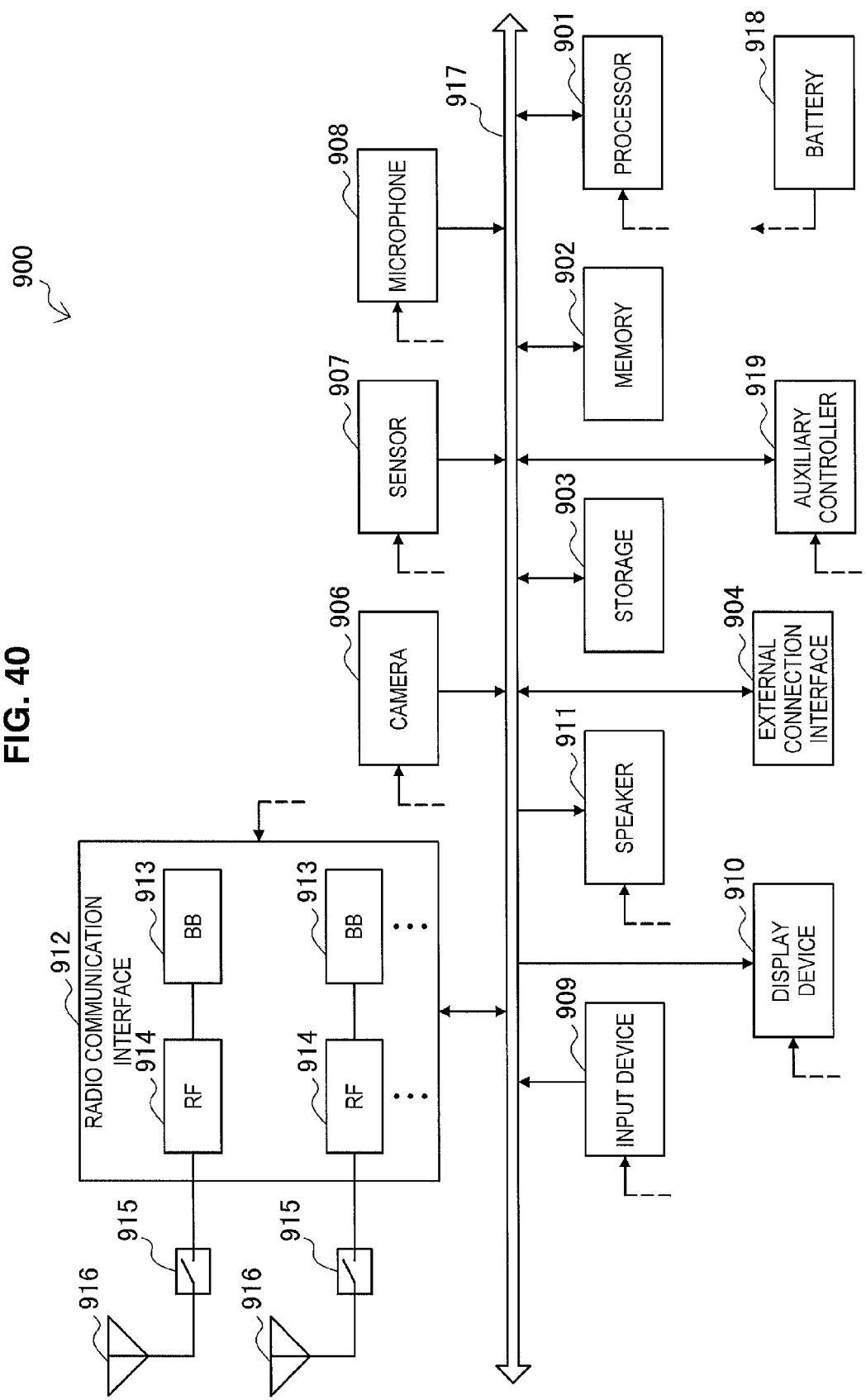
FIG. 40 is a block diagram illustrating an example of a schematic configuration of a smartphone to which technology according to an embodiment of the present disclosure may be applied.

FIG. 40 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include multiple BB processors 913 and multiple RF circuits 914 as illustrated in FIG. 40. Note that although FIG. 40 illustrates an example of the radio communication interface 912 including multiple BB processors 913 and multiple RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among multiple circuits included in the radio communication interface 912 (for example, circuits for different radio communication schemes).

Each antenna 916 includes a single or multiple antenna elements (for example, multiple antenna elements constituting a MIMO antenna), and is used by the radio communication interface 912 to transmit and receive radio signals. The smartphone 900 may also include multiple antennas 916 as illustrated in FIG. 40. Note that although FIG. 40 illustrates an example of the smartphone 900 including multiple antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 40 via power supply lines partially illustrated with dashed lines in the drawing. The auxiliary controller 919 causes minimal functions of the smartphone 900 to operate while in a sleep mode, for example.

In the smartphone 900 illustrated in FIG. 40, the control unit 240 described with reference to FIG. 22 and the control unit 241 described with reference to FIG. 33 may be implemented in the radio communication interface 912. Also, at least some of these functions may also be implemented in the processor 901 or the auxiliary controller 919.
(Second Application)

FIG. 41 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include multiple BB processors 934 and multiple RF circuits 935 as illustrated in FIG. 41. Note that although FIG. 41 illustrates an example of the radio communication interface 933 including multiple BB processors 934 and multiple RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among multiple circuits included in the radio communication interface 933 (for example, circuits for different radio communication schemes).

Each antenna 937 includes a single or multiple antenna elements (for example, multiple antenna elements constituting a MIMO antenna), and is used by the radio communication interface 933 to transmit and receive radio signals. The car navigation device 920 may also include multiple antennas 937 as illustrated in FIG. 41. Note that although FIG. 41 illustrates an example of the car navigation device 920 including multiple antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 41 via power supply lines partially illustrated with dashed lines in the drawing. Also, the battery 938 stores electric power supplied from the vehicle.

In the car navigation device 920 illustrated in FIG. 41, the control unit 240 described with reference to FIG. 22 and the control unit 241 described with reference to FIG. 33 may be implemented in the radio communication interface 933. Also, at least some of these functions may also be implemented in the processor 921.

In addition, technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

6. CONCLUSION

The communication devices and processes according to the embodiments of the present disclosure have been described above with reference to FIGS. 1 to 37. In the first embodiment of the present disclosure, the synchronization relation information indicating which frequency bands are mutually synchronized among the plurality of CCs used for the radio communication is acquired. Then, the transmission of the synchronization relation information to the UE 200 is controlled.

Thus, it is possible to reduce the load on the UE 200 in carrier aggregation. That is, when the synchronization relation information is transmitted from the eNodeB 100 to the UE 200, it is not necessary for the UE 200 to separately verify which CC is synchronized with which CC. For example, when there are the mutually synchronized CCs (for example, the legacy CC, the SNCT, the UNCT, and the UNCT), the UE 200 can use the information regarding the synchronization state of the UE 200 in one CC for another CC. In this way, it is possible to reduce the load on the UE 200.

For example, the plurality of CCs include one or more different CCs with which the CRS is transmitted in each subframe. The synchronization relation information at least indicates which frequency band among the one or more frequency bands is synchronized with which frequency band among the one or more frequency bands.

For example, the one or more CCs include one or more synchronized frequency bands synchronized with any one of the one or more different frequency bands. The synchronization relation information at least indicates which frequency band among the one or more synchronized frequency bands is synchronized with which frequency band among the one or more different frequency bands.

Thus, it is not necessary for the UE 200 to separately verify with which legacy CC the SNCT is synchronized. For example, the UE 200 can use the information regarding the synchronization state in the legacy CC synchronized with the SNCT in the SNCT. In this way, it is possible to reduce the load on the UE 200.

For example, the synchronization relation information at least indicates which frequency bands are mutually synchronized among the one or more frequency bands.

For example, the plurality of CCs include one or more different CCs with which the CRSs are transmitted in each subframe. The one or more CCs include two or more unsynchronized frequency bands which are synchronized with none of the one or more different frequency bands. The synchronization relation information at least indicates which frequency bands are mutually synchronized among the two or more unsynchronized frequency bands.

Thus, it is not necessary for the UE 200 to separately verify which UNCT is synchronized with which UNCT. For example, the UE 200 can use the information regarding the synchronization state in one UNCT for another UNCT synchronized with the UNCT. In this way, it is possible to reduce the load on the UE 200-1.

Each of the plurality of CCs may be the CC with which the CRS is not transmitted in at least one subframe.

Thus, it is not necessary for the UE 200-1 to separately verify which NCT is synchronized with which NCT. For example, the UE 200-1 can use the information regarding the synchronization state in one NCT for another NCT synchronized with the NCT. In this way, it is possible to reduce the load on the UE 200-1.

For example, in the first modification example of the first embodiment, the one or more CCs with which the CRSs are not transmitted in at least one of the subframes include two or more mutually synchronized CCs. The CRSs are transmitted in at least one of the subframes with some of the CCs among the two or more CCs and the CRSs are not transmitted with the remaining CCs among the two or more CCs.

Thus, the line resources can be effectively used. That is, it is possible to reduce the radio resources used to transmit the control signal.

For example, in the first modification example of the first embodiment, the one or more CCs with which the CRS is not transmitted in at least one of the subframes include two or more mutually synchronized CCs. The UE 200-1 monitors the synchronization state of the UE 200 in some of the CCs among the two or more CCs and does not monitor the synchronization state of the UE 200 in the remaining CCs among the two or more CCs.

Thus, when there are the mutually synchronized NCTs and the UE 200 monitors the synchronization state of the UE 200 in some of the NCTs, the UE 200 may not monitor the synchronization state of the UE 200 in the remaining CCs. In this way, it is possible to reduce the load on the UE 200.

In the second embodiment of the present disclosure, the plurality of CCs used for the radio communication include two or more CCs with which the CRSs are not transmitted in at least one of the subframes. The CRS is transmitted at mutually different intervals between at least two CCs among the two or more CCs.

In this way, when there are the NCTs with which the CRS is transmitted at the mutually different intervals, the UE 200 can selectively use the NCTs according to an environment. For example, the UE 200 present in an environment in which the SNR is low uses the NCT with which the CRS is transmitted at higher intervals. The UE 300 present in an environment in which the SNR is high uses the NCT with which the CRS is transmitted at lower intervals. As a result, the UE 200 can acquire the synchronization state of the UE 200. Further, it is possible to reduce the overhead by the CRS.

For example, the synchronizability determination information used to determine whether the UE 200 can be synchronized in each of the two or more frequency bands with which the CRSs are not transmitted in at least one of the subframes is acquired. The transmission of the synchronizability determination information to the UE 200-2 is controlled.

When such information is supplied, the UE 200 can know which NCT is necessary to achieve the synchronization state despite the fact that the transmission interval of the CRS is different due to the NCT. Accordingly, the UE 200 can achieve the synchronization state without trial and error more reliably by selecting and using the proper NCT according to an environment (that is, establishing connection with the eNodeB 100-1 in the proper NCT).

For example, the synchronizability determination information includes information regarding the transmission interval of the CRS in each of the two or more CCs with which the CRSs are not transmitted in at least one of the subframes.

When such information is supplied, the UE 200 can know the transmission frequency of the CRS in each NCT. Accordingly, the UE 200 can achieve the synchronization state without trial and error more reliably by selecting the proper transmission interval of the CRS according to an environment and using the CRS associated with the transmission interval.

The synchronizability determination information may include information regarding communication quality recommended in each of the two or more CCs with which the CRSs are not transmitted in at least one of the subframes.

When such information is supplied, the UE 200 can know the extent of the communication quality (for example, an SNR) necessary to achieve the synchronization state in each NCT. Accordingly, the UE 200 can achieve the synchronization state without trial and error more reliably by selecting the proper NCT according to an actual SNR in each NCT and using the NCT.

The synchronizability determination information may include the information regarding power control of each of the two or more CCs with which the CRSs are not transmitted in at least one of the subframes.

When such information is supplied, the UE 200 can know which NCT is necessary to achieve the synchronization state more easily. Accordingly, the UE 200 can achieve the synchronization state without trial and error more reliably by selecting and using the proper NCT.

For example, in the first modification example of the second embodiment, the two or more CCs with which the CRSs are not transmitted in at least one of the subframes include the CC of a low interval with which the CRSs are transmitted at the first interval in the time direction and the CC of a high interval with which the CRSs are transmitted at the second interval higher than the first interval in the time direction. The control unit 151 controls the transmission such that some or all of the subframes in which the CRSs are transmitted with the CCs of the low interval become the subframes in which the CRSs are transmitted with the CCs of the high interval.

Thus, since the time in which the UE 200 operates can be reduced, the power consumption of the UE 200 can be prevented from increasing.

For example, in the second modification example of the second embodiment, the CRSs are transmitted at the mutually different intervals in at least two or more mutually synchronized CCs among the two or more CCs with which the common reference signals are not transmitted in at least one of the subframes.

Since the UE 200 can achieve the synchronization state in one NCT between the mutually synchronized NCTs more reliably through the transmission of the CRS, it is possible to use the NCTs more reliably. For example, even in an environment in which communication quality is not good, the UE 200 can achieve the synchronization state in the NCT associated with the higher transmission interval of the CRS. The UE 200 can use the information regarding the synchronization state for another NCT.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the example in which the plurality of frequency bands (the CCs) used for the radio communication are used by one base station (the eNodeB) has been described, but an embodiment of the present disclosure is not limited thereto. For example, each of the plurality of frequency bands used for the radio communication may be used by any base station among the plurality of base stations. For example, each of the plurality of frequency bands may be used by any base station of a base station of a macro-cell and base stations of small cells partially or entirely overlapping the macro-cell. In this case, the frequency bands used by different base stations may be simultaneously used by terminal devices (for example, UEs). That is, carrier aggregation reaching a plurality of base stations may be performed.

In the second embodiment, the example in which the terminal device (the UE) simultaneously uses the plurality of frequency bands has been described, but an embodiment of the present disclosure is not limited thereto. In the case described in the second embodiment, the terminal device may use any one frequency band among the plurality of frequency bands. That is, the terminal device may not support carrier aggregation.

The fact that the frequency bands are distant has been described as the reason for which the frequency band is not synchronized with another frequency band, but the reason is not limited thereto. For example, as another reason, the frequency band may not be synchronized with another frequency band. For example, in some cases, of a plurality of frequency bands, some of the frequency bands can be used by a certain base station (for example, a base station of a macro-cell). Of the plurality of frequency bands, the remaining frequency bands can be used by another base station (for example, a base station of a small cell). In such cases, there is a possibility of the frequency bands used by the certain base station not being synchronized with the frequency bands used by the other base station.

The example in which the radio communication system conforms to a series of communication standards of LTE has been described, but an embodiment of the present disclosure is not limited to related examples. For example, the radio communication system may be a system conforming to other communication standards. In this case, a base station included in the radio communication system may be realized as a different kind of base station such as a NodeB or a base transceiver station (BTS) instead of the eNodeB. The terminal device included in the radio communication system may be realized as a different kind of terminal device such as a mobile station (MS) instead of the UE.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device or a terminal device to exhibit functions similar to each structural element of the foregoing communication control device or terminal device.

Additionally, the present technology may also be configured as below.

(1)
A communication control device including:
an acquisition unit configured to acquire synchronization relation information indicating which frequency bands are mutually synchronized among a plurality of frequency bands used for radio communication; and
a control unit configured to control transmission of the synchronization relation information to a terminal device,
wherein the plurality of frequency bands include one or more frequency bands with which a common reference signal is not transmitted in at least one subframe among subframes which are units of time in the radio communication.

(2)
The communication control device according to (1),
wherein the plurality of frequency bands include one or more different frequency bands with which the common reference signal is transmitted in each of the subframes, and
wherein the synchronization relation information at least indicates which frequency band among the one or more frequency bands is synchronized with which frequency band among the one or more different frequency bands.

(3)
The communication control device according to (2),
wherein the one or more frequency bands include one or more synchronized frequency bands synchronized with one of the one or more different frequency bands, and
wherein the synchronization relation information at least indicates which frequency band among the one or more synchronized frequency bands is synchronized with which frequency band among the one or more different frequency bands.

(4)
The communication control device according to any one of (1) to (3), wherein the synchronization relation information at least indicates which frequency bands among the one or more frequency bands are mutually synchronized.

(5)
The communication control device according to (4),
wherein the plurality of frequency bands include one or more different frequency bands with which the common reference signal is transmitted in each of the subframes,
wherein the one or more frequency bands include two or more unsynchronized frequency bands synchronized with none of the one or more different frequency bands, and
wherein the synchronization relation information at least indicates which frequency bands are mutually synchronized among the two or more unsynchronized frequency bands.

(6)
The communication control device according to (4),
wherein each of the plurality of frequency bands is a frequency band with which the common reference signal is not transmitted in at least one subframe among the subframes.

(7)
The communication control device according to (1),
wherein the one or more frequency bands include two or more frequency bands that are mutually synchronized, and
wherein the common reference signal is transmitted in at least one subframe with some of the frequency bands among the two or more frequency bands, and the common reference signal is not transmitted in all of the subframes with the remaining frequency bands among the two or more frequency bands.

(8)
The communication control device according to (1),
wherein the one or more frequency bands include two or more frequency bands that are mutually synchronized, and
wherein the terminal device monitors a synchronization state of the terminal device in some of the frequency bands among the two or more frequency bands and does not monitor a synchronization state of the terminal device in the remaining frequency bands among the two or more frequency bands.

(9)
The communication control device according to (1),
wherein the control unit controls transmission of a signal with the plurality of frequency bands,
wherein the plurality of frequency bands include two or more frequency bands with which the common reference signal is not transmitted in at least one subframe among the subframes which are the units of time in the radio communication, and
wherein the control unit controls the transmission in a manner that the common reference signal is transmitted at different intervals with at least two frequency bands among the two or more frequency bands.

(10)
The communication control device according to (9),
wherein the two or more frequency bands include a frequency band of a low interval with which the common reference signal is transmitted at the first interval in a time direction and a frequency band of a high interval with which the common reference signal is transmitted at a second interval higher than the first interval in the time direction, and
wherein the control unit controls the transmission in a manner that some or all of the subframes in which the common reference signal is transmitted with the frequency band of the low interval are the subframes in which the common reference signal is transmitted with the frequency band of the high interval.

(11)
The communication control device according to (9),
wherein the acquisition unit acquires synchronizability determination information used to determine whether the terminal device is able to be synchronized in each of the two or more frequency bands, and
wherein the control unit controls transmission of the synchronizability determination information to the terminal device.

(12)
The communication control device according to (11),
wherein the synchronizability determination information includes information regarding a transmission interval of the common reference signal in each of the two or more frequency bands.

(13)

The communication control device according to (11) or (12), wherein the synchronizability determination information includes information regarding communication quality recommended in each of the two or more frequency bands.

(14)

The communication control device according to any one of (11) to (13), wherein the synchronizability determination information includes information regarding power control in regard to each of the two or more frequency bands.

(15)

The communication control device according to any one of (9) to (14), wherein the control unit controls the transmission in a manner that the common reference signal is transmitted at different intervals in at least two frequency bands that are mutually synchronized among the two or more frequency bands.

(16)

A program causing a computer to function as:

an acquisition unit configured to acquire synchronization relation information indicating which frequency bands are mutually synchronized among a plurality of frequency bands used for radio communication; and a control unit configured to control transmission of the synchronization relation information to a terminal device, wherein the plurality of frequency bands include one or more frequency bands with which a common reference signal is not transmitted in at least one subframe among subframes which are units of time in the radio communication.

(17)

A communication control method including:

acquiring synchronization relation information indicating which frequency bands are mutually synchronized among a plurality of frequency bands used for radio communication; and controlling transmission of the synchronization relation information to a terminal device, wherein the plurality of frequency bands include one or more frequency bands with which a common reference signal is not transmitted in at least one subframe among subframes which are units of time in the radio communication.

(18)

A terminal device including:

an acquisition unit configured to acquire synchronization relation information indicating which frequency bands are mutually synchronized among a plurality of frequency bands used for radio communication when the synchronization relation information is received; and a control unit configured to perform control for a purpose of synchronization in the plurality of frequency bands based on the synchronization relation information, wherein the plurality of frequency bands include one or more frequency bands with which a common reference signal is not transmitted in at least one subframe among subframes which are units of time in the radio communication.

(19)

A communication control device including:

a control unit configured to control transmission of a signal in a plurality of frequency bands used for radio communication, wherein the plurality of frequency bands include two or more frequency bands with which a common reference signal is not transmitted in at least one subframe among subframes which are units of time in the radio communication, and wherein the control unit controls the transmission in a manner that the common reference signal is transmitted at different intervals with at least two frequency bands among the two or more frequency bands.

(20)

A terminal device including:

a control unit configured to select a frequency band used for radio communication of the terminal device among a plurality of frequency bands used for the radio communication, wherein the plurality of frequency bands include two or more frequency bands with which a common reference signal is not transmitted in at least one subframe among subframes which are units of time in the radio communication, and wherein the common reference signal is transmitted at different intervals with at least two frequency bands among the two or more frequency bands.

REFERENCE SIGNS LIST 10 cell
30 component carrier (CC)
100 eNodeB
110 antenna unit
120 radio communication unit
130 network communication unit
140, 141 storage unit
150, 151 control unit
200 user equipment (UE)
210 antenna unit
220 radio communication unit
230, 231 storage unit
240, 241 control unit

The invention claimed is:

1. A communication control device, comprising:
a central processing unit (CPU) configured to:
acquire synchronization relation information that indicates which frequency bands are mutually synchronized among a plurality of frequency bands, wherein the plurality of frequency bands are used for a radio communication; and
transmit the synchronization relation information to a terminal device,
wherein the plurality of frequency bands include at least one first frequency band and at least one second frequency band, except for which a common reference signal is transmitted in at least one subframe among subframes which are units of time in the radio communication,
wherein the plurality of frequency bands further include at least one third frequency band with which the common reference signal is transmitted in each of the subframes,
wherein the at least one first frequency band and the at least one second frequency band include frequency bands unsynchronized with the at least one third frequency band, and
wherein the synchronization relation information at least indicates whether the at least one first frequency band is mutually synchronized with the at least one second frequency band.

2. The communication control device according to claim 1,
wherein the plurality of frequency bands include at least two frequency bands that are mutually synchronized,
wherein the common reference signal is transmitted in at least one subframe among subframes of at least one fourth frequency band of the at least two frequency bands among the plurality of frequency bands, and
wherein the common reference signal is excluded from transmission in all of the subframes with frequency bands other than the at least one fourth frequency band of the at least two frequency bands.

3. The communication control device according to claim 1,
wherein the plurality of frequency bands include at least two frequency bands that are mutually synchronized, and
wherein the terminal device monitors a synchronization state of the terminal device in at least one fifth frequency band of the at least two frequency bands among the plurality of frequency bands and ignores monitor of the synchronization state of the terminal device in frequency bands other than the at least one fifth frequency band of the at least two frequency bands.

4. The communication control device according to claim 1,
wherein the CPU is further configured to transmit a signal with the plurality of frequency bands,
wherein the plurality of frequency bands include at least two frequency bands with which the common reference signal is transmitted in at least one subframe among the subframes which are the units of time in the radio communication, and
wherein the CPU is further configured to transmit the common reference signal at different intervals with the at least two frequency bands.

5. The communication control device according to claim 4,
wherein the at least two frequency bands include a sixth frequency band of a first interval with which the common reference signal is transmitted in a time direction and a seventh frequency band of a second interval with which the common reference signal is transmitted in the time direction, wherein the first interval is smaller than the second interval, and
wherein a plurality of the subframes in which the common reference signal is transmitted with the sixth frequency band are the plurality of subframes in which the common reference signal is transmitted with the seventh frequency band.

6. The communication control device according to claim 4,
wherein the CPU is further configured to acquire synchronizability determination information used to determine whether the terminal device is able to synchronize in each of the at least two frequency bands, and
wherein the CPU is further configured to transmit the synchronizability determination information to the terminal device.

7. The communication control device according to claim 6, wherein the synchronizability determination information includes information regarding a transmission interval of the common reference signal in each of the at least two frequency bands.

8. The communication control device according to claim 6, wherein the synchronizability determination information includes information regarding communication quality recommended in each of the at least two frequency bands.

9. The communication control device according to claim 6, wherein the synchronizability determination information includes information regarding power control in regard to each of the at least two frequency bands.

10. The communication control device according to claim 4, wherein the at least two frequency bands are mutually synchronized.

11. A non-transitory computer-readable medium having stored thereon computer-executable instructions that, when executed by a processor, cause computer to perform operations, the operations comprising:
acquiring synchronization relation information indicating which frequency bands are mutually synchronized among a plurality of frequency bands used for a radio communication; and
transmitting the synchronization relation information to a terminal device,
wherein the plurality of frequency bands include at least one first frequency band and at least one second frequency band, except for which a common reference signal is transmitted in at least one subframe among subframes which are units of time in the radio communication,
wherein the plurality of frequency bands further include at least one third frequency band with which the common reference signal is transmitted in each of the subframes,
wherein the at least one first frequency band and the at least one second frequency band include frequency bands unsynchronized with the at least one third frequency band, and
wherein the synchronization relation information at least indicates whether the at least one first frequency band is mutually synchronized with the at least one second frequency band.

12. A communication control method, comprising:
in a communication control device:
acquiring synchronization relation information indicating which frequency bands are mutually synchronized among a plurality of frequency bands used for a radio communication; and
transmitting the synchronization relation information to a terminal device,
wherein the plurality of frequency bands include at least one first frequency band and at least one second frequency band, except for which a common reference signal is transmitted in at least one subframe among subframes which are units of time in the radio communication,
wherein the plurality of frequency bands further include at least one third frequency band with which the common reference signal is transmitted in each of the subframes,
wherein the at least one first frequency band and the at least one second frequency band include frequency bands unsynchronized with the at least one third frequency band, and
wherein the synchronization relation information at least indicates whether the at least one first frequency band is mutually synchronized with the at least one second frequency band.

13. A terminal device, comprising:
a central processing unit (CPU) configured to:
acquire synchronization relation information indicating which frequency bands are mutually synchronized among a plurality of frequency bands used for a radio communication; and synchronize at least two frequency bands in the plurality of frequency bands, based on the synchronization relation information, wherein the plurality of frequency bands include at least one first frequency band and at least one second frequency band, except for which a common reference signal is transmitted in at least one subframe among subframes which are units of time in the radio communication, wherein the plurality of frequency bands further include at least one third frequency band with which the common reference signal is transmitted in each of the subframes, wherein the at least one first frequency band and the at least one second frequency band include frequency bands unsynchronized with the at least one third frequency band, and wherein the synchronization relation information at least indicates whether the at least one first frequency band is mutually synchronized with the at least one second frequency band.

14. A communication control device, comprising:

a central processing unit (CPU) configured to:

acquire synchronization relation information that indicates which frequency bands are mutually synchronized among a plurality of frequency bands, wherein the plurality of frequency bands are used for a radio communication; and transmit a signal in the plurality of frequency bands based on the acquired synchronization relation information, wherein the plurality of frequency bands include at least two first frequency bands except for which a common reference signal is transmitted in at least one subframe among subframes which are units of time in the radio communication, wherein the transmission of the common reference signal is at different intervals with at least two second frequency bands among the plurality of frequency bands, wherein the at least two first frequency bands are unsynchronized with the at least two second frequency bands, and wherein the synchronization relation information at least indicates whether frequency bands of the at least two first frequency bands are mutually synchronized.

15. A terminal device, comprising:

a central processing unit (CPU) configured to:

acquire synchronization relation information that indicates which frequency bands are mutually synchronized among a plurality of frequency bands, wherein the plurality of frequency bands are used for a radio communication;

select a frequency band used for the radio communication of the terminal device among the plurality of frequency bands, based on the acquired synchronization relation information, wherein the plurality of frequency bands include at least two first frequency bands except for which a common reference signal is transmitted in at least one subframe among subframes which are units of time in the radio communication, and wherein the common reference signal is transmitted at different intervals with at least two second frequency bands among the plurality of frequency bands, wherein the at least two first frequency bands are unsynchronized with the at least two second frequency bands, and wherein the synchronization relation information at least indicates whether frequency bands of the at least two first frequency bands are mutually synchronized.

* * * * *